(12) United States Patent
Zhu et al.

(10) Patent No.: US 12,634,729 B2
(45) Date of Patent: May 19, 2026

(54) METHOD AND APPARATUS FOR FREQUENCY SELECTIVE BEAM MANAGEMENT

(71) Applicant: Samsung Electronics Co., Ltd., Suwon-si (KR)

(72) Inventors: Dalin Zhu, Allen, TX (US); Emad N. Farag, Flanders, NJ (US); Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 325 days.

(21) Appl. No.: 18/338,149

(22) Filed: Jun. 20, 2023

(65) Prior Publication Data

US 2024/0015545 A1 Jan. 11, 2024

Related U.S. Application Data

(60) Provisional application No. 63/390,188, filed on Jul. 18, 2022, provisional application No. 63/358,777, filed on Jul. 6, 2022.

(51) Int. Cl.
*H04W 24/08* (2009.01)
*H04L 5/00* (2006.01)

(52) U.S. Cl.
CPC .......... *H04W 24/08* (2013.01); *H04L 5/0051* (2013.01)

(58) Field of Classification Search
CPC ............................. H04W 24/08; H04L 5/0051
See application file for complete search history.

(56) References Cited

U.S. PATENT DOCUMENTS

| | | |
|---|---|---|
| 2019/0215086 A1 | 7/2019 | Kwak et al. |
| 2019/0260452 A1 | 8/2019 | Zhang et al. |
| 2019/0312698 A1* | 10/2019 | Akkarakaran ........ H04L 5/0048 |
| 2020/0259608 A1 | 8/2020 | Kakishima et al. |
| 2020/0358505 A1 | 11/2020 | Park et al. |
| 2022/0029673 A1 | 1/2022 | Chen et al. |

FOREIGN PATENT DOCUMENTS

| | | |
|---|---|---|
| EP | 3968535 A1 | 3/2022 |
| WO | 2021094985 A1 | 5/2021 |

OTHER PUBLICATIONS

International Search Report and Written Opinion issued Sep. 21, 2023 regarding International Application No. PCT/KR2023/009541, 7 pages.

(Continued)

*Primary Examiner* — Rhonda L Murphy

(57) ABSTRACT

Apparatuses and methods for frequency selective beam management (FSBM). A method for operating a user equipment (UE) includes receiving first information indicating one or more channel state information (CSI) reference signal (RS) resources for FSBM and receiving second information indicating a correspondence between the one or more CSI-RS resources and a plurality of frequency subbands. The method further includes determining, based on the first information, the one or more CSI-RS resources for FSBM and identifying, based on the second information, the correspondence between the one or more CSI-RS resources and the plurality of frequency subbands.

20 Claims, 13 Drawing Sheets

(56) References Cited

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)" 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

Supplementary European Search Report issued Oct. 29, 2025 regarding Application No. 23835848.5, 11 pages.

* cited by examiner

700

800

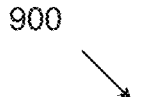
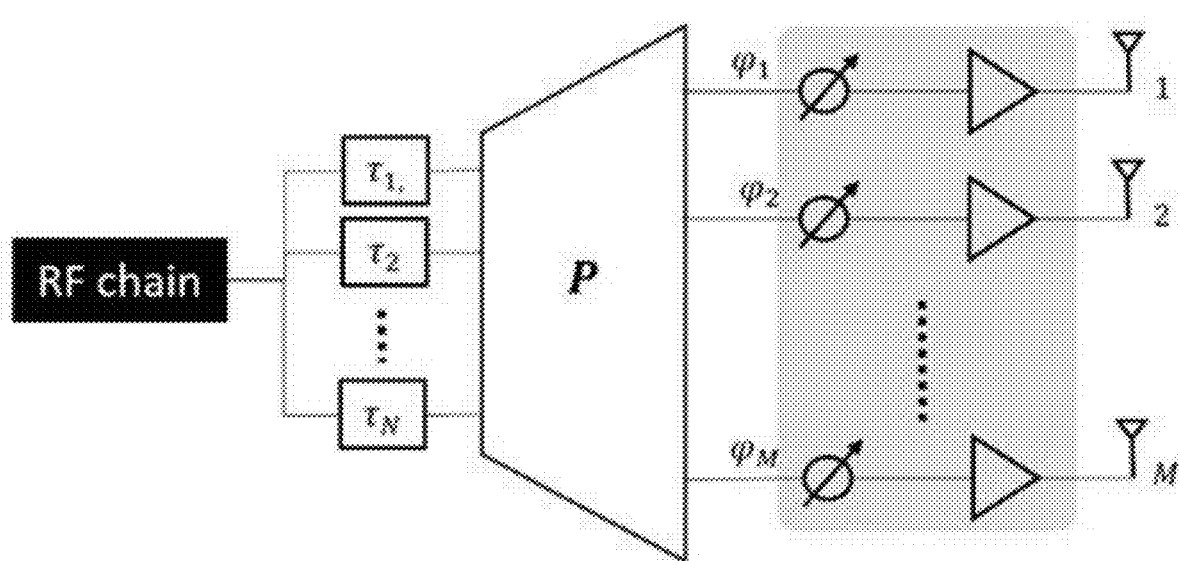
FIG. 9

Figure 11:
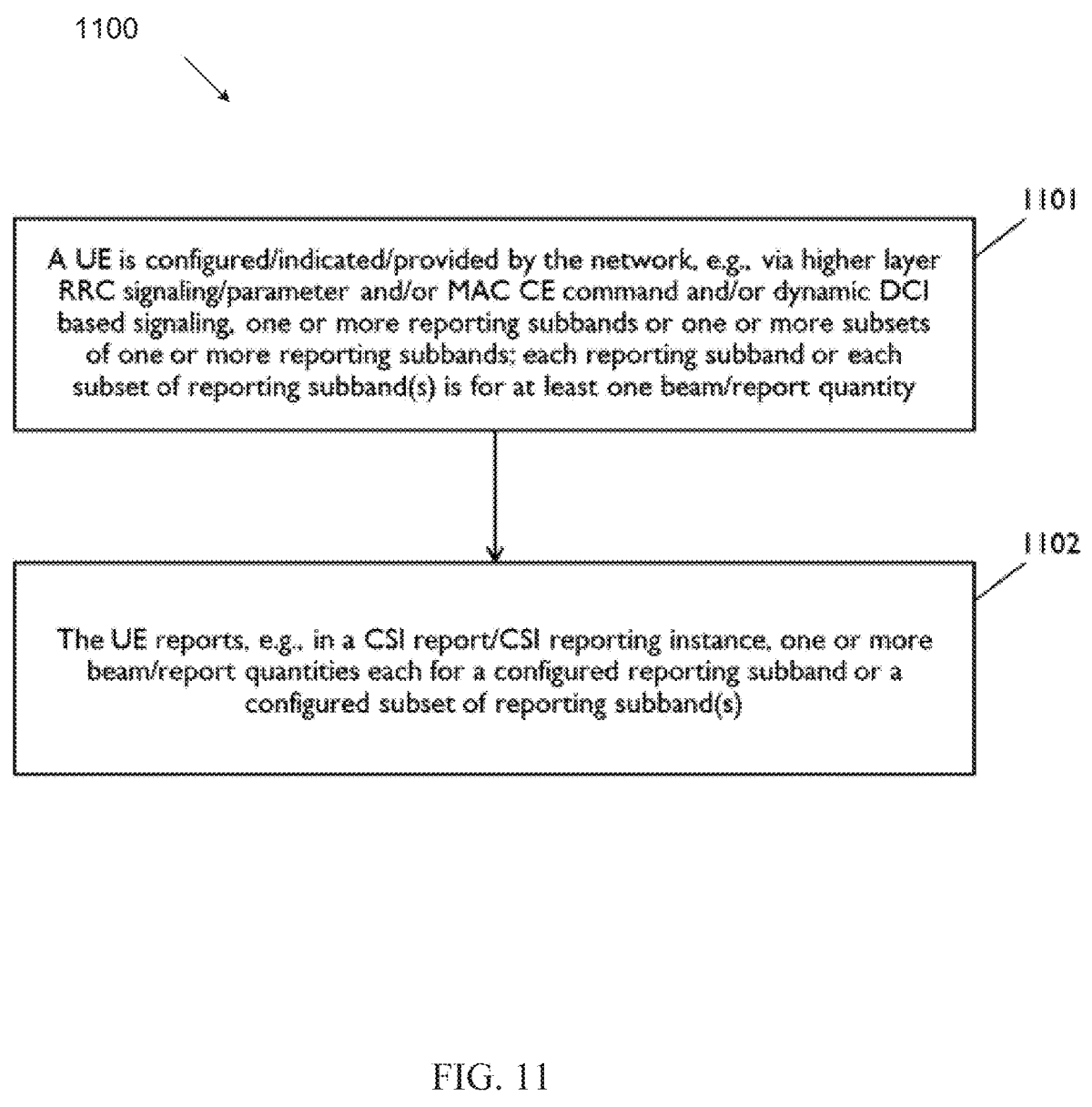

1100

1101

A UE is configured/indicated/provided by the network, e.g., via higher layer RRC signaling/parameter and/or MAC CE command and/or dynamic DCI based signaling, one or more reporting subbands or one or more subsets of one or more reporting subbands; each reporting subband or each subset of reporting subband(s) is for at least one beam/report quantity

1102

The UE reports, e.g., in a CSI report/CSI reporting instance, one or more beam/report quantities each for a configured reporting subband or a configured subset of reporting subband(s)

Same DL spatial domain
transmission filter for
transmitting CSI-RS #k
on subband #1, subband
2, ..., subband #$N_{rep}$ Measurement/reporting subband #1

Measurement/reporting subband #2

Measurement/reporting subband #$N_{rep}$

CSI-RS #k

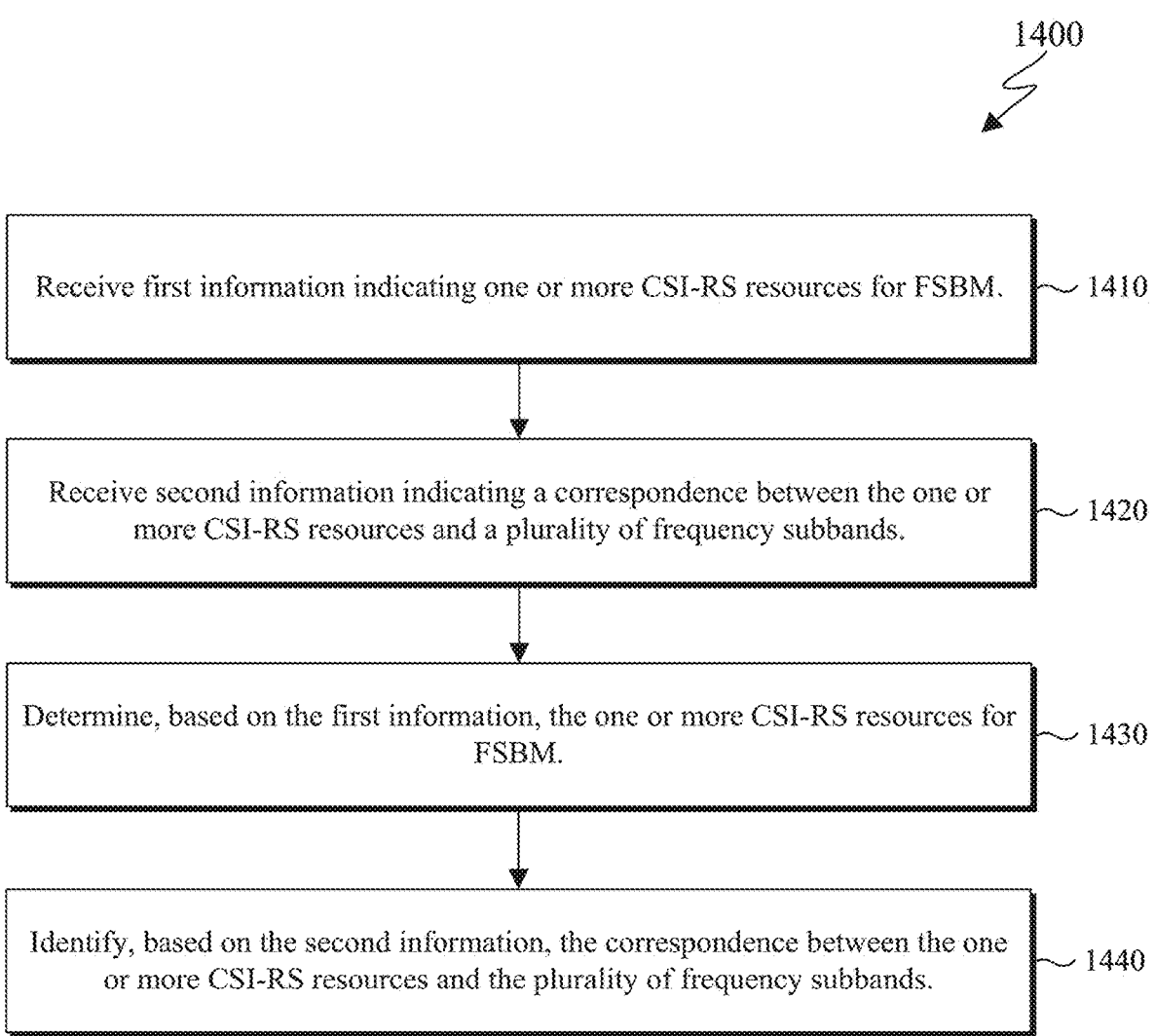

1400

Receive first information indicating one or more CSI-RS resources for FSBM. — 1410

Receive second information indicating a correspondence between the one or more CSI-RS resources and a plurality of frequency subbands. — 1420

Determine, based on the first information, the one or more CSI-RS resources for FSBM. — 1430

Identify, based on the second information, the correspondence between the one or more CSI-RS resources and the plurality of frequency subbands. — 1440

FIG. 14

METHOD AND APPARATUS FOR FREQUENCY SELECTIVE BEAM MANAGEMENT

CROSS-REFERENCE TO RELATED AND CLAIM OF PRIORITY

The present application claims priority under 35 U.S.C. § 119(e) to U.S. Provisional Patent Application No. 63/358, 777 filed on Jul. 6, 2022, and U.S. Provisional Patent Application No. 63/390,188 filed on Jul. 18, 2022, which are hereby incorporated by reference in their entirety.

TECHNICAL FIELD

The present disclosure relates generally to wireless communication systems and, more specifically, the present disclosure is related to apparatuses and methods for frequency selective beam management (FSBM).

BACKGROUND

Wireless communication has been one of the most successful innovations in modern history. Recently, the number of subscribers to wireless communication services exceeded five billion and continues to grow quickly. The demand for wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance. To meet the demand for wireless data traffic having increased since the deployment of 4G communication systems, and to enable various vertical applications, 5G communication systems have been developed and are currently being deployed.

SUMMARY

The present disclosure relates to FSBM. In one embodiment, a user equipment (UE) is provided. The UE includes a transceiver configured to receive first information indicating one or more channel state information (CSI) reference signal (RS) resources for FSBM, and receive second information indicating a correspondence between the one or more CSI-RS resources and a plurality of frequency subbands. The UE further includes a processor operably coupled to the transceiver. The processor configured to determine, based on the first information, the one or more CSI-RS resources for FSBM and identify, based on the second information, the correspondence between the one or more CSI-RS resources and the plurality of frequency subbands.

In another embodiment, a base station (BS) is provided. The BS includes a processor configured to identify first information indicating one or more CSI-RS resources for FSBM and identify second information indicating a correspondence between the one or more CSI-RS resources and a plurality of frequency subbands. The BS further includes a transceiver operably coupled to the processor. The transceiver is configured to transmit the first information to indicate the one or more CSI-RS resources for FSBM, and transmit the second information to indicate the correspondence between the one or more CSI-RS resources and the plurality of frequency subbands.

In another embodiment, a method for performed by a UE is provided. The method includes receiving first information indicating one or more CSI-RS resources for FSBM and receiving second information indicating a correspondence between the one or more CSI-RS resources and a plurality of frequency subbands. The method further includes determining, based on the first information, the one or more CSI-RS resources for FSBM and identifying, based on the second information, the correspondence between the one or more CSI-RS resources and the plurality of frequency subbands.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many, if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9 illustrates an example of a JPTA array architecture according to embodiments of the present disclosure;

FIG. 11 illustrates an example of a flowchart of a UE reporting for a configured reporting subband or subset of reporting subbands according to embodiments of the present disclosure;

FIG. 14 illustrates an example method performed by a UE in a wireless communication system according to embodiments of the present disclosure.

DETAILED DESCRIPTION

FIGS. 1-14, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The following documents and standards descriptions are hereby incorporated by reference into the present disclosure as if fully set forth herein: [1] 3GPP TS 38.211 v16.1.0, "NR; Physical channels and modulation." [2] 3GPP TS 38.212 v16.1.0, "NR; Multiplexing and Channel coding." [3] 3GPP TS 38.213 v16.1.0, "NR; Physical Layer Procedures for Control." [4] 3GPP TS 38.214 v16.1.0, "NR; Physical Layer Procedures for Data." [5] 3GPP TS 38.321 v16.1.0, "NR; Medium Access Control (MAC) protocol specification." and [6] 3GPP TS 38.331 v16.1.0, "NR; Radio Resource Control (RRC) Protocol Specification."

Figure 1:
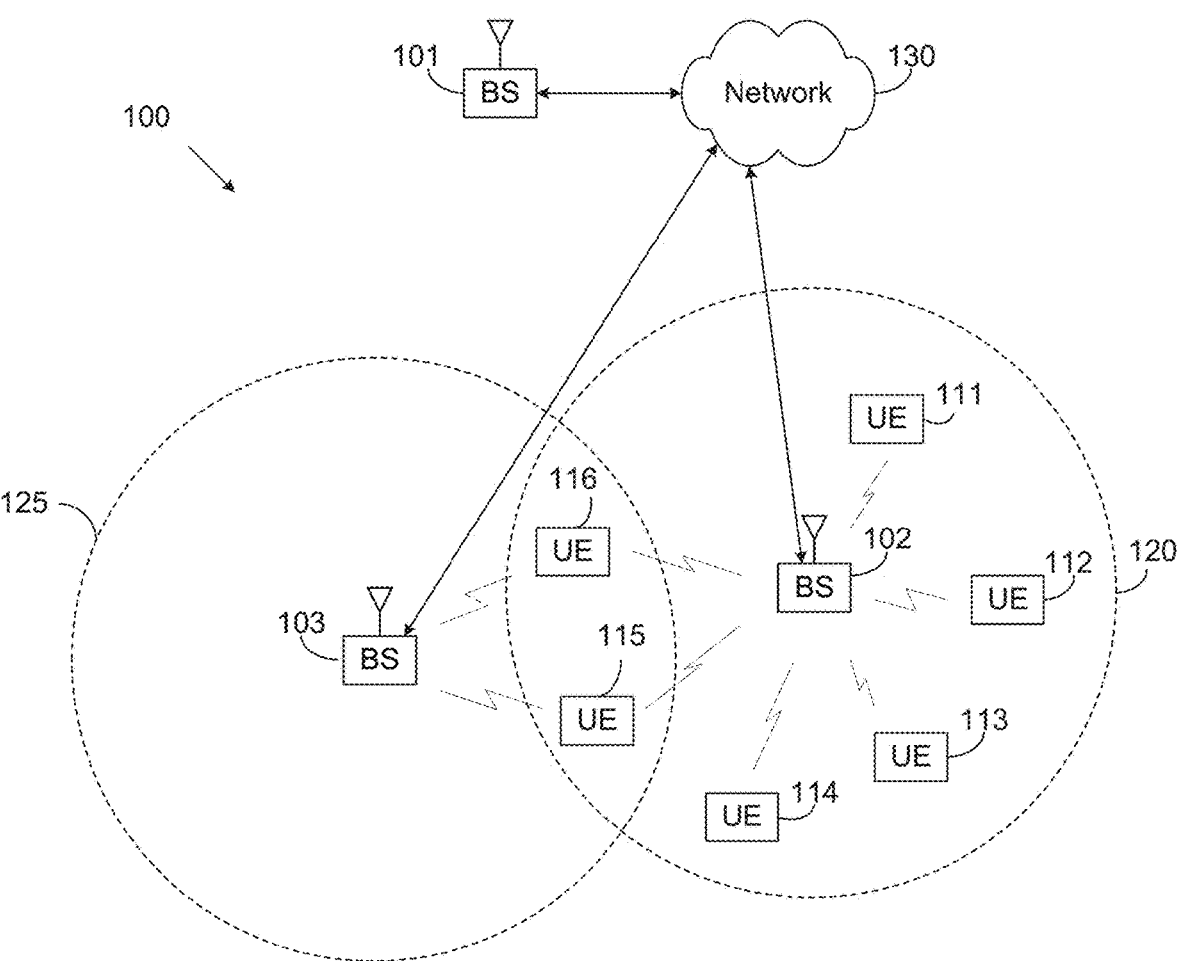
FIG. 1 illustrates an example wireless network according to embodiments of the present disclosure.
Figure 2:
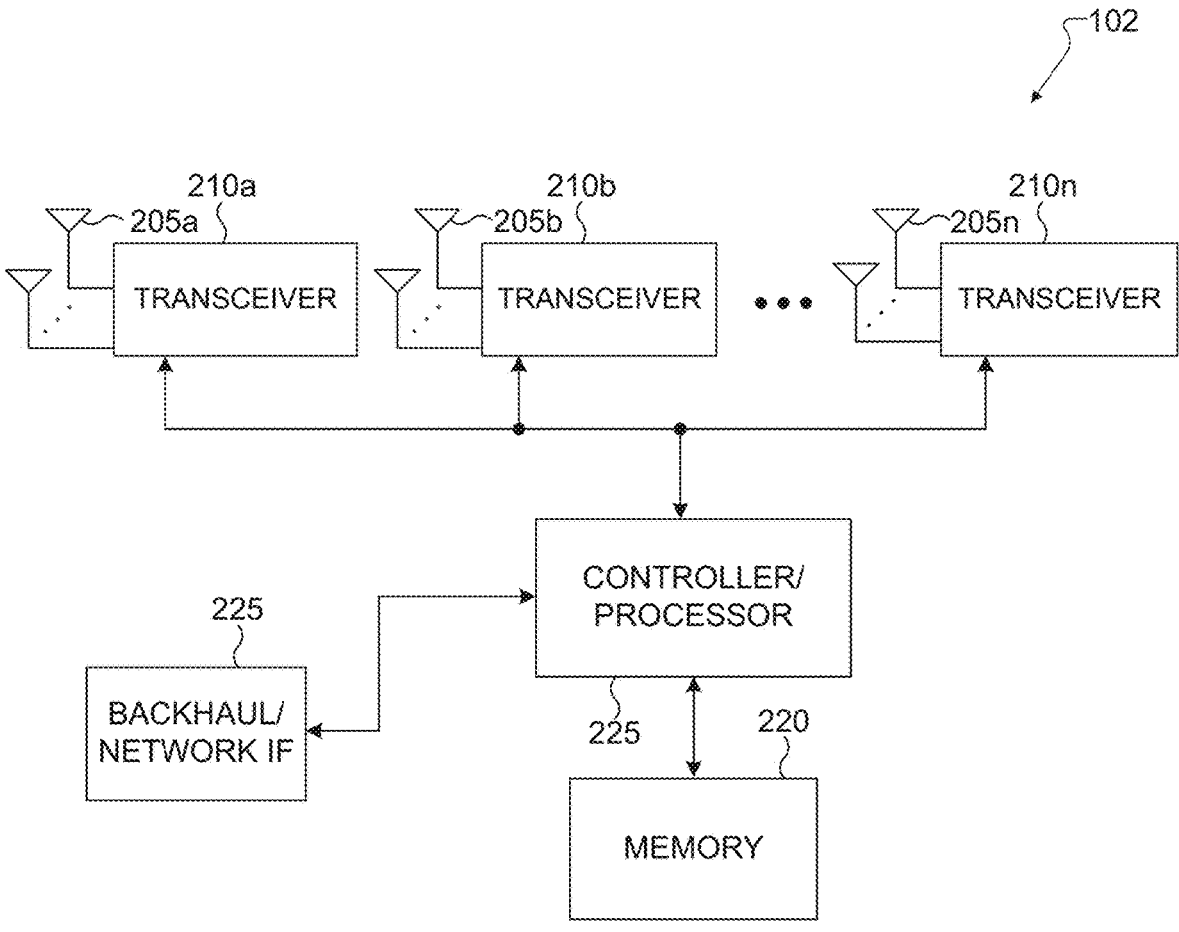
FIG. 2 illustrates an example of a UE according to embodiments of the present disclosure.
Figure 3:
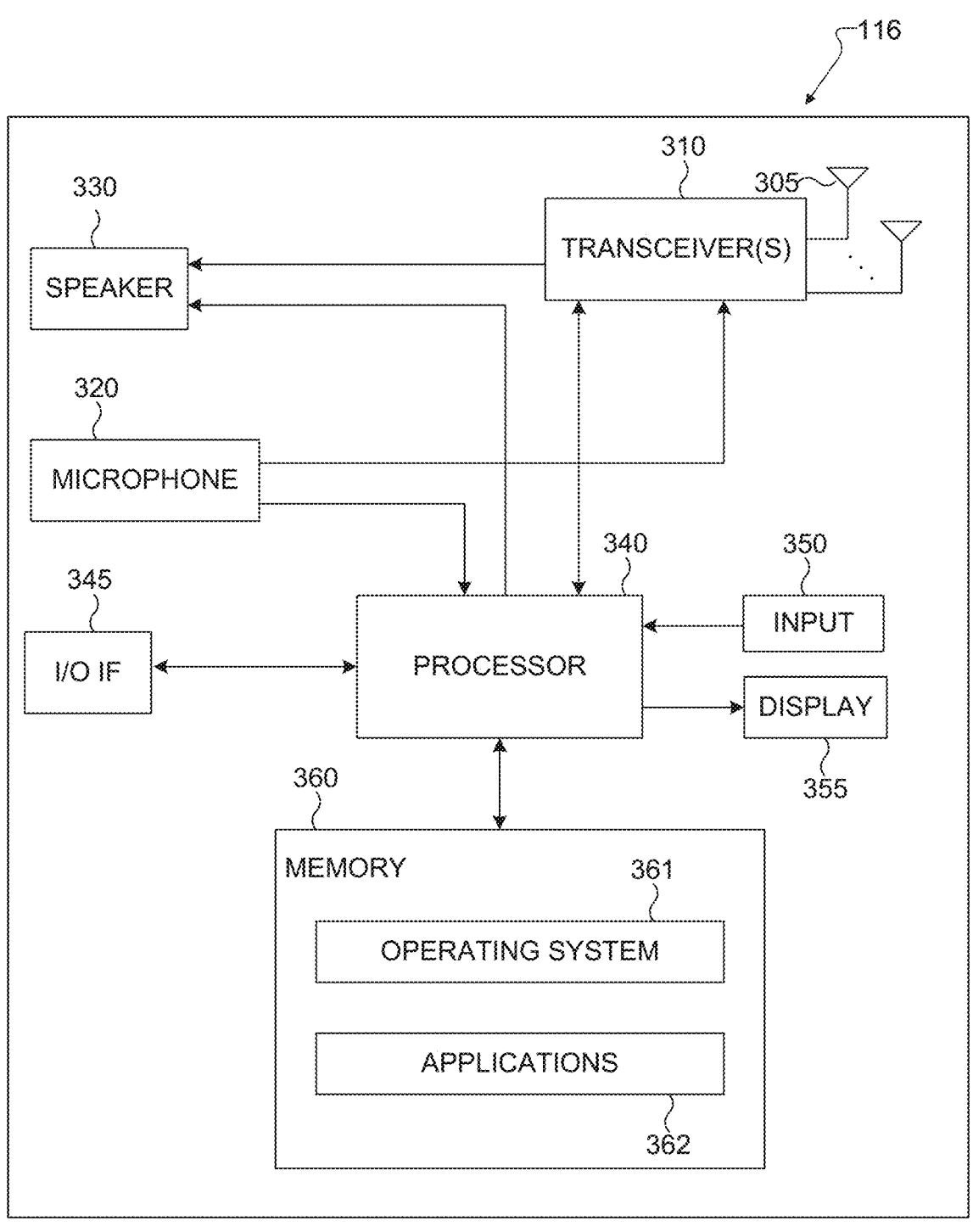
FIG. 3 illustrates an example BS according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for supporting or utilizing a frequency selective beam management. In certain embodiments, one or more of the BSs 101-103 include circuitry, programing, or a combination thereof for supporting frequency selective beam management.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming radio frequency (RF) signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for supporting frequency selective beam management. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for supporting or utilizing frequency selective beam management as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
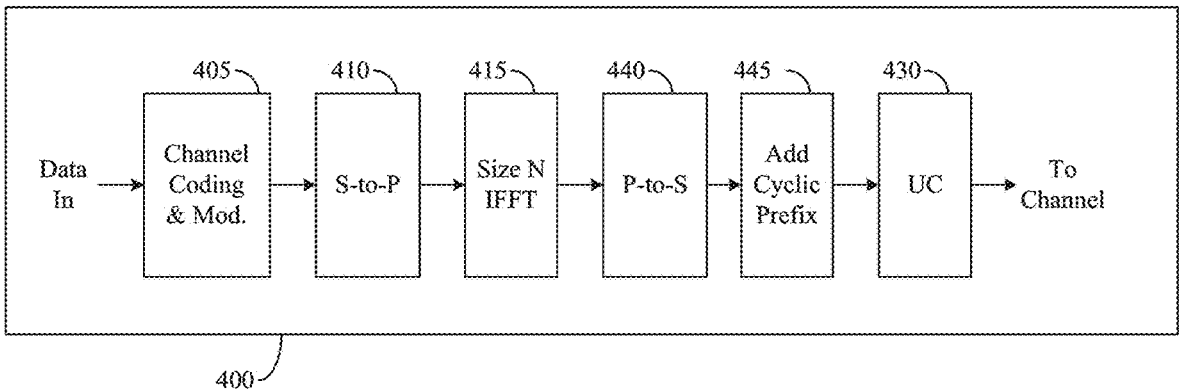
FIGS. 4A and 4B illustrate examples of wireless transmit and receive paths according to embodiments of the present disclosure.
Figure 4B:
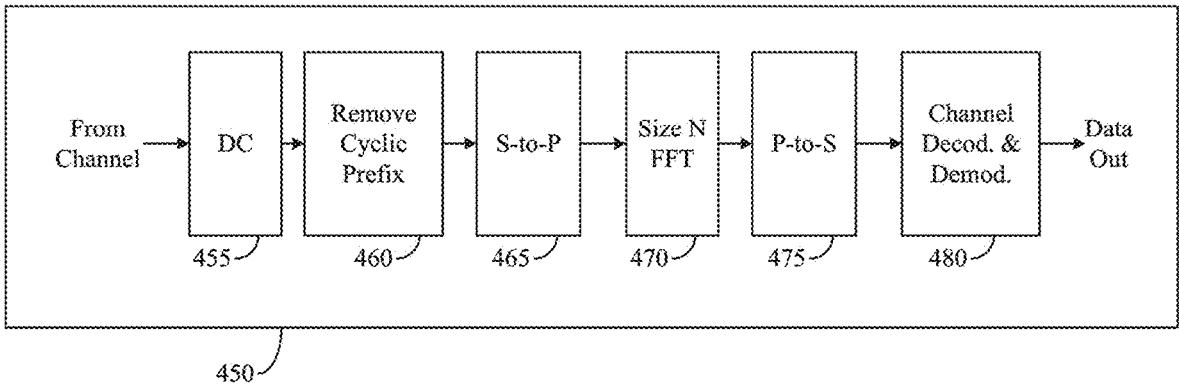

FIGS. 4A and 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the receive path 450 is configured to support frequency selective beam management as described in embodiments of the present disclosure.

The transmit path 400 includes a channel coding and modulation block 205, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 250 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

A transmitted RF signal from the gNB 102 arrives at the UE 116 after passing through the wireless channel, and reverse operations to those at the gNB 102 are performed at the UE 116. The down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The parallel-to-serial block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

In embodiments of the present disclosure, a beam is determined by either a transmission configuration indicator (TCI) state that establishes a quasi-colocation (QCL) relationship between a source RS (e.g., single sideband (SSB) and/or Channel State Information Reference Signal (CSI-RS)) and a target RS or a spatial relation information that establishes an association to a source RS, such as SSB or CSI-RS or SRS. In either case, the ID of the source reference signal identifies the beam. The TCI state and/or the spatial relation reference RS can determine a spatial RX filter for reception of downlink channels at the UE 116, or a spatial TX filter for transmission of uplink channels from the UE 116.

Figure 5A:
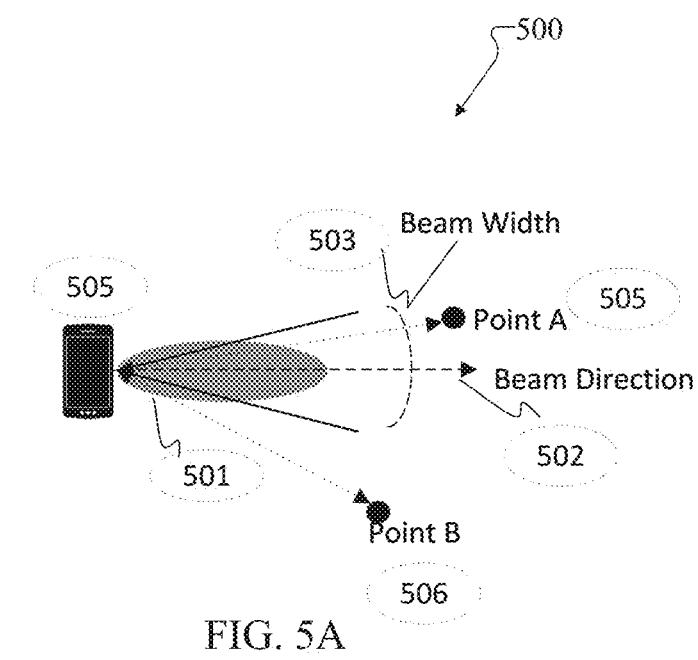
FIG. 5A illustrates an example of a wireless system according to embodiments of the present disclosure.
Figure 5B:
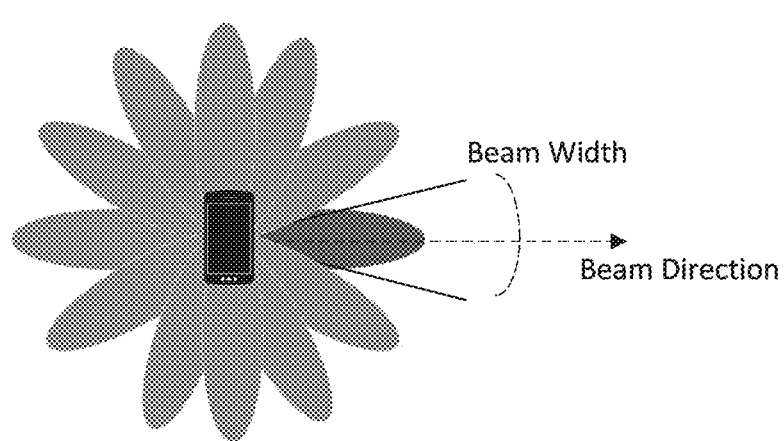
FIG. 5B illustrates an example of a multi-beam operation according to embodiments of the present disclosure.

FIGS. 5A and 5B illustrate an example of a wireless system 500 and an example of a multi-beam operation according to embodiments of the present disclosure. For example, the wireless system may be included in the wireless network 100 in FIG. 1. These examples are for illustration only and other embodiments can be used without departing from the scope of the present disclosure.

As illustrated in FIG. 5A, in a wireless system 500, a beam 501 for a device 504 can be characterized by a beam direction 502 and a beam width 503. For example, the device 504 transmits RF energy in a beam direction and within a beam width. The device 504 receives RF energy in a beam direction and within a beam width. As illustrated in FIG. 5A, a device at point A 505 can receive from and transmit to device 504 as Point A is within a beam width and direction of a beam from device 504. As illustrated in FIG. 5A, a device at point B 406 cannot receive from and transmit to device 504 as Point B is outside a beam width and direction of a beam from device 504. While FIG. 5A, for illustrative purposes, shows a beam in 2-dimensions (2D), it should be apparent to those skilled in the art, that a beam can be in 3-dimensions (3D), where the beam direction and beam width are defined in space.

In a wireless system, a device can transmit and/or receive on multiple beams. This is known as "multi-beam operation" and is illustrated in FIG. 5B. While FIG. 5B, for illustrative purposes, a beam is in 2D, it should be apparent to those skilled in the art, that a beam can be 3D, where a beam can be transmitted to or received from any direction in space.

Figure 6:
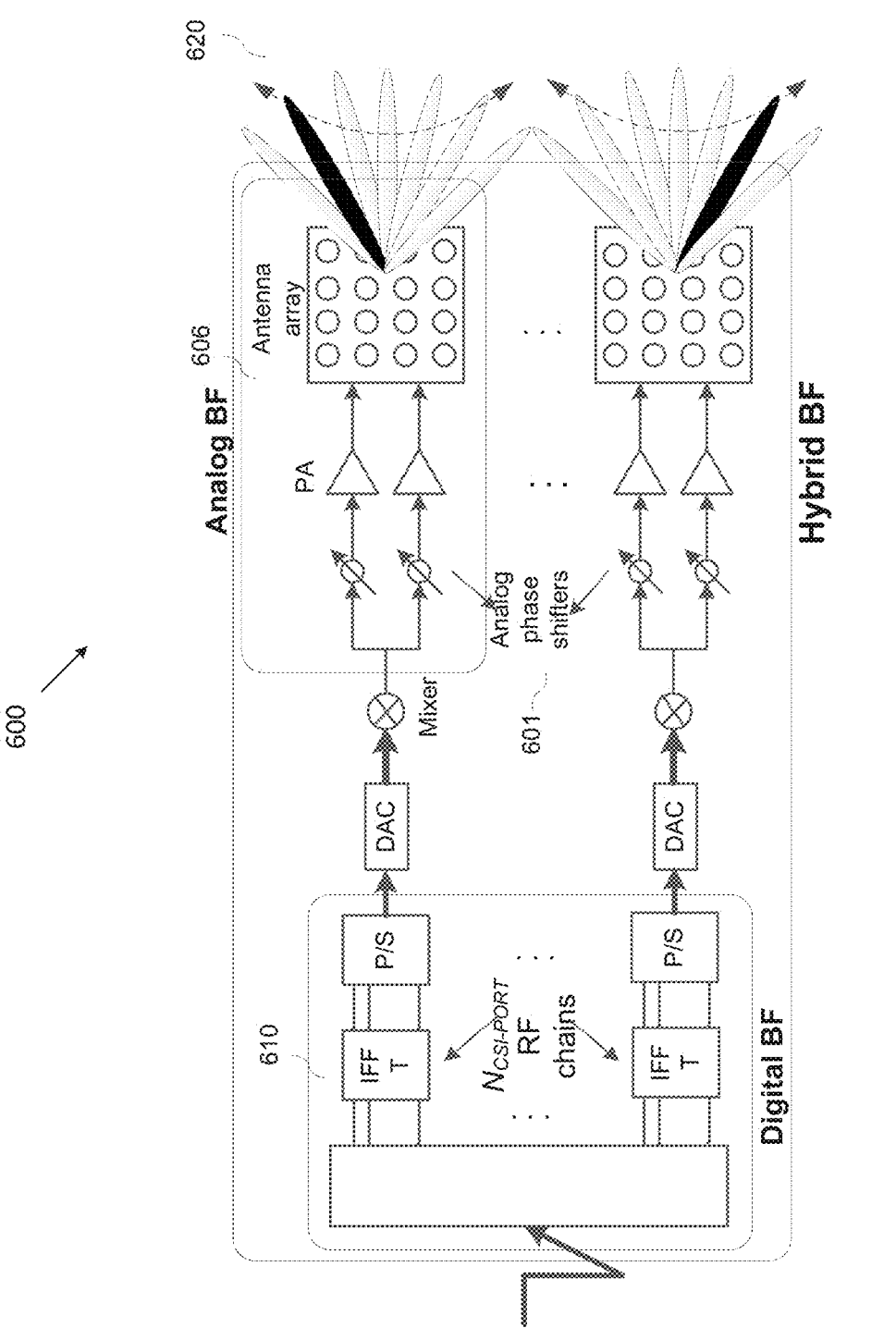
FIG. 6 illustrates an example of a transmitter structure for beamforming according to embodiments of the present disclosure.

FIG. 6 illustrates an example of a transmitter structure 600 for beamforming according to embodiments of the present disclosure. For example, the transmitter structure 600 may be located in the gNB 101 or the UE 116 in FIG. 1. This example is for illustration only and other embodiments can be used without departing from the scope of the present disclosure.

Accordingly, embodiments of the present disclosure recognize that Rel-14 LTE and Rel-15 NR support up to 32 CSI-RS antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 6. Then, one CSI-RS port can be mapped onto a large number of antenna elements that can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or slots/subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase a precoding gain. While analog beams are wideband (hence not frequency-selective), digital precoding can be varied across frequency subbands or resource blocks. Receiver operation can be conceived analogously.

Since the transmitter structure of FIG. 6 utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam. The system of FIG. 6 is also applicable to higher frequency bands such as >52.6 GHz (also termed frequency range 4 or FR4). In this case, the system can employ only analog beams. Due to the O2 absorption loss around 60 GHz frequency (~10 dB additional loss per 100 m distance), a larger number and narrower analog beams (hence a larger number of radiators in the array) are needed to compensate for the additional path loss.

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of this invention. The transmitter structure for beamforming 600 is for illustration only and other embodiments can be used without departing from the scope of the present disclosure.

This disclosure provides various design aspects for frequency-selective beam management using a JPTA system as an example implementation, wherein one or more (analog) beams can be simultaneously transmitted/received over one or more frequency subbands. Specifically, various beam measurement and reporting configurations, beam indication mechanisms, and the corresponding signaling medium/procedures are specified/customized to enable frequency-selective beam management.

The present disclosure recognizes that due to the rising demand for traffic, wireless systems are moving towards higher frequencies of operation, such as millimeter-wave (mm-wave) and terahertz (THz) frequencies, where abundant spectrum is available, but, the higher frequencies also suffer from a high channel propagation loss and therefore require a large antenna array to create sufficient beamforming gain to ensure a sufficient link budget for operation. Thus, these high frequency systems are usually built with a large antenna array at the transmitter and/or the receiver containing many individual antenna elements. At the operating bandwidths of these mm-wave and THz systems, the cost and power consumption of mixed-signal components such as ADCs and/or DACs also grows tremendously. Thus, fully digital transceiver implementations, where each antenna element is fed by a dedicated RF chain, are impractical. To keep the hardware cost and power consumption of such large antenna arrays manageable, typically an analog beamforming or hybrid beamforming architecture is adopted where the large antenna array is fed with a much smaller number of RF chains via the use of analog hardware such as phase-shifters. This reduces the number of mixed-signal components which significantly reduces the cost, size, and power consumption of the transceivers. When transmitting a signal at the transmitter, a combination of digital beamforming before DAC and analog beamforming using the phase-shifters is used to create the overall beam shape in the desired direction. Similarly, when receiving a signal at the receiver, a combination of analog beamforming using phase-shifters and digital beamforming after ADC is used to create the overall beam shape in the desired direction. However conventional approaches usually use a phase-shifter array or a combination of phase-shifters and switches to connect the large antenna array to a few number of RF chains. An example of such an architecture is illustrated in FIG. 7.

Figure 7:
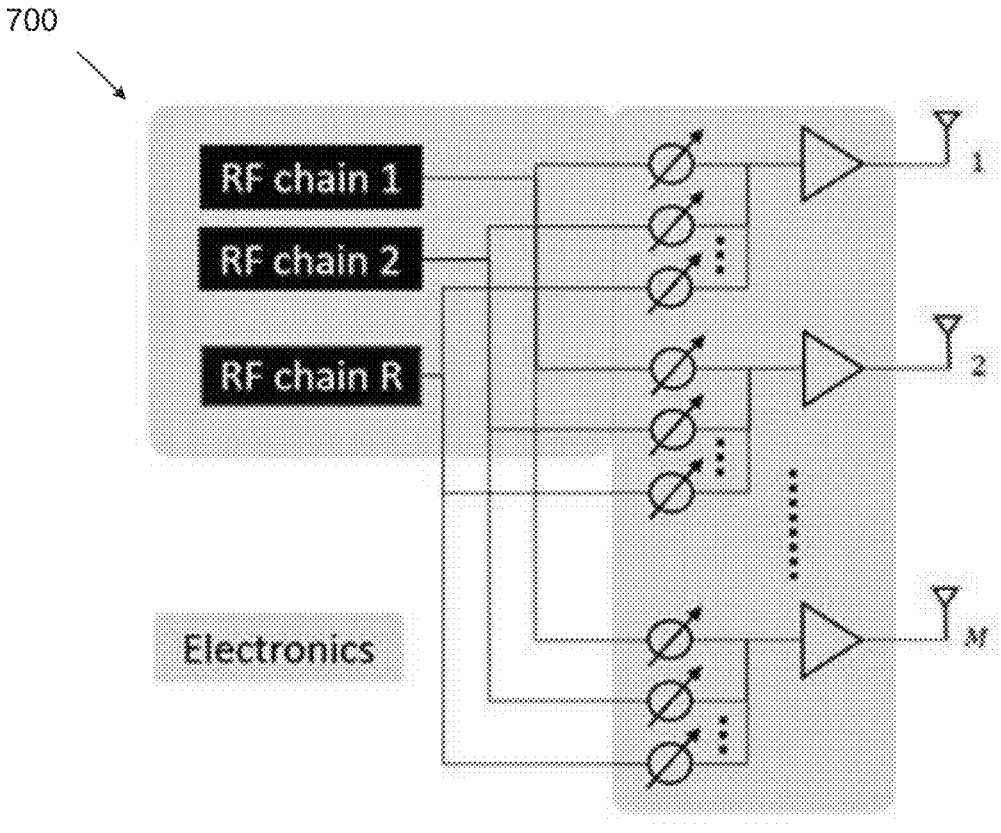
FIG. 7 illustrates an example of phase-shifter based hybrid beamforming array architecture according to embodiments of the present disclosure.

FIG. 7 illustrates an example architecture 700 for phase-shifter based hybrid beamforming array architecture according to embodiments of the present disclosure. For example, the architecture 700 may be located in the gNB 101 or the UE 116 in FIG. 1. This example is for illustration only and other embodiments can be used without departing from the scope of the present disclosure.

With reference to FIG. 7, the case of hybrid beamforming at a BS with a single RF chain, i.e., R=1 is discussed. Note that with M antennas, the maximum possible beamforming gain in any direction is M. For the BS to provide signal coverage to the UEs in the cell, the BS would perform beam sweeping over time for its frequency-flat beams. This example is for illustration only and other embodiments can be used without departing from the scope of the present disclosure.

An alternative to frequency-flat hybrid beamforming is frequency-dependent hybrid beamforming, which we call JPTA beamforming. Note that, here, frequency-dependent beamforming refers to a technique where different components of the input signal may encounter a differently shaped analog beam based on their frequency.

Figure 8:
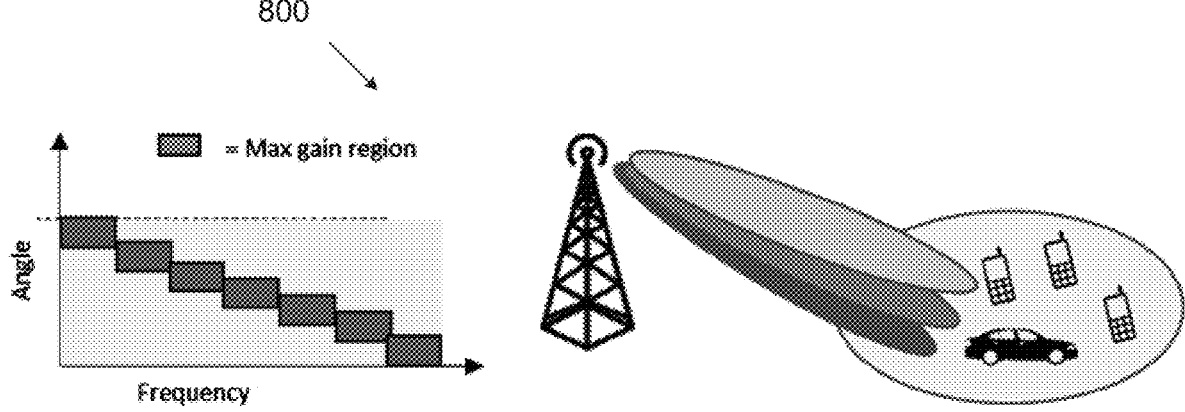
FIG. 8 illustrates an example of joint phase time array (JPTA) beamforming according to embodiments of the present disclosure.

FIG. 8 illustrates an example of system 800 for JPTA beamforming according to embodiments of the present disclosure. For example, the system 800 may be located in the wireless network 100 in FIG. 1. This example is for illustration only and other embodiments can be used without departing from the scope of the present disclosure.

In one embodiment of JPTA beamforming, the maximum gain region of the beam sweeps over an angle range as the signal frequency varies. At any signal frequency f, the desired beam creates the maximum possible array-gain in one angular direction $\theta(f)$. As f varies linearly over the system bandwidth, the angular direction $\theta(f)$ also sweeps linearly over a certain angular region $[\theta_0 - \Delta\theta/2, \theta_0 + \Delta\theta/2]$, as shown in FIG. 8. In this disclosure, we assume such behavior of JPTA beamforming; however, it should be noted that the embodiments in this disclosure can be applied to other behaviors of JPTA beamforming as well. This example is for illustration only and other embodiments can be used without departing from the scope of the present disclosure.

FIG. 9 illustrates an example of a JPTA array architecture 900 according to embodiments of the present disclosure. For example, the architecture 900 may be located in the gNB 101 or the UE 116 in FIG. 1. This example is for illustration only and other embodiments can be used without departing from the scope of the present disclosure.

In one embodiment, we provides a layout with a single base-station (BS) serving many users in its coverage area and operating with a system bandwidth W around a center frequency $f_0$. The BS is assumed to have a uniform linear antenna array having M elements, and $N_{RF}=1$ RF chain. Note that the disclosure can be directly extended to planar array configurations. The antenna spacing is half-wavelength at the center frequency $f_0$. Each of the M antennas has a dedicated phase-shifter, and they are connected to the single RF chain via a network of $N \leq M$ Time Division Duplexing (TTDs) as shown in FIG. 9. Here P is a fixed M×N mapping matrix, where each row m has one non-zero entry and determines which of the N TTDs antenna m is connected to. The TTDs are assumed to be configurable, with a delay variation range of $0 \leq \tau \leq \kappa W$, where $\kappa$ is a design parameter to be selected. The phase-shifters are assumed to have unit magnitude and have arbitrarily reconfigurable phase $-\pi \leq \phi < \pi$. Transmission in both uplink and downlink directions is performed using OFDM with K subcarriers indexed as $$\mathcal{K} = \left\{ \left\lfloor \frac{1-K}{2} \right\rfloor, \dots, \left\lfloor \frac{K-1}{2} \right\rfloor \right\}.$$

Then, the M×1 downlink TX signal on sub-carrier $k \in K$ for a representative OFDM symbol can be expressed as $$x_k = \frac{1}{\sqrt{M}} \begin{bmatrix} e^{j\varphi_1} & \cdots & 0 \\ \vdots & \ddots & \vdots \\ 0 & \cdots & e^{j\varphi_M} \end{bmatrix} P \begin{bmatrix} e^{j2\pi f_k \tau_1} \\ \vdots \\ e^{j2\pi f_k \tau_N} \end{bmatrix} \alpha_k s_k = TPd_k \alpha_k s_k$$

where $s_k$ and $a_k$ are the scalar data and digital beamforming on the k-th subcarrier, $f_k$ is the frequency of the k-th sub-carrier (including the carrier frequency), $\tau_n$ is the delay of the n-th TTD and $\phi_m$ is the phase of the m phase-shifter connected to the m-th antenna. Note that from the equation above the total transmit power of the BS can be given by $P_{sum}=\Sigma_{k\in K}|a_k|^2$. Note that for this JPTA architecture, the effective downlink unit-norm analog beamformer on sub-carrier k is $e_k=TPd_k$, where the M×M diagonal matrix T captures the effect of phase-shifters and the N×1 vector $d_k$ captures the effect of TTDs. It can be shown that the same beamformer is also applicable at the BS for an uplink scenario.

It is evident that when JPTA beamforming implementation is utilized, a significant departure from analog-based beam management occurs. That is, while analog beam management applies one analog beam for the entire system bandwidth or bandwidth part, JPTA beamforming implementation allows the system to use different analog beams for different parts of the system bandwidth or bandwidth part which amounts to "frequency-selective" beam management (FSBM). Therefore, there is a need for enabling frequency-selective beam management operation wherein different analog beams (associated with TCI states, source RS resources, and/or measurement RS resources) can be utilized for different parts/portions of the system bandwidth or bandwidth parts.

A UE could be configured by the network 130 one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency sub-bands. The UE could be indicated by the network that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM.

In one example, the UE 116 could be configured by the network 130 with one or more RS resources for frequency-selective beam measurement for FSBM, wherein one RS resource (e.g., corresponding to a SSB resource index or a non-zero power (NZP) CSI-RS resource configuration index) could correspond to a set of one or more frequency-selective beams probing over one or more frequency sub-bands. The UE 116 could be indicated by the network 130 that the one or more RS resources are configured for frequency-selective beam measurement for FSBM. this indication could be via higher layer radio resource control (RRC) signaling/parameter and/or medium access control (MAC) control element (CE) command and/or dynamic downlink control information (DCI) based signaling. For instance, a higher layer parameter, e.g., denoted by FreqSelectiveBeamMeasurement, could be indicated/provided in CSI-ResourceConfig to turn on/off the frequency-selective beam measurement for FSBM. The UE 116 could be configured by the network 130, e.g., in a CSI resource setting provided by CSI-ResourceConfig, a CSI resource set (e.g., provided by CSI-SSB-ResourceSet or NZP-CSI-RS-ResourceSet) comprising K≥1 CSI-RS resources (e.g., SSB resources or NZP CSI-RS resources) for FSBM. In particular, the k-th CSI-RS resource in the resource set could correspond to a set of $N_k\geq 1$ beams (and therefore, the corresponding set of $N_k\geq 1$ frequency subbands), where k=1, . . . , K. In the present disclosure, the set of $N_k\geq 1$ frequency-selective beams can also be referred to as a frequency-selective multi-beam.

For a CSI-RS resource configured in the resource set, the UE 116 could be indicated/configured by the network 130 corresponding/associated TTD setting. This indication/configuration could be via higher layer RRC signaling (e.g., indicated/configured in the same CSI resource setting provided by CSI-ResourceConfig) and/or medium access control (MAC) control element (CE) command and/or dynamic DCI based signaling. In the present disclosure, the TTD setting could comprise at least one of the following examples.

In one example, one or more of the TTD delays and/or indexes of the one or more of the TTD delays among all the TTD delays for the CSI-RS resource and/or $N_k$: for the k-th (k=1, . . . , K) CSI-RS resource configured in the resource set, the corresponding $N_k$ TTD delays are $\tau_{1,k}, \tau_{2,k}, \ldots, \tau_{Nk,k}$ (depicted in FIG. 9).

In another example a reference TTD delay $\tau_0$ and/or one or more scaling factors for one or more of the TTD delays with respect to the reference TTD delay and/or indexes of the one or more of the TTD delays among all the TTD delays for the CSI-RS resource and/or $N_k$: for the k-th (k=1, . . . , K) CSI-RS resource configured in the resource set, the corresponding $N_k$ TTD delays are $\tau_{1,k}, \tau_{2,k}, \ldots, \tau_{Nk,k}$ (depicted in FIG. 9). For this case, a set of scaling factors $\{a_{1,k}, a_{2,k}, \ldots, a_{Nk,k}\}$ for the $N_k$ TTD delays could be determined as $\{\tau_{1,k}/\tau_0, \tau_{2,k}/\tau_0, \ldots, \tau_{Nk,k}/\tau_0\}$.

In yet another example, a reference TTD delay and/or the index of the reference TTD delay among all the TTD delays for the CSI-RS resource and/or one or more scaling factors for one or more of the TTD delays with respect to the reference TTD delay and/or indexes of the one or more of the TTD delays among all the TTD delays for the CSI-RS resource and/or $N_k$: for the k-th (k=1, . . . , K) CSI-RS resource configured in the resource set, the corresponding $N_k$ TTD delays are $\tau_{1,k}, \tau_{2,k}, \ldots, \tau_{Nk,k}$ (depicted in FIG. 9). If the reference TTD delay corresponds to $\tau_{1,k}$, a set of scaling factors $\{a_{1,k}, a_{2,k}, \ldots, a_{Nk,k}\}$ for the $N_k$ TTD delays could be determined as $\{1, \tau_{2,k}/\tau_{1,k}, \ldots, \tau_{Nk,k}/\tau_{1,k}\}$.

In yet another example, a reference TTD delay $\tau_0$ and/or differences between one or more of the TTD delays and the reference TTD delay and/or indexes of the one or more of the TTD delays among all the TTD delays for the CSI-RS resource and/or $N_k$: for the k-th (k=1, . . . , K) CSI-RS resource configured in the resource set, the corresponding $N_k$ TTD delays are $\tau_{1,k}, \tau_{2,k}, \ldots, \tau_{Nk,k}$ (depicted in FIG. 9). For this case, a set of differences $\{d_{1,k}, d_{2,k}, \ldots, d_{Nk,k}\}$ between the $N_k$ TTD delays and the reference TTD delay $\tau_0$ could be determined as $\{\tau_{1,k}-\tau_0, \tau_{2,k}-\tau_0, \ldots, \tau_{Nk,k}-\tau_0\}$.

In yet another example, a reference TTD delay and/or the index of the reference TTD delay among all the TTD delays for the CSI-RS resource and/or differences between one or more of the TTD delays and the reference TTD delay and/or indexes of the one or more of the TTD delays among all the TTD delays for the CSI-RS resource and/or $N_k$: for the k-th (k=1, . . . , K) CSI-RS resource configured in the resource set, the corresponding $N_k$ TTD delays are $\tau_{1,k}, \tau_{2,k}, \ldots, \tau_{Nk,k}$ (depicted in FIG. 9). If the reference TTD delay corresponds to $\tau_{1,k}$, a set of differences $\{d_{1,k}, d_{2,k}, \ldots, d_{Nk,k}\}$ for the $N_k$ TTD delays could be determined as $\{0, \tau_{2,k}-\tau_{1,k}, \ldots, \tau_{Nk,k}-\tau_{1,k}\}$.

In yet another example, a reference TTD delay and/or the index of the reference TTD delay among all the TTD delays for the CSI-RS resource and/or the common difference between any two adjacent TTD delays and/or indexes of the one or more of the TTD delays among all the TTD delays for the CSI-RS resource and/or $N_k$: for the k-th (k=1, . . . , K) CSI-RS resource configured in the resource set, the corresponding $N_k$ TTD delays are $\tau_{1,k}, \tau_{2,k}, \ldots, \tau_{Nk,k}$ (depicted in FIG. 9). If $\tau_{j,k}-\tau_{i,k}=\Delta_k$ for all j−i=1, j, i∈{1, . . . , $N_k$}, the common difference between any two adjacent TTD delays is $\Delta_k$.

In yet another example, a reference TTD delay and/or the index of the reference TTD delay among all the TTD delays for the CSI-RS resource and/or the common scaling factor between any two adjacent TTD delays and/or indexes of the one or more of the TTD delays among all the TTD delays for the CSI-RS resource and/or $N_k$: for the k-th (k=1, . . . , K) CSI-RS resource configured in the resource set, the corresponding $N_k$ TTD delays are $\tau_{1,k}, \tau_{2,k}, \ldots, \tau_{Nk,k}$ (depicted in FIG. 9). If $\tau_{j,k}/\tau_{i,k}=\beta_k$ for all j−i=1, j, i∈{1, . . . , $N_k$}, the common scaling factor between any two adjacent TTD delays is $\beta_k$.

There are various means to indicate/configure K TTD settings, e.g., in a CSI resource setting/CSI resource set, and associate/map them to the K CSI-RS resources indicated/configured in the CSI resource setting/CSI resource set for FSBM.

For example, the set of K TTD settings could be explicitly indicated/included in the CSI resource setting provided by CSI-ResourceConfig and/or the CSI resource set (e.g., provided by CSI-SSB-ResourceSet or NZP-CSI-RS-Resource-Set) and/or the higher layer parameter that configures/provides resource allocation for a CSI-RS resource (e.g., CSI-RS-ResourceMapping or CSI-FrequencyOccupation) and/or one or more MAC CE commands and/or one or more DCIs (e.g., via one or more new DCI fields or repurposing one or more bits/codepoints of one or more existing DCI fields), e.g., the K TTD settings are one-to-one mapped to the K CSI-RS resources indicated/configured in the same CSI resource setting/CSI resource set such that the first TTD setting is associated/mapped to the first CSI-RS resource, the second TTD setting is associated/mapped to the second CSI-RS resource, and so on, and the K-th TTD setting is associated/mapped to the K-th CSI-RS resource.

For another example, the set of K TTD settings could be explicitly indicated/included in the CSI resource setting provided by CSI-ResourceConfig and/or the CSI resource set (e.g., provided by CSI-SSB-ResourceSet or NZP-CSI-RS-ResourceSet) and/or the higher layer parameter that configures/provides resource allocation for a CSI-RS resource (e.g., CSI-RS-ResourceMapping or CSI-FrequencyOccupation) and/or one or more MAC CE commands and/or one or more DCIs (e.g., via one or more new DCI fields or repurposing one or more bits/codepoints of one or more existing DCI fields). Furthermore, the UE 116 could be indicated/configured/provided by the network 130, via higher layer RRC signaling/parameter and/or MAC CE command and/or dynamic DCI based signaling, the association/mapping between the K TTD settings and the K CSI-RS resources indicated/configured, e.g., in the same CSI resource setting/CSI resource set.

For yet another example, the higher layer parameter that configures a CSI-RS resource (e.g., NZP-CSI-RS-Resource) or the higher layer parameter that configures/provides resource allocation for a CSI-RS resource (e.g., CSI-RS-ResourceMapping or CSI-FrequencyOccupation) could explicitly indicate/include the associated/corresponding TTD setting as discussed above.

For yet another example, a MAC CE command could indicate a TTD setting for a CSI-RS resource. For this case, the corresponding CSI-RS resource ID could be included/provided in the MAC CE command.

For yet another example, a MAC CE command could indicate the K TTD settings each for a CSI-RS resource configured/indicated in a CSI resource set for FSBM. The set of K TTD settings provided in the MAC CE command are one-to-one mapped to the K CSI-RS resources indicated/configured in the CSI resource setting/CSI resource set such that the first TTD setting in the MAC CE command could be associated/mapped to the first CSI-RS resource, the second TTD setting in the MAC CE command could be associated/mapped to the second CSI-RS resource, and so on, and the K-th TTD setting in the MAC CE command could be associated/mapped to the K-the CSI-RS resource. Alternatively, the UE 116 could be indicated/configured/provided by the network 130, via higher layer RRC signaling/parameter and/or MAC CE command and/or dynamic DCI based signaling, the association/mapping between the K TTD settings in the MAC CE command and the K CSI-RS resources indicated/configured in the CSI resource set. For this example, the MAC CE command could also include/provide/indicate one or more (e.g., K) CSI-RS resource IDs/indexes each corresponding/associated to one of the (e.g., K) TTD settings.

For yet another example, one or more new DCI fields could be introduced in a DCI format to indicate one or more of the K TTD settings. Alternatively, one or more bits or codepoints of one or more existing DCI fields in a DCI format could be repurposed to indicate one or more of the K TTD settings. The TTD setting(s) indicated in the DCI and the CSI-RS resource(s) indicated/configured for FSBM could be one-to-one mapped according to one or more examples described herein.

For yet another example, one or more of the above described design examples can be combined to indicate/configure one or more of the K TTD settings, and associate/map them to one or more of the K CSI-RS resources.

For another example, a UE could be configured by the network 130 one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM. This indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. For a CSI-RS resource configured in the resource set for FSBM, the UE 116 could be indicated/configured by the network 130 the corresponding/associated frequency subbands including their bandwidths/sizes, starting RBs, etc. This indication/configuration could be via higher layer RRC signaling (e.g., indicated/configured in the same CSI resource setting/set provided by CSI-ResourceConfig/CSI-SSB-ResourceSet/NZP-CSI-RS-ResourceSet) and/or MAC CE command and/or dynamic DCI based signaling. There are various means to indicate/configure the frequency subbands corresponding/associated with the CSI-RS resource.

For example, the higher layer parameter that configures a CSI-RS resource (e.g., the k-th CSI-RS resource in the resource set), e.g., NZP-CSI-RS-Resource, could indicate/include $N_k$ CSI-RS resource mapping configurations each for a frequency subband. A CSI-RS resource mapping configuration (e.g., provided by CSI-RS-ResourceMapping) could contain/comprise at least a frequency subband index, a frequency domain allocation of REs for a frequency subband (e.g., provided by frequencyDomainAllocation), and a frequency domain allocation of RBs for a frequency subband (e.g., provided by CSI-FrequencyOccupation). The frequency domain allocation of RBs for a frequency subband could contain/comprise at least a starting RB (provided by startingRB) and a number of PRBs (provided by nrof-RBs) across which the corresponding frequency subband spans. For this case, the higher layer parameter NZP-CSI-RS-Resource that indicates/provides the $N_k$ CSI-RS resource mapping configurations could also include/provide/indicate the $N_k$ frequency subband indexes each associated/mapped to a CSI-RS resource mapping configuration indicated/configured therein. Alternatively, one or more of the above discussed $N_k$ CSI-RS resource mapping configurations could be indicated in one or more DCIs, via one or more new DCI fields or by repurposing one or more bits/codepoints of one or more existing DCI fields in the DCI(s). Optionally, one or more of the above discussed $N_k$ CSI-RS resource mapping configurations could be indicated/provided/included in one or more MAC CE commands. for this case, a MAC CE command could also include/indicate/provide the corresponding CSI-RS resource ID and/or frequency subband index(es). The $N_k$ CSI-RS resource mapping configurations discussed above and the $N_k$ frequency subbands for the k-th CSI-RS resource in the resource set could be one-to-one mapped. For instance, the first CSI-RS resource mapping configuration could correspond to the first frequency subband, the second CSI-RS resource mapping configuration could correspond to the second frequency subband, and so on, and the $N_k$-th CSI-RS resource mapping configuration could correspond to the $N_k$-th frequency subband. Alternatively, the UE 116 could be indicated/provided by the network 130, e.g., via higher layer RRC signaling/parameter and/or MAC CE command and/or dynamic DCI based signaling, the mapping/association between the $N_k$ CSI-RS resource mapping configurations and the $N_k$ frequency subbands configured for the k-th CSI-RS resource in the CSI resource set for FSBM.

For another example, the higher layer parameter that provides a CSI-RS resource mapping configuration for a CSI-RS resource (e.g., the k-th CSI-RS resource in the resource set), e.g., CSI-RS-ResourceMapping, could indicate/include $N_k$ frequency domain allocations of REs each for a frequency subband and provided by frequencyDomainAllocation. Furthermore, the CSI-RS resource mapping configuration provided by CSI-RS-ResourceMapping could also indicate/include $N_k$ frequency domain allocations of RBs each for a frequency subband and provided by CSI-FrequencyOccupation. Each frequency domain allocation of RBs for a frequency subband, and therefore, the corresponding higher layer parameter CSI-FrequencyOccupation, could contain/comprise at least a starting RB (provided by startingRB) and a number of PRBs (provided by nrofRBs) across which the corresponding frequency subband spans. For this case, the higher layer parameter CSI-RS-ResourceMapping could also include/provide/indicate $N_k$ frequency subband indexes each associated/mapped to a frequency domain allocation of REs and/or a frequency domain allocation of RBs indicated/configured therein. Or the higher layer parameter frequencyDomainAllocation or CSI-FrequencyOccupation could provide/indicate/include a frequency subband index. Alternatively, one or more of the above discussed $N_k$ frequency domain allocations of REs and/or one or more of the above discussed $N_k$ frequency domain allocations of RBs could be indicated in one or more DCIs, via one or more new DCI fields or by repurposing one or more bits/codepoints of one or more existing DCI fields in the DCI(s). Optionally, one or more of the above discussed $N_k$ frequency domain allocations of REs and/or one or more of the above discussed $N_k$ frequency domain allocations of RBs could be indicated/provided/included in one or more MAC CE commands. For this case, a MAC CE command could also include/indicate/provide the corresponding CSI-RS resource ID and frequency subband index(es). The $N_k$ frequency domain allocations of REs/RBs discussed above and the $N_k$ frequency subbands for the k-th CSI-RS resource in the resource set could be one-to-one mapped. For instance, the first frequency domain allocations of REs/RBs could correspond to the first frequency subband, the second frequency domain allocations of REs/RBs could correspond to the second frequency subband, and so on, and the $N_k$-th frequency domain allocations of REs/RBs could correspond to the $N_k$-th frequency subband. Alternatively, the UE 116 could be indicated/provided by the network 130, e.g., via higher layer RRC signaling/parameter and/or MAC CE command and/or dynamic DCI based signaling, the mapping/association between the $N_k$ frequency domain allocations of REs/RBs and the $N_k$ frequency subbands configured for the k-th CSI-RS resource in the CSI resource set for FSBM.

For yet another example the higher layer parameter frequencyDomainAllocation could indicate/include $N_k$ frequency domain allocations of REs each for a frequency subband. In addition, the higher layer parameter CSI-FrequencyOccupation could indicate/include $N_k$ frequency domain allocations of RBs each for a frequency subband. For instance, the higher layer parameter CSI-FrequencyOccupation could provide $N_k$ starting RBs each for a frequency subband and provided by startingRB, and/or $N_k$ nrofRBs' each providing the number of PRBs across which the corresponding frequency subband spans. For this case, the higher layer parameter frequencyDomainAllocation or CSI-FrequencyOccupation could also include/provide/indicate $N_k$ frequency subband indexes each associated/mapped to a frequency domain allocation of REs and/or a frequency domain allocation of RBs indicated/configured therein. Alternatively, one or more of the above discussed $N_k$ frequency domain allocations of REs and/or one or more of the above discussed $N_k$ frequency domain allocations of RBs (including $N_k$ startingRB's and/or $N_k$ nrofRBs') could be indicated in one or more DCIs, via one or more new DCI fields or by repurposing one or more bits/codepoints of one or more existing DCI fields in the DCI(s). Optionally, one or more of the above discussed $N_k$ frequency domain allocations of REs and/or one or more of the above discussed $N_k$ frequency domain allocations of RBs (including $N_k$ startingRB's and/or $N_k$ nrofRBs') could be indicated/provided/included in one or more MAC CE commands. For this case, a MAC CE command could also include/indicate/provide the corresponding CSI-RS resource ID and/or frequency subband index(es). The $N_k$ frequency domain allocations of REs/RBs (e.g., $N_k$ startingRB's and/or $N_k$ nrofRBs') discussed above and the $N_k$ frequency subbands for the k-th CSI-RS resource in the resource set could be one-to-one mapped. For instance, the first frequency domain allocations of REs/RBs (e.g., the first startingRB and/or the first nrof-RBs) could correspond to the first frequency subband, the second frequency domain allocations of REs/RBs (e.g., the second startingRB and/or the second nrofRBs) could correspond to the second frequency subband, and so on, and the $N_k$-th frequency domain allocations of REs/RBs (e.g., the $N_k$-th startingRB and/or the $N_k$-th nrofRBs) could correspond to the $N_k$-th frequency subband. Alternatively, the UE 116 could be indicated/provided by the network 130, e.g., via higher layer RRC signaling/parameter and/or MAC CE command and/or dynamic DCI based signaling, the mapping/association between the $N_k$ frequency domain allocations of REs/RBs (e.g., $N_k$ startingRB's and/or $N_k$ nrofRBs') and the $N_k$ frequency subbands configured for the k-th CSI-RS resource in the CSI resource set for FSBM.

For yet another example, the UE 116 could receive from the network 130, via higher layer RRC signaling (e.g., in NZP-CSI-RS-Resource, CSI-RS-ResourceMapping or CSI-FrequencyOccupation) and/or MAC CE command and/or dynamic DCI based signaling, one or more bitmaps (e.g., $N_k$ bitmaps) each for a frequency subband corresponding/associated to the CSI-RS resource (e.g., the k-th CSI-RS resource in the resource set). Each bit position/entry in a bitmap could correspond to a PRB or PRB index among all the PRBs across which the corresponding CSI-RS resource spans. If a bit position/entry of a bitmap is set to '1' (or '0'), the corresponding PRB or PRB index is allocated for the frequency subband corresponding/associated to the bitmap. A bitmap for a frequency subband could contain/comprise more than one bit positions/entries set to '1' (or '0'). Different bitmaps for a CSI-RS resource could have the same bit position(s)/entry(s) set to '1' (or '0') meaning that different frequency subbands for a CSI-RS resource could be overlapped in frequency. The higher layer parameter(s), e.g., NZP-CSI-RS-Resource, CSI-RS-ResourceMapping, or CSI-FrequencyOccupation, that provides the one or more bitmaps could also include/provide/indicate $N_k$ frequency subband indexes each associated/mapped to a bitmap. If the frequency subband size/allocation for a CSI-RS resource (e.g., the one or more bitmaps discussed above) is indicated via one or more DCIs, one or more new DCI fields can be introduced to indicate the one or more bitmaps. Alternatively, one or more bits/codepoints of one or more existing DCI fields could be repurposed to indicate the one or more bitmaps. If the frequency subband size/allocation for a CSI-RS resource (e.g., the one or more bitmaps discussed above) is indicated in one or more MAC CE commands, a MAC CE command could also indicate/provide/include the corresponding CSI-RS resource ID and/or frequency subband index(es). The $N_k$ bitmaps discussed above and the $N_k$ frequency subbands for the k-th CSI-RS resource in the resource set could be one-to-one mapped. For instance, the first bitmap could correspond to the first frequency subband, the second bitmap could correspond to the second frequency subband, and so on, and the $N_k$-th bitmap could correspond to the $N_k$-th frequency subband. Alternatively, the UE 116 could be indicated/provided by the network 130, e.g., via higher layer RRC signaling/parameter and/or MAC CE command and/or dynamic DCI based signaling, the mapping/association between the $N_k$ bitmaps and the $N_k$ frequency subbands configured for the k-th CSI-RS resource in the CSI resource set for FSBM.

For yet another example, the UE 116 could receive from the network 130, via higher layer RRC signaling (e.g., in NZP-CSI-RS-Resource, CSI-RS-ResourceMapping or CSI-FrequencyOccupation) and/or MAC CE command and/or dynamic DCI based signaling, a bitmap for one or more of the frequency subbands corresponding/associated to the CSI-RS resource (e.g., the k-th CSI-RS resource in the resource set). Each bit position/entry in the bitmap could correspond to a PRB or PRB index among all the PRBs across which the corresponding CSI-RS resource spans.

Furthermore, each bit position/entry in the bitmap could be mapped/associated with a frequency subband for the CSI-RS resource. The mapping/association between the bit positions/entries in the bitmap and the frequency subbands for the CSI-RS resource could be fixed. For instance, the bitmap can be partitioned into $N_k$ parts each comprising one or more bit positions/entries. For this case, the first part of the bitmap could correspond to the first frequency subband for the CSI-RS resource, the second part of the bitmap could correspond to the second frequency subband for the CSI-RS resource, and so on, and the $N_k$-th part of the bitmap could correspond to the $N_k$-th frequency subband for the CSI-RS resource. The UE 116 could be provided/indicated/configured by the network 130, via higher layer RRC signaling and/or MAC CE command and/or dynamic DCI based signaling, how the bitmap is partitioned. Alternatively, the UE 116 could be provided/indicated/configured by the network 130, via higher layer RRC signaling and/or MAC CE command and/or dynamic DCI based signaling, the mapping/association between the bit positions/entries in the bitmap and the frequency subbands for the CSI-RS resource. If a bit position/entry of a bitmap is set to '1' (or '0'), the corresponding PRB or PRB index is allocated for the frequency subband corresponding/associated with the bit position/entry. A bitmap for a CSI-RS resource could contain/comprise more than one bit positions/entries set to '1' (or '0'). The higher layer parameter(s), e.g., NZP-CSI-RS-Resource, CSI-RS-ResourceMapping, or CSI-FrequencyOccupation, that provides the bitmap could also include/provide/indicate $N_k$ frequency subband indexes each associated/mapped to one or more bit positions/entries (e.g., a part discussed above) in the bitmap. If the frequency subband size/allocation for a CSI-RS resource (e.g., the bitmap discussed above) is indicated via one or more DCIs, one or more new DCI fields can be introduced to indicate the bitmap. Alternatively, one or more bits/codepoints of one or more existing DCI fields could be repurposed to indicate the bitmap. If the frequency subband size/allocation for a CSI-RS resource (e.g., the bitmap discussed above) is indicated in one or more MAC CE command(s), a MAC CE command could also indicate/provide/include the corresponding CSI-RS resource ID and/or frequency subband index(es).

For yet another example, the UE 116 could receive from the network 130 one or more MAC CE activation commands (e.g., $N_k$ MAC CE activation commands) each for a frequency subband corresponding/associated to the CSI-RS resource (e.g., the k-th CSI-RS resource in the resource set). Each MAC CE activation command could activate one or more PRBs or PRB indexes—from all the PRBs across which the corresponding CSI-RS resource spans—for the corresponding/associated frequency subband. For this case, each MAC CE activation command could include/provide/indicate the corresponding CSI-RS resource ID and/or frequency subband index(es).

For yet another example, the UE 116 could receive from the network 130 a MAC CE activation command activating one or more PRBs or PRB indexes—from all the PRBs across which the corresponding CSI-RS resource spans—for one or more of the frequency subbands corresponding/associated to a CSI-RS resource. For instance, for the k-th CSI-RS resource in the resource set, the MAC CE activation command could activate one or more PRBs or PRB indexes—from all the PRBs across which the corresponding CSI-RS resource spans—for the first frequency subband corresponding/associated to the CSI-RS resource, one or more PRBs or PRB indexes—from all the PRBs across which the corresponding CSI-RS resource spans—for the second frequency subband corresponding/associated to the CSI-RS resource, and so on, and one or more PRBs or PRB indexes—from all the PRBs across which the corresponding CSI-RS resource spans—for the $N_k$-th frequency subband corresponding/associated to the CSI-RS resource. For this case, the MAC CE activation command could include/provide/indicate the corresponding CSI-RS resource ID.

For yet another example, the frequency subbands for the CSI-RS resource—e.g., the $N_k$ frequency subbands for the k-th CSI-RS resource in the resource set—could have the same bandwidth/size. For this case, the UE 116 could be provided by the network 130, via higher layer RRC signaling (e.g., in NZP-CSI-RS-Resource, CSI-RS-ResourceMapping or CSI-FrequencyOccupation) and/or MAC CE command and/or dynamic DCI based signaling, a common frequency subband bandwidth/size (e.g., in number of PRBs) and/or $N_k$ and/or one or more starting RBs of one or more frequency subbands. In addition, the frequency subbands for the CSI-RS resource—e.g., the $N_k$ frequency subbands for the k-th CSI-RS resource in the resource set—could equally divide the total PRBs across which the corresponding CSI-RS resource spans. For this case, the UE 116 could be provided by the network 130, via higher layer RRC signaling (e.g., in NZP-CSI-RS-Resource, CSI-RS-ResourceMapping or CSI-FrequencyOccupation) and/or MAC CE command and/or dynamic DCI based signaling, $N_k$ and/or one or more starting RBs of one or more frequency subbands.

For yet another example, the higher layer parameter that configures a CSI resource set for FSBM, e.g., CSI-SSB-ResourceSet or NZP-CSI-RS-ResourceSet, could include/indicate K sets of frequency domain resource allocation parameters each corresponding/associated to a CSI-RS resource configured therein. A set of frequency domain resource allocation parameters could comprise at least one or more (e.g., $N_k$) frequency domain allocations of REs (e.g., each provided by frequencyDomainAllocation) for one or more frequency subbands corresponding/associated to a CSI-RS resource (e.g., the k-th CSI-RS resource in the resource set) and one or more (e.g., $N_k$) frequency domain allocations of RBs (e.g., each provided by CSI-Frequency-Occupation, which comprises at least a starting RB provided by startingRB and the number of PRBs provided by nrofRBs across which the corresponding frequency subband spans) for one or more frequency subbands corresponding/associated to a CSI-RS resource (e.g., the k-th CSI-RS resource in the resource set). In one example, the K sets of frequency domain resource allocation parameters and the K CSI-RS resources configured in the same CSI resource set are one-to-one mapped. For instance, the first set of frequency domain resource allocation parameters could correspond to the first CSI-RS resource in the CSI resource set, the second set of frequency domain resource allocation parameters could correspond to the second CSI-RS resource in the CSI resource set, and so on, and the K-th set of frequency domain resource allocation parameters could correspond to the K-th CSI-RS resource in the CSI resource set. In another example, the UE 116 could be indicated/provided by the network 130, e.g., via higher layer RRC signaling/parameter and/or MAC CE command and/or dynamic DCI based signaling, the mapping/association between the K sets of frequency domain resource allocation parameters and the K CSI-RS resources configured in the same CSI resource set. Optionally, the higher layer parameter(s), e.g., CSI-SSB-ResourceSet or NZP-CSI-RS-ResourceSet, that configures a CSI resource set and provides/indicates the K sets of frequency domain resource allocation parameters could also include/provide/indicate the K CSI-RS resource IDs/indexes each associated/mapped to a set of frequency domain resource allocation parameters discussed above. Alternatively, one or more of the above discussed K sets of frequency domain resource allocation parameters could be indicated in one or more DCIs, via one or more new DCI fields or by repurposing one or more bits/codepoints of one or more existing DCI fields in the DCI(s). One or more of the above discussed K sets of frequency domain resource allocation parameters could also be indicated in one or more MAC CE commands. For this case, the MAC CE command(s) that provides/indicates the K sets of frequency domain resource allocation parameters could also include/provide/indicate the K CSI-RS resource IDs/indexes each associated/mapped to a set of frequency domain resource allocation parameters discussed above. For both MAC CE and DCI based indication of the K sets of frequency domain resource allocation parameters, the association/mapping between the MAC CE/DCI indicated K sets of frequency domain resource allocation parameters and the K CSI-RS resources configured in the same CSI resource set could follow those discussed above for the RRC based configuration/indication of the K sets of frequency domain resource allocation parameters.

For yet another example, the higher layer parameter that configures a CSI resource setting comprising at least one CSI resource set for FSBM, e.g., CSI-ResourceConfig, could include/indicate K sets of frequency domain resource allocation parameters each corresponding/associated to a CSI-RS resource configured in the CSI resource set(s) for FSBM. A set of frequency domain resource allocation parameters could comprise at least one or more (e.g., $N_k$) frequency domain allocations of REs (e.g., each provided by frequencyDomainAllocation) for one or more frequency subbands corresponding/associated to a CSI-RS resource (e.g., the k-th CSI-RS resource in the resource set for FSBM) and one or more (e.g., $N_k$) frequency domain allocations of RBs (e.g., each provided by CSI-FrequencyOccupation, which comprises at least a starting RB provided by startingRB and the number of PRBs provided by nrofRBs across which the corresponding frequency subband spans) for one or more frequency subbands corresponding/associated to a CSI-RS resource (e.g., the k-th CSI-RS resource in the resource set for FSBM). In one example, the K sets of frequency domain resource allocation parameters configured in the CSI resource setting and the K CSI-RS resources configured in the CSI resource set(s) for FSBM are one-to-one mapped. For instance, the first set of frequency domain resource allocation parameters in the CSI resource setting could correspond to the first CSI-RS resource in the CSI resource set(s) for FSBM, the second set of frequency domain resource allocation parameters in the CSI resource setting could correspond to the second CSI-RS resource in the CSI resource set(s) for FSBM, and so on, and the K-th set of frequency domain resource allocation parameters in the CSI resource setting could correspond to the K-th CSI-RS resource in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K sets of frequency domain resource allocation parameters in the CSI resource setting and the K CSI-RS resources configured in the CSI resource set(s) for FSBM. Optionally, the higher layer parameter(s), e.g., CSI-ResourceConfig, that configures a CSI resource setting and provides/indicates the K sets of frequency domain resource allocation parameters could also include/provide/indicate the K CSI-RS resource IDs/indexes each associated/mapped to a set of frequency domain resource allocation parameters discussed above. Alternatively, one or more of the above discussed K sets of frequency domain resource allocation parameters could be indicated in one or more DCIs, via one or more new DCI fields or by repurposing one or more bits/codepoints of one or more existing DCI fields in the DCI(s). One or more of the above discussed K sets of frequency domain resource allocation parameters could also be indicated in one or more MAC CE commands. For this case, the MAC CE command(s) that provides/indicates the K sets of frequency domain resource allocation parameters could also include/provide/indicate the K CSI-RS resource IDs/indexes each associated/mapped to a set of frequency domain resource allocation parameters discussed above. For both MAC CE and DCI based indication of the K sets of frequency domain resource allocation parameters, the association/mapping between the MAC CE/DCI indicated K sets of frequency domain resource allocation parameters and the K CSI-RS resources configured in the CSI resource set(s) for FSBM could follow those discussed above for the RRC based configuration/indication of the K sets of frequency domain resource allocation parameters.

For yet another example, the higher layer parameter that configures a CSI resource set for FSBM, e.g., CSI-SSB-ResourceSet or NZP-CSI-RS-ResourceSet, could include/indicate K sets of bitmaps with each set comprising one or more bitmaps for a CSI-RS resource (e.g., a set of $N_k$ bitmaps for the k-th CSI-RS resource in the resource set). In this example, the configuration/indication of the one or more bitmaps in a set, and the association/mapping between the one or more bitmaps in a set and the frequency subband(s) for the corresponding CSI-RS resource could follow according to one or more examples described herein. In one example, the K sets of bitmaps and the K CSI-RS resources configured in the same CSI resource set are one-to-one mapped. For instance, the first set of bitmaps could correspond to the first CSI-RS resource in the CSI resource set, the second set of bitmaps could correspond to the second CSI-RS resource in the CSI resource set, and so on, and the K-th set of bitmaps could correspond to the K-th CSI-RS resource in the CSI resource set. In another example, the UE 116 could be indicated/provided by the network 130, e.g., via higher layer RRC signaling/parameter and/or MAC CE command and/or dynamic DCI based signaling, the mapping/association between the K sets of bitmaps and the K CSI-RS resources configured in the CSI resource set. Optionally, the higher layer parameter(s), e.g., CSI-SSB-ResourceSet or NZP-CSI-RS-ResourceSet, that configures a CSI resource set and provides/indicates the K sets of bitmaps could also include/provide/indicate the K CSI-RS resource IDs/indexes each associated/mapped to a set of bitmaps discussed above. Alternatively, one or more of the above discussed K sets of bitmaps could be indicated in one or more DCIs, via one or more new DCI fields or by repurposing one or more bits/codepoints of one or more existing DCI fields in the DCI(s). The association/mapping between the DCI indicated K sets of bitmaps and the K CSI-RS resources configured in the same CSI resource set could follow those discussed above for the RRC based configuration/indication of the K sets of bitmaps.

For yet another example, the higher layer parameter that configures a CSI resource setting comprising at least one CSI resource set for FSBM, e.g., CSI-ResourceConfig, could include/indicate K sets of bitmaps with each set comprising one or more bitmaps for a CSI-RS resource configured in the CSI resource set(s) for FSBM (e.g., a set of $N_k$ bitmaps for the k-th CSI-RS resource in the resource set). In this example, the configuration/indication of the one or more bitmaps in a set, and the association/mapping between the one or more bitmaps in a set and the frequency subband(s) for the corresponding CSI-RS resource could follow those according to one or more examples described herein. In one example, the K sets of bitmaps in the CSI resource setting and the K CSI-RS resources configured in the CSI resource set(s) for FSBM are one-to-one mapped. or instance, the first set of bitmaps in the CSI resource setting could correspond to the first CSI-RS resource in the CSI resource set(s) for FSBM, the second set of bitmaps in the CSI resource setting could correspond to the second CSI-RS resource in the CSI resource set(s) for FSBM, and so on, and the K-th set of bitmaps in the CSI resource setting could correspond to the K-th CSI-RS resource in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K sets of bitmaps configured in the CSI resource setting and the K CSI-RS resources configured in the CSI resource set(s) for FSBM. Optionally, the higher layer parameter(s), e.g., CSI-ResourceConfig, that configures a CSI resource setting and provides/indicates the K sets of bitmaps could also include/provide/indicate the K CSI-RS resource IDs/indexes each associated/mapped to a set of bitmaps discussed above. Alternatively, one or more of the above discussed K sets of bitmaps could be indicated in one or more DCIs, via one or more new DCI fields or by repurposing one or more bits/codepoints of one or more existing DCI fields in the DCI(s). The association/mapping between the DCI indicated K sets of bitmaps and the K CSI-RS resources configured in the CSI resource set(s) for FSBM could follow those discussed above for the RRC based configuration/indication of the K sets of bitmaps.

For yet another example, the higher layer parameter that configures a CSI resource set for FSBM, e.g., CSI-SSB-ResourceSet or NZP-CSI-RS-ResourceSet, could include/indicate K bitmaps each corresponding/associated to a CSI-RS resource configured therein. In this example, the configuration/indication of a bitmap, and the association/mapping between each bit position/entry in a bitmap and the frequency subband(s) for the corresponding CSI-RS resource could follow those according to one or more examples described herein. In one example, the K bitmaps and the K CSI-RS resources configured in the same CSI resource set are one-to-one mapped. For instance, the first bitmap could correspond to the first CSI-RS resource in the CSI resource set, the second bitmap could correspond to the second CSI-RS resource in the CSI resource set, and so on, and the K-th bitmap could correspond to the K-th CSI-RS resource in the CSI resource set. In another example, the UE 116 could be indicated/provided by the network 130, e.g., via higher layer RRC signaling/parameter and/or MAC CE command and/or dynamic DCI based signaling, the mapping/association between the K bitmaps and the K CSI-RS resources configured in the CSI resource set. Optionally, the higher layer parameter(s), e.g., CSI-SSB-ResourceSet or NZP-CSI-RS-ResourceSet, that configures a CSI resource set and provides/indicates the K bitmaps could also include/provide/indicate the K CSI-RS resource IDs/indexes each associated/mapped to a bitmap discussed above. Alternatively, one or more of the above discussed K bitmaps could be indicated in one or more DCIs, via one or more new DCI fields or by repurposing one or more bits/codepoints of one or more existing DCI fields in the DCI(s). The association/ mapping between the DCI indicated K bitmaps and the K CSI-RS resources configured in the same CSI resource set could follow those discussed above for the RRC based configuration/indication of the K bitmaps.

For yet another example, the higher layer parameter that configures a CSI resource setting comprising at least one CSI resource set for FSBM, e.g., CSI-ResourceConfig, could include/indicate K bitmaps each corresponding/associated to a CSI-RS resource configured in the CSI resource set(s) for FSBM. In this example, the configuration/indication of a bitmap, and the association/mapping between each bit position/entry in a bitmap and the frequency subband(s) for the corresponding CSI-RS resource could follow those according to one or more examples described herein. In one example, the K bitmaps in the CSI resource setting and the K CSI-RS resources configured in the CSI resource set(s) for FSBM are one-to-one mapped. For instance, the first bitmap in the CSI resource setting could correspond to the first CSI-RS resource in the CSI resource set(s) for FSBM, the second bitmap in the CSI resource setting could correspond to the second CSI-RS resource in the CSI resource set(s) for FSBM, and so on, and the K-th bitmap in the CSI resource setting could correspond to the K-th CSI-RS resource in the CSI resource set(s) for FSBM. In another example, the UE116 could be indicated/provided by the network 130, e.g., via higher layer RRC signaling/parameter and/or MAC CE command and/or dynamic DCI based signaling, the mapping/association between the K bitmaps configured in the CSI resource setting and the K CSI-RS resources configured in the CSI resource set(s) for FSBM. Optionally, the higher layer parameter(s), e.g., CSI-ResourceConfig, that configures a CSI resource setting and provides/indicates the K bitmaps could also include/provide/indicate the K CSI-RS resource IDs/indexes each associated/mapped to a bitmap discussed above. Alternatively, one or more of the above discussed K bitmaps could be indicated in one or more DCIs, via one or more new DCI fields or by repurposing one or more bits/codepoints of one or more existing DCI fields in the DCI(s). The association/mapping between the DCI indicated K bitmaps and the K CSI-RS resources configured in the CSI resource set(s) for FSBM could follow those discussed above for the RRC based configuration/indication of the K bitmaps.

For yet another example, the UE 116 could receive from the network 130 a MAC CE command indicating/providing/including K sets of bitmaps with each set comprising one or more bitmaps for a CSI-RS resource configured in the CSI resource set(s) for FSBM (e.g., a set of $N_k$ bitmaps for the k-th CSI-RS resource in the resource set). In this example, the configuration/indication of the one or more bitmaps in a set, and the association/mapping between the one or more bitmaps in a set and the frequency subband(s) for the corresponding CSI-RS resource could follow those according to one or more examples described herein. In one example, the K sets of bitmaps in the MAC CE command and the K CSI-RS resources configured in the CSI resource set(s) for FSBM are one-to-one mapped. For instance, the first set of bitmaps in the MAC CE command could correspond to the first CSI-RS resource in the CSI resource set(s) for FSBM, the second set of bitmaps in the MAC CE command could correspond to the second CSI-RS resource in the CSI resource set(s) for FSBM, and so on, and the K-th set of bitmaps in the MAC CE command could correspond to the K-th CSI-RS resource in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K sets of bitmaps configured in the MAC CE command and the K CSI-RS resources configured in the CSI resource set(s) for FSBM. Optionally, the MAC CE command that provides/indicates the K sets of bitmaps could also include/provide/indicate the K CSI-RS resource IDs/indexes each associated/mapped to a set of bitmaps discussed above.

For yet another example, a UE 116 could receive from the network 130 a MAC CE command indicating/providing/including K bitmaps each corresponding/associated to a CSI-RS resource configured in a CSI-RS resource set for FSBM. In this example, the configuration/indication of a bitmap, and the association/mapping between each bit position/entry in a bitmap and the frequency subband(s) for the corresponding CSI-RS resource could follow those according to one or more examples described herein. In one example, the K bitmaps indicated in the MAC CE activation command and the K CSI-RS resources configured in the CSI resource set(s) for FSBM are one-to-one mapped. For instance, the first bitmap in the MAC CE command could correspond to the first CSI-RS resource in the CSI resource set(s) for FSBM, the second bitmap in the MAC CE command could correspond to the second CSI-RS resource in the CSI resource set(s) for FSBM, and so on, and the K-th bitmap in the MAC CE command could correspond to the K-th CSI-RS resource in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K bitmaps in the MAC CE command and the K CSI-RS resources configured in the CSI resource set(s) for FSBM. Optionally, the MAC CE command that provides/indicates the K bitmaps could also include/provide/indicate the K CSI-RS resource IDs/indexes each associated/mapped to a bitmap discussed above.

For yet another example, one or more of the above described design examples can be combined to indicate/configure one or more frequency subbands for each of the K CSI-RS resources configured in the CSI RS resource set(s) for FSBM.

A UE could be configured by the network 130 one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for FSBM. This indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. For a CSI-RS resource configured in the CSI resource set for FSBM, and therefore, the corresponding/associated frequency subbands (e.g., the $N_k$ frequency subbands for the k-th CSI-RS resource in the resource set) configured/indicated according to one or more of the above discussed design examples, the UE 116 could be further indicated/configured/provided by the network 130, via higher layer RRC signaling/parameter and/or MAC CE command and/or dynamic DCI based signaling, one or more of the total configured/indicated frequency subbands (e.g., one or more of the $N_k$ frequency subbands for the k-th CSI-RS resource in the resource set) for FSBM on the corresponding CSI-RS resource.

For example, the UE 116 could receive from the network 130, via higher layer RRC signaling/parameter and/or MAC CE command and/or dynamic DCI based signaling, a bitmap of length $N_k$ for the k-th CSI-RS resource in the resource set, where $k \in \{1, \ldots, K\}$. Each bit position/entry in the bitmap could correspond to a frequency subband corresponding/associated with the k-th CSI-RS resource in the resource set. If a bit position/entry in the bitmap is set to '1' (or '0'), the corresponding frequency subband is used/active for FSBM on the corresponding/associated CSI-RS resource (the k-th CSI-RS resource in the resource set in this example). The bitmap could comprise more than one bit positions/entries set to '1' (or '0') indicating that more than one frequency subbands can be used/active for FSBM on the corresponding/associated CSI-RS resource. The UE 116 could receive at least one bitmap for each CSI-RS resource configured in the resource set for FSBM. For RRC based configuration:

In one example, the bitmap(s) corresponding/associated to a CSI-RS resource could be provided in the higher layer parameter NZP-CSI-RS-Resource that configures the CSI-RS resource, or CSI-RS-ResourceMapping/CSI-Frequency-Occupation that configures resource allocations for the CSI-RS resource.

In another example, the higher layer parameter that configures a CSI resource set for FSBM, e.g., NZP-CSI-RS-ResourceSet, could include/indicate a set of one or more (e.g., K) such bitmaps each corresponding/associated to a CSI-RS resource configured in the same CSI resource set. For example, the K bitmaps are one-to-one mapped to the K CSI-RS resources configured in the same CSI resource set. For instance, the first bitmap could correspond to the first CSI-RS resource in the resource set, the second bitmap could correspond to the second CSI-RS resource in the resource set, and so on, and the K-th bitmap could correspond to the K-th CSI-RS resource in the resource set. For another example, the UE 116 could be provided/indicated by the network 130, via higher layer RRC signaling/parameter and/or MAC CE command and/or dynamic DCI based signaling, the mapping/association between the K bitmaps and the K CSI-RS resources indicated/configured in the same CSI resource set. Optionally, the higher layer parameter(s), e.g., CSI-SSB-ResourceSet/NZP-CSI-RS-Resource-Set, that configures a CSI resource set and provides the K bitmaps could also include/provide/indicate the K CSI-RS resource IDs/indexes each associated/mapped to a bitmap discussed above.

In yet another example, the higher layer parameter that configures a CSI resource setting comprising at least one CSI resource set for FSBM, e.g., CSI-ResourceConfig, could include/indicate a set of one or more (e.g., K) such bitmaps each corresponding/associated to a CSI-RS resource configured in the CSI resource set(s) for FSBM. For example, the K bitmaps provided in the CSI resource setting are one-to-one mapped to the K CSI-RS resources configured in the CSI resource set(s) for FSBM. For instance, the first bitmap in the resource setting could correspond to the first CSI-RS resource in the resource set, the second bitmap in the resource setting could correspond to the second CSI-RS resource in the resource set, and so on, and the K-th bitmap in the resource setting could correspond to the K-th CSI-RS resource in the resource set. For another example, the UE 116 could be provided/indicated by the network 130, via higher layer RRC signaling/parameter and/or MAC CE command and/or dynamic DCI based signaling, the mapping/association between the K bitmaps indicated/configured in the CSI resource setting and the K CSI-RS resources indicated/configured in the CSI resource set(s) for FSBM. Optionally, the higher layer parameter(s), e.g., CSI-ResourceConfig, that configures a CSI resource setting and provides the K bitmaps could also include/provide/indicate the K CSI-RS resource IDs/indexes each associated/mapped to a bitmap discussed above.

For the MAC CE based indication, one approach is to contain/comprise/include at least one bitmap corresponding/associated with a CSI-RS resource configured/indicated in the CSI resource set for FSBM. For this case, the MAC CE command could also contain/comprise/include the corresponding CSI-RS resource ID.

In another example, a MAC CE command could contain/comprise/include multiple (e.g., K) bitmaps each corresponding/associated to a CSI-RS resource configured/indicated in the CSI resource set for FSBM. For example, the K bitmaps provided in the MAC CE command are one-to-one mapped to the K CSI-RS resources configured in the CSI resource set(s) for FSBM. For instance, the first bitmap in the MAC CE command could correspond to the first CSI-RS resource in the resource set, the second bitmap in the MAC CE command could correspond to the second CSI-RS resource in the resource set, and so on, and the K-th bitmap in the MAC CE command could correspond to the K-th CSI-RS resource in the resource set. For another example, the UE 116 could be provided/indicated by the network 130, via higher layer RRC signaling/parameter and/or MAC CE command and/or dynamic DCI based signaling, the mapping/association between the K bitmaps indicated/configured/provided in the MAC CE command and the K CSI-RS resources indicated/configured in the CSI resource set(s) for FSBM. Optionally, the MAC CE command that provides the K bitmaps could also include/provide/indicate the K CSI-RS resource IDs/indexes each associated/mapped to a bitmap discussed above.

For dynamic DCI based signaling, one or more new DCI fields can be introduced to indicate one or more of the bitmaps each indicating one or more frequency subbands for FSBM on the corresponding CSI-RS resource. Alternatively, one or more bits/codepoints of one or more existing DCI fields could be repurposed to indicate one or more of the bitmaps each indicating one or more frequency subbands for FSBM on the corresponding CSI-RS resource.

For another example, the UE 116 could receive from the network 130, via higher layer RRC signaling/parameter and/or MAC CE command and/or dynamic DCI based signaling, a set of one or more frequency subband indexes each determined from $\{1, \ldots, N_k\}$ for the k-th CSI-RS resource in the resource set, where $k \in \{1, \ldots, K\}$. For this case, the frequency subband(s) corresponding to the indicated/configured/provided frequency subband index(es) is used/active for FSBM on the corresponding/associated CSI-RS resource (the k-th CSI-RS resource in the resource set in this example). The UE 116 could receive at least one set of one or more frequency subband indexes for each CSI-RS resource configured in the resource set for FSBM.

In one example for the RRC based configuration, the set of one or more frequency subband indexes corresponding/associated to a CSI-RS resource could be provided in the higher layer parameter NZP-CSI-RS-Resource that configures the CSI-RS resource, or CSI-RS-ResourceMapping/CSI-FrequencyOccupation that configures resource allocations for the CSI-RS resource.

In another example, the higher layer parameter that configures a CSI resource set for FSBM, e.g., NZP-CSI-RS- ResourceSet, could include/indicate one or more sets (e.g., K) of one or more frequency subband indexes with each set corresponding/associated to a CSI-RS resource configured in the same CSI resource set. For example, the K sets of frequency subband index(es) are one-to-one mapped to the K CSI-RS resources configured in the same CSI resource set. For instance, the first set of one or more frequency subband indexes could correspond to the first CSI-RS resource in the resource set, the second set of one or more frequency subband indexes could correspond to the second CSI-RS resource in the resource set, and so on, and the K-th set of one or more frequency subband indexes could correspond to the K-th CSI-RS resource in the resource set. For another example, the UE 116 could be provided/indicated by the network 130, via higher layer RRC signaling/parameter and/or MAC CE command and/or dynamic DCI based signaling, the mapping/association between the K sets of frequency subband index(es) and the K CSI-RS resources indicated/configured in the same CSI resource set. Optionally, the higher layer parameter(s), e.g., CSI-SSB-Resource-Set/NZP-CSI-RS-ResourceSet, that configures a CSI resource set and provides the K sets of frequency subband indexes could also include/provide/indicate the K CSI-RS resource IDs/indexes each associated/mapped to a set of frequency subband indexes discussed above.

In yet another example, the higher layer parameter that configures a CSI resource setting while comprising at least one CSI resource set for FSBM, e.g., CSI-ResourceConfig, could include/indicate one or more sets (e.g., K) of one or more frequency subband indexes with each set corresponding/associated to a CSI-RS resource configured in the CSI resource set(s) for FSBM. For example, the K sets of frequency subband index(es) configured in the resource setting are one-to-one mapped to the K CSI-RS resources configured in the CSI resource set(s) for FSBM. For instance, the first set of one or more frequency subband indexes in the resource setting could correspond to the first CSI-RS resource in the resource set, the second set of one or more frequency subband indexes in the resource setting could correspond to the second CSI-RS resource in the resource set, and so on, and the K-th set of one or more frequency subband indexes in the resource setting could correspond to the K-th CSI-RS resource in the resource set. For another example, the UE 116 could be provided/indicated by the network 130, via higher layer RRC signaling/parameter and/or MAC CE command and/or dynamic DCI based signaling, the mapping/association between the K sets of frequency subband index(es) indicated/configured in the CSI resource setting and the K CSI-RS resources indicated/configured in the CSI resource set(s) for FSBM. Optionally, the higher layer parameter(s), e.g., CSI-ResourceConfig, that configures a CSI resource setting and provides the K sets of frequency subband indexes could also include/provide/indicate the K CSI-RS resource IDs/indexes each associated/mapped to a set of frequency subband indexes discussed above.

One approach for the MAC CE-based indication is to contain/comprise/include at least one set of frequency subband index(es) corresponding/associated to a CSI-RS resource configured/indicated in the CSI resource set for FSBM in the MAC CE command. For this case, the MAC CE command could also contain/comprise/include the corresponding CSI-RS resource ID.

In another example, a MAC CE command could contain/comprise/include multiple (e.g., K) sets of frequency subband index(es) each corresponding/associated to a CSI-RS resource configured/indicated in the CSI resource set for FSBM. For example, the K sets of frequency subband index(es) provided in the MAC CE command are one-to-one mapped to the K CSI-RS resources configured in the CSI resource set(s) for FSBM. For instance, the first set of one or more frequency subband indexes in the MAC CE command could correspond to the first CSI-RS resource in the resource set, the second set of one or more frequency subband indexes in the MAC CE command could correspond to the second CSI-RS resource in the resource set, and so on, and the K-th set of one or more frequency subband indexes in the MAC CE command could correspond to the K-th CSI-RS resource in the resource set. For another example, the UE 116 could be provided/indicated by the network 130, via higher layer RRC signaling/parameter and/or MAC CE command and/or dynamic DCI based signaling, the mapping/association between the K sets of frequency subband index(es) indicated/configured/provided in the MAC CE command and the K CSI-RS resources indicated/configured in the CSI resource set(s) for FSBM. Optionally, the MAC CE command that provides the K sets of frequency subband indexes could also include/provide/indicate the K CSI-RS resource IDs/indexes each associated/mapped to a set of frequency subband indexes discussed above.

For dynamic DCI based signaling, one or more new DCI fields can be introduced to indicate one or more of the sets of frequency subband index(es), wherein each set could indicate one or more frequency subbands for FSBM on the corresponding CSI-RS resource. Alternatively, one or more bits/codepoints of one or more existing DCI fields in a DCI format could be repurposed to indicate one or more of the sets of frequency subband index(es), wherein each set could indicate one or more frequency subbands for FSBM on the corresponding CSI-RS resource.

For yet another example, the UE 116 could receive from the network 130 one or more MAC CE activation commands each activating one or more of the frequency subbands configured/indicated for one or more CSI-RS resources, where the activated one or more frequency subbands are used/active for FSBM on the corresponding CSI-RS resource(s).

In one example, a MAC CE activation command could activate one or more of the frequency subbands configured/indicated for a CSI-RS resource, and the activated one or more frequency subbands are used/active for FSBM on the CSI-RS resource. For this case, the MAC CE activation command could also contain/comprise/include the corresponding CSI-RS resource ID.

In another example, a MAC CE activation command could activate multiple (e.g., K) sets of one or more frequency subbands with each set corresponding/associated to a CSI-RS resource configured/indicated in the CSI resource set for FSBM. For example, the MAC CE command could activate the first set of one or more frequency subbands from the frequency subbands indicated/configured for the first CSI-RS resource in the resource set, the second set of one or more frequency subbands from the frequency subbands indicated/configured for the second CSI-RS resource in the resource set, and so on, and the K-th set of one or more frequency subbands from the frequency subbands indicated/configured for the K-th CSI-RS resource in the resource set. For another example, the UE 116 could be provided/indicated by the network 130, via higher layer RRC signaling/parameter and/or MAC CE command and/or dynamic DCI based signaling, the mapping/association between the K sets of frequency subbands activated by the MAC CE activation command and the K CSI-RS resources indicated/configured in the CSI resource set(s) for FSBM. A set of frequency subbands activated by the MAC CE activation command are used/active for FSBM on the corresponding CSI-RS resource. Optionally, the MAC CE activation command that activates the K sets of frequency subbands could also include/provide/indicate the K CSI-RS resource IDs/indexes each associated/mapped to a set of activated frequency subbands.

For another example, the higher layer parameter that configures a frequency subband for a CSI-RS resource (e.g., the k-th CSI-RS resource configured in the resource set) could include/indicate/comprise an indicator. If the indicator is set to 'enabled'/'on' or the like, the corresponding frequency subband is used/active for FSBM on the corresponding CSI-RS resource. Alternatively, the indicator could correspond to a one-big flag indicator. That is, if the one-bit flag indicator is set to '1' (or '0') or the like, the corresponding frequency subband is used/active for FSBM on the corresponding CSI-RS resource.

In another example, a UE could be configured by the network 130 one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM. This indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. The UE 116 could be configured by the network 130, e.g., in one or more CSI resource settings each provided by CSI-ResourceConfig, one or more CSI resource sets (e.g., each provided by CSI-SSB-ResourceSet or NZP-CSI-RS-ResourceSet) each comprising at least one CSI-RS resource (e.g., a SSB resource or NZP CSI-RS resource) for FSBM. In particular, a CSI-RS resource for FSBM could correspond to one or more frequency-selective beams, and therefore, span across the corresponding one or more frequency subbands. The indication/configuration of the TTD settings, frequency subbands (in terms of their sizes and/or frequency domain resource allocations and/or etc.) for one or more CSI-RS resources, and the mapping/association between the TTD settings/frequency subbands and the CSI-RS resources could follow those according to one or more examples described herein (e.g., by replacing CSI resource set with CSI resource setting in one or more examples described herein). Furthermore, the activation/indication of one or more frequency subbands for FSBM on the corresponding CSI-RS resource could follow according to one or more examples described herein (e.g., by replacing CSI resource set with CSI resource setting in one or more of the examples described herein).

In yet another example, a UE could be configured by the network 130 one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM. This indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. The UE 116 could be configured by the network 130, e.g., in a CSI resource set provided by CSI-SSB-ResourceSet or NZP-CSI-RS-ResourceSet, a CSI resource subset/group comprising $K \geq 1$ CSI-RS resources (e.g., SSB resources or NZP CSI-RS resources) for FSBM. In particular, the k-th CSI-RS resource in the resource subset/group could correspond to a set of $N_k \geq 1$ frequency-selective beams (and therefore, span across the corresponding set of $N_k \geq 1$ frequency subbands), where k=1, . . . , K. In the present disclosure, the set of $N_k \geq 1$ frequency-selective beams can also be referred to as a frequency-selective multi-beam. The indication/configuration of the TTD settings, frequency subbands (in terms of their sizes and/or frequency domain resource allocations and/or etc.) for one or more CSI-RS resources, and the mapping/association between the TTD settings/frequency subbands and the CSI-RS resources could follow those according to one or more examples described herein (e.g., by replacing CSI resource set with CSI resource subset/group in one or more examples described herein). Furthermore, the activation/indication of one or more frequency subbands for FSBM on the corresponding CSI-RS resource could follow those according to one or more examples described herein (e.g., by replacing CSI resource set with CSI resource subset/group in one or more examples described herein).

In yet another example, a UE could be configured by the network 130 one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM. This indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. The UE 116 could be configured by the network 130, e.g., in one or more CSI resource sets each provided by CSI-SSB-ResourceSet or NZP-CSI-RS-ResourceSet, one or more CSI resource subsets/groups each comprising at least one CSI-RS resource (e.g., a SSB resource or NZP CSI-RS resource) for FSBM. In particular, a CSI-RS resource for FSBM could correspond to one or more frequency-selective beams (also referred to as a frequency-selective multi-beam), and therefore, span across the corresponding one or more frequency subbands. The indication/configuration of the TTD settings, frequency subbands (in terms of their sizes and/or frequency domain resource allocations and/or etc.) for one or more CSI-RS resources, and the mapping/association between the TTD settings/frequency subbands and the CSI-RS resources could follow those according to one or more examples described herein (e.g., by replacing CSI resource set with CSI resource subset/group in one or more examples described herein). Furthermore, the activation/indication of one or more frequency subbands for FSBM on the corresponding CSI-RS resource could follow those according to one or more examples described herein (e.g., by replacing CSI resource set with CSI resource subset/group in one or more examples described herein).

In yet another example, a UE could be configured by the network 130 one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM. This indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. The UE 116 could be configured by the network 130, e.g., in a CSI resource setting provided by CSI-ResourceConfig, a CSI resource set (e.g., provided by CSI-SSB-ResourceSet or NZP-CSI-RS-ResourceSet) comprising one or more (e.g., K≥1) groups of CSI-RS resources (e.g., SSB resources or NZP CSI-RS resources) with each group comprising one or more (e.g., $N_k$) CSI-RS resources for FSBM, where k=1, . . . , K. Here, a group of CSI-RS resources can be referred to as a CSI resource subset or a CSI resource group for FSBM. In particular, the k-th CSI resource subset/group, and therefore, the $N_k$ CSI-RS resources configured therein, in the resource set could correspond to a set of $N_k \geq 1$ frequency-selective beams (and therefore, the corresponding set of $N_k \geq 1$ frequency sub-bands), where each CSI-RS resource configured in the k-th CSI resource subset/group could correspond to a frequency-selective beam (and therefore, the corresponding frequency subband). In the present disclosure, the set of $N_k \geq 1$ frequency-selective beams can also be referred to as a frequency-selective multi-beam. There are various means to indicate/configure/provide one or more CSI resource subsets/groups in a CSI resource set.

For example, the UE 116 could be provided/indicated/configured by the network 130, via higher layer RRC signaling/parameter (e.g., in a CSI resource set provided by CSI-SSB-ResourceSet/NZP-CSI-RS-ResourceSet or in a CSI resource setting provided by CSI-ResourceConfig) and/or MAC CE command and/or dynamic DCI based signaling, K CSI resource subsets/groups each provided by a different higher layer parameter with a different/unique CSI resource subset/group ID/index. Each CSI resource subset/group could comprise/provide one or more CSI-RS resources each corresponding to a SSB resource index and/or a NZP CSI-RS resource configuration index.

For another example, the UE 116 could be provided/indicated/configured by the network 130, via higher layer RRC signaling/parameter (e.g., in a CSI resource set provided by CSI-SSB-ResourceSet/NZP-CSI-RS-ResourceSet or in a CSI resource setting provided by CSI-ResourceConfig) and/or MAC CE command and/or dynamic DCI based signaling, the number of CSI resource subsets/groups configured in the CSI resource set and/or the number of CSI-RS resources in each (or one or more) of the CSI resource subsets/groups. For this case, the indexes/IDs of the CSI-RS resources configured in the first CSI resource subset/group, the second CSI resource subset/group, and so on, could be continuous from low to high (or high to low).

For yet another example, the UE 116 could be provided/indicated/configured by the network 130, via higher layer RRC signaling/parameter (e.g., in a CSI resource set provided by CSI-SSB-ResourceSet/NZP-CSI-RS-ResourceSet or in a CSI resource setting provided by CSI-ResourceConfig) and/or MAC CE command and/or dynamic DCI based signaling, the number of CSI resource subsets/groups configured in the CSI resource set and/or the number of CSI-RS resources for each CSI resource subset/group. For this case, the number of CSI-RS resources configured in each CSI resource subset/group is equal, and the indexes/IDs of the CSI-RS resources configured in the first CSI resource subset/group, the second CSI resource subset/group, and so on, could be continuous from low to high (or high to low).

For yet another example, the UE 116 could be provided/indicated/configured by the network 130, via higher layer RRC signaling/parameter (e.g., in a CSI resource set provided by CSI-SSB-ResourceSet/NZP-CSI-RS-ResourceSet or in a CSI resource setting provided by CSI-ResourceConfig) and/or MAC CE command and/or dynamic DCI based signaling, one or more bitmaps each corresponding/associated to a CSI resource subset/group. For instance, the first bitmap could correspond to the first CSI resource subset/group in the resource set, the second bitmap could correspond to the second CSI resource subset/group in the resource set, and so on, and the last bitmap could correspond to the last CSI resource subset/group in the resource set. Alternatively, the UE 116 could be indicated/provided/configured by the network 130, via higher layer RRC signaling/parameter and/or MAC CE command and/or dynamic DCI based signaling, the mapping/association between the bitmaps and the CSI resource subsets/groups in the CSI resource set for FSBM. Each bitmap could have the same length/size as that of the CSI resource set, and each bit position/entry in a bitmap could correspond to a CSI-RS resource in the corresponding CSI resource set. If a bit position/entry of a bitmap is set to '1' (or '0'), the CSI-RS resource in the resource set corresponding/associated to the bit position/entry is configured/indicated/provided/included in the CSI resource subset/group corresponding/associated to the bitmap. Furthermore, the higher layer parameter(s), e.g., CSI-SSB-ResourceSet/NZP-CSI-RS-ResourceSet/CSI-ResourceConfig, and/or the MAC CE command and/or the DCI format that provides/indicates/configures the one or more bitmaps could also include/indicate/provide one or more CSI resource subset/group IDs/indexes each corresponding/associated to a bitmap indicated/configured therein.

For yet another example, the UE 116 could receive from the network 130 a MAC CE activation command activating one or more CSI-RS resources—from all the CSI-RS resources configured in the CSI resource set—for a CSI resource subset/group. For this case, the MAC CE command could also include/indicate/provide the corresponding CSI resource subset/group ID/index. Furthermore, the UE 116 could receive from the network 130 K MAC CE activation commands each activating one or more CSI-RS resources for one of the K CSI resource subsets/groups.

For yet another example, the UE 116 could receive from the network 130 a MAC CE activation command activating one or more CSI-RS resources—from all the CSI-RS resources configured in the CSI resource set—for each of the K CSI resource subset/group configured in the CSI resource set for FSBM. For instance, the MAC CE activation command could activate a first set of one or more CSI-RS resources—from all the CSI-RS resources configured in the CSI resource set—for the first CSI resource subset/group, a second set of one or more CSI-RS resources—from all the CSI-RS resources configured in the CSI resource set—for the second CSI resource subset/group, and so on, and a K-th set of one or more CSI-RS resources—from all the CSI-RS resources configured in the CSI resource set—for the K-th CSI resource subset/group. The MAC CE command could also include/indicate/provide one or more CSI resource subset/group IDs/indexes each corresponding/associated to a set of activated CSI-RS resources.

For yet another example, one or more of the above described design examples could be combined to indicate/configure/provide one or more CSI resource subsets/groups in a CSI resource set for FSBM.

There are various means to configured/indicate TTD setting(s) for one or more CSI resource subsets/groups (and therefore, the CSI-RS resources configured therein) for FSBM. For example, a UE could be configured by the network 130 one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM. This indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. For a CSI resource subset/group configured in the resource set, the UE 116 could be indicated/configured by the network 130 with the corresponding/associated (hypothetical) TTD setting. This indication/configuration could be via higher layer RRC signaling (e.g., indicated/configured in the same CSI resource setting provided by CSI-ResourceConfig or in the same CSI resource set provided by CSI-SSB-ResourceSet/NZP-CSI-RS-ResourceSet) and/or MAC CE command and/or dynamic DCI based signaling. In the present disclosure, the (hypothetical) TTD setting for a CSI resource subset/group (e.g., the k-th CSI resource subset/group in the resource set, and therefore, the $N_k$ CSI-RS resources configured therein) could comprise at least one of the following.

For example, one or more of the TTD delays and/or indexes of the one or more of the TTD delays among all the TTD delays for the CSI resource subset/group (e.g., the k-th CSI resource subset/group in the resource set, and therefore, the $N_k$ CSI-RS resources configured therein) and/or $N_k$: for the k-th (k=1, . . . , K) CSI resource subset/group (comprising $N_k$ CSI-RS resources) configured in the resource set, the corresponding $N_k$ (hypothetical) TTD delays are $\tau_{1,k}$, $\tau_{2,k}$, . . . , $\tau_{Nk,k}$ (depicted in FIG. 9).

For another example, a reference TTD delay $\tau_0$ and/or one or more scaling factors for one or more of the TTD delays with respect to the reference TTD delay and/or indexes of the one or more of the TTD delays among all the TTD delays for the CSI resource subset/group (e.g., the k-th CSI resource subset/group in the resource set, and therefore, the $N_k$ CSI-RS resources configured therein) and/or $N_k$: for the k-th (k=1, . . . , K) CSI resource subset/group (comprising $N_k$ CSI-RS resources) configured in the resource set, the corresponding $N_k$ (hypothetical) TTD delays are $\tau_{1,k}$, $\tau_{2,k}$, . . . , $\tau_{Nk,k}$ (depicted in FIG. 9). For this case, a set of scaling factors $\{a_{1,k}, a_{2,k}, . . . , a_{Nk,k}\}$ for the $N_k$ TTD delays could be determined as $\{\tau_{1,k}, \tau_{2,k}/\tau_0, . . . , \tau_{Nk,k}/\tau_0\}$.

For yet another example, a reference TTD delay and/or the index of the reference TTD delay among all the TTD delays for the CSI resource subset/group (e.g., the k-th CSI resource subset/group in the resource set, and therefore, the $N_k$ CSI-RS resources configured therein) and/or one or more scaling factors for one or more of the TTD delays with respect to the reference TTD delay and/or indexes of the one or more of the TTD delays among all the TTD delays for the CSI resource subset/group (e.g., the k-th CSI resource subset/group in the resource set, and therefore, the $N_k$ CSI-RS resources configured therein) and/or $N_k$: for the k-th (k=1, . . . , K) CSI resource subset/group (comprising $N_k$ CSI-RS resources) configured in the resource set, the corresponding $N_k$ (hypothetical) TTD delays are $\tau_{1,k}$, $\tau_{2,k}$, . . . , $\tau_{Nk,k}$ (depicted in FIG. 9). If the reference TTD delay corresponds to $\tau_{1,k}$, a set of scaling factors $\{a_{1,k}, a_{2,k}, . . . , a_{Nk,k}\}$ for the $N_k$ TTD delays could be determined as $\{1, \tau_{2,k}/\tau_{1,k}, . . . , \tau_{Nk,k}/\tau_{1,k}\}$.

For yet another example, a reference TTD delay $\tau_0$ and/or differences between one or more of the TTD delays and the reference TTD delay and/or indexes of the one or more of the TTD delays among all the TTD delays for the CSI resource subset/group (e.g., the k-th CSI resource subset/group in the resource set, and therefore, the $N_k$ CSI-RS resources configured therein) and/or $N_k$: for the k-th (k=1, . . . , K) CSI resource subset/group (comprising $N_k$ CSI-RS resources) configured in the resource set, the corresponding $N_k$ (hypothetical) TTD delays are $\tau_{1,k}$, $\tau_{2,k}$, . . . , $\tau_{Nk,k}$ (depicted in FIG. 9). For this case, a set of differences $\{d_{1,k}, d_{2,k}, . . . , d_{Nk,k}\}$ between the $N_k$ TTD delays and the reference TTD delay $\tau_0$ could be determined as $\{\tau_{1,k}-\tau_0, \tau_{2,k}-\tau_0, . . . , \tau_{Nk,k}-\tau_0\}$.

For yet another example, a reference TTD delay and/or the index of the reference TTD delay among all the TTD delays for the CSI resource subset/group (e.g., the k-th CSI resource subset/group in the resource set, and therefore, the $N_k$ CSI-RS resources configured therein) and/or differences between one or more of the TTD delays and the reference TTD delay and/or indexes of the one or more of the TTD delays among all the TTD delays for the CSI resource subset/group (e.g., the k-th CSI resource subset/group in the resource set, and therefore, the $N_k$ CSI-RS resources configured therein) and/or $N_k$: for the k-th (k=1, . . . , K) CSI resource subset/group (comprising $N_k$ CSI-RS resources) configured in the resource set, the corresponding $N_k$ (hypothetical) TTD delays are $\tau_{1,k}$, $\tau_{2,k}$, . . . , $T_{Nk,k}$ (depicted in FIG. 9). If the reference TTD delay corresponds to $\tau_{1,k}$, a set of differences $\{d_{1,k}, d_{2,k}, . . . , d_{Nk,k}\}$ for the $N_k$ TTD delays could be determined as $\{0, \tau_{2,k}-\tau_{1,k}, . . . , \tau_{Nk,k}-\tau_{1,k}\}$.

For yet another example, a reference TTD delay and/or the index of the reference TTD delay among all the TTD delays for the CSI resource subset/group (e.g., the k-th CSI resource subset/group in the resource set, and therefore, the $N_k$ CSI-RS resources configured therein) and/or the common difference between any two adjacent TTD delays and/or indexes of the one or more of the TTD delays among all the TTD delays for the CSI resource subset/group (e.g., the k-th CSI resource subset/group in the resource set, and therefore, the $N_k$ CSI-RS resources configured therein) and/or $N_k$: for the k-th (k=1, . . . , K) CSI resource subset/group (comprising $N_k$ CSI-RS resources) configured in the resource set, the corresponding $N_k$ (hypothetical) TTD delays are $\tau_{1,k}$, $\tau_{2,k}$, . . . , $\tau_{Nk,k}$ (depicted in FIG. 9). If $\tau_{j,k}-\tau_{i,k}=\Delta_k$ for all j-i=1, j, i∈{1, . . . , $N_k$}, the common difference between any two adjacent TTD delays is $\Delta_k$.

For yet another example, a reference TTD delay and/or the index of the reference TTD delay among all the TTD delays for the CSI resource subset/group (e.g., the k-th CSI resource subset/group in the resource set, and therefore, the $N_k$ CSI-RS resources configured therein) and/or the common scaling factor between any two adjacent TTD delays and/or indexes of the one or more of the TTD delays among all the TTD delays for the CSI resource subset/group (e.g., the k-th CSI resource subset/group in the resource set, and therefore, the $N_k$ CSI-RS resources configured therein) and/or $N_k$: for the k-th (k=1, . . . , K) CSI resource subset/group (comprising $N_k$ CSI-RS resources) configured in the resource set, the corresponding $N_k$ (hypothetical) TTD delays are $\tau_{1,k}$, $\tau_{2,k}, \ldots, \tau_{Nk,k}$ (depicted in FIG. 9). If $\tau_{j,k}/\tau_{i,k}=\beta_k$ for all j–i=1, j, i$\in\{1, \ldots, N_k\}$, the common scaling factor between any two adjacent TTD delays is $\beta_k$.

For a CSI-RS resource configured in a CSI resource subset/group (and therefore, in a CSI resource set) for FSBM, the UE 116 could be indicated/configured by the network 130 with the corresponding/associated (hypothetical) TTD configuration. This indication/configuration could be via higher layer RRC signaling (e.g., indicated/configured in the higher layer parameter NZP-CSI-RS-Resource) and/or MAC CE command and/or dynamic DCI based signaling. In the present disclosure, the (hypothetical) TTD configuration for a CSI-RS resource configured in a CSI resource subset/group (e.g., the k-th CSI resource subset/group in the resource set) for FSBM could comprise at least one of the following.

For example, the TTD delay: for the $n_k$-th CSI-RS resource in the k-th (k=1, . . . , K) CSI resource subset/group (comprising $N_k$ CSI-RS resources) configured in the resource set, the corresponding (hypothetical) TTD delay is $\tau_{nk,k}$ (depicted in FIG. 9), where $n_k\in\{1, \ldots, N_k\}$.

For another example, a reference TTD delay $\tau_0$ and/or a scaling factor for the TTD delay with respect to the reference TTD delay: for the $n_k$-th CSI-RS resource in the k-th (k=1, . . . , K) CSI resource subset/group (comprising $N_k$ CSI-RS resources) configured in the resource set, the corresponding (hypothetical) TTD delay is $\tau_{nk,k}$ (depicted in FIG. 9), where $n_k\in\{1, \ldots, N_k\}$. For this case, the scaling factor $d_{nk,k}$ for the TTD delay could be determined as $\tau_{nk,k}/\tau_0$.

For yet another example, a reference TTD delay and/or the index of the reference TTD delay among all the TTD delays for the CSI resource subset/group (e.g., the k-th CSI resource subset/group in the resource set, and therefore, the $N_k$ CSI-RS resources configured therein) and/or a scaling factor for the TTD delay with respect to the reference TTD delay: for the $n_k$-th CSI-RS resource in the k-th (k=1, . . . , K) CSI resource subset/group (comprising $N_k$ CSI-RS resources) configured in the resource set, the corresponding (hypothetical) TTD delay is $\tau_{nk,k}$ (depicted in FIG. 9), where $n_k\in\{1, \ldots, N_k\}$. If the reference TTD delay corresponds to $\tau_{1,k}$, a scaling factor $a_{nk,k}$ for the TTD delay could be determined as $\tau_{nk,k}/\tau_{1,k}$.

For yet another example, a reference TTD delay $\tau_0$ and/or a difference between the TTD delay and the reference TTD delay: for the $n_k$-th CSI-RS resource in the k-th (k=1, . . . , K) CSI resource subset/group (comprising $N_k$ CSI-RS resources) configured in the resource set, the corresponding (hypothetical) TTD delay is $\tau_{nk,k}$, (depicted in FIG. 9), where $n_k\in\{1, \ldots, N_k\}$. For this case, the difference $d_{nk,k}$ between the TTD delay and the reference TTD delay $\tau_0$ could be determined as $\tau_{nk,k}-\tau_0$.

For yet another example, a reference TTD delay and/or the index of the reference TTD delay among all the TTD delays for the CSI resource subset/group (e.g., the k-th CSI resource subset/group in the resource set, and therefore, the $N_k$ CSI-RS resources configured therein) and/or a difference between the TTD delay and the reference TTD delay: for the $n_k$-th CSI-RS resource in the k-th (k=1, . . . , K) CSI resource subset/group (comprising $N_k$ CSI-RS resources) configured in the resource set, the corresponding (hypothetical) TTD delay is $\tau_{nk,k}$ (depicted in FIG. 9), where $n_k\in\{1, \ldots, N_k\}$. If the reference TTD delay corresponds to $\tau_{1,k}$, the difference $d_{nk,k}$ for the TTD delay could be determined as $\tau_{nk,k}-\tau_{1,k}$.

For yet another example, a reference TTD delay and/or the index of the reference TTD delay among all the TTD delays for the CSI resource subset/group (e.g., the k-th CSI resource subset/group in the resource set, and therefore, the $N_k$ CSI-RS resources configured therein) and/or the common difference between any two adjacent TTD delays: for the $n_k$-th CSI-RS resource in the k-th (k=1, . . . , K) CSI resource subset/group (comprising $N_k$ CSI-RS resources) configured in the resource set, the corresponding (hypothetical) TTD delay is $\tau_{nk,k}$ (depicted in FIG. 9), where $n_k\in\{1, \ldots, N_k\}$. If $\tau_{j,k}-\tau_{i,k}=\Delta_k$ for all j–i=1, j, i$\in\{1, \ldots, N_k\}$, the common difference between any two adjacent TTD delays is $\Delta_k$.

For yet another example, a reference TTD delay and/or the index of the reference TTD delay among all the TTD delays for the CSI resource subset/group (e.g., the k-th CSI resource subset/group in the resource set, and therefore, the $N_k$ CSI-RS resources configured therein) and/or the common scaling factor between any two adjacent TTD delays: for the $n_k$-th CSI-RS resource in the k-th (k=1, . . . , K) CSI resource subset/group (comprising $N_k$ CSI-RS resources) configured in the resource set, the corresponding (hypothetical) TTD delay is $\tau_{nk,k}$ (depicted in FIG. 9), where $n_k\in\{1, \ldots, N_k\}$. If $\tau_{j,k}/\tau_{i,k}=\beta_k$ for all j–i=1, j, i$\in\{1, \ldots, N_k\}$, the common scaling factor between any two adjacent TTD delays is $\beta_k$.

There are various means to indicate/configure K TTD settings, e.g., in a CSI resource setting/CSI resource set, and associate/map them to the K CSI resource subsets/groups (each comprising one or more CSI-RS resources with one or more frequency subbands) indicated/configured in the CSI resource setting/CSI resource set for FSBM.

For example, the set of K TTD settings could be explicitly indicated/included in the CSI resource setting provided by CSI-ResourceConfig and/or the CSI resource set (e.g., provided by CSI-SSB-ResourceSet or NZP-CSI-RS-ResourceSet) and/or one or more MAC CE commands and/or one or more DCIs (e.g., via one or more new DCI fields or repurposing one or more bits/codepoints of one or more existing DCI fields), e.g., the K TTD settings are one-to-one mapped to the K CSI resource subsets/groups indicated/configured in the same CSI resource setting/CSI resource set such that the first TTD setting is associated/mapped to the first CSI resource subset/group (and therefore, the CSI-RS resources for FSBM configured therein), the second TTD setting is associated/mapped to the second CSI resource subset/group (and therefore, the CSI-RS resources for FSBM configured therein), and so on, and the K-th TTD setting is associated/mapped to the K-th CSI resource subset/group (and therefore, the CSI-RS resources for FSBM configured therein).

For another example, the set of K TTD settings could be explicitly indicated/included in the CSI resource setting provided by CSI-ResourceConfig and/or the CSI resource set (e.g., provided by CSI-SSB-ResourceSet or NZP-CSI-RS-ResourceSet) and/or one or more MAC CE commands and/or one or more DCIs (e.g., via one or more new DCI fields or repurposing one or more bits/codepoints of one or more existing DCI fields). Furthermore, the UE 116 could be indicated/configured/provided by the network 130, via higher layer RRC signaling/parameter and/or MAC CE command and/or dynamic DCI based signaling, the association/mapping between the K TTD settings and the K CSI resource subsets/groups (and therefore, the CSI-RS resources for FSBM configured therein), e.g., in the same CSI resource setting/CSI resource set.

For yet another example, the higher layer parameter that configures a CSI-RS resource (e.g., NZP-CSI-RS-Resource) or the higher layer parameter that configures/provides resource allocation for a CSI-RS resource (e.g., CSI-RS-ResourceMapping or CSI-FrequencyOccupation) could explicitly indicate/include the TTD setting corresponding/associated to the CSI resource subset/group, in which the CSI-RS resource is configured/indicated. Optionally, the higher layer parameter that configures a CSI resource subset/group (e.g., NZP-CSI-RS-ResourceSubSet) could explicitly indicate/include the TTD setting corresponding/associated with the CSI resource subset/group.

For yet another example, a MAC CE command could indicate a TTD setting for a CSI resource subset/group (and therefore, the CSI-RS resources for FSBM configured therein). For this case, the corresponding CSI resource subset/group ID could be included/provided in the MAC CE command.

For yet another example, a MAC CE command could indicate the K TTD settings each for a CSI resource subset/group configured/indicated in a CSI resource set for FSBM. The set of K TTD settings provided in the MAC CE command are one-to-one mapped to the K CSI resource subsets/groups indicated/configured in the CSI resource setting/CSI resource set such that the first TTD setting in the MAC CE command is associated/mapped to the first CSI resource subset/group (and therefore, the CSI-RS resources for FSBM configured therein), the second TTD setting in the MAC CE command is associated/mapped to the second CSI resource subset/group (and therefore, the CSI-RS resources for FSBM configured therein), and so on, and the K-th TTD setting in the MAC CE command is associated/mapped to the K-th CSI resource subset/group (and therefore, the CSI-RS resources for FSBM configured therein). For this example, the MAC CE command could also indicate/provide/include one or more (e.g., K) CSI resource subset/group IDs/indexes each corresponding/associated to one of the (e.g., K) TTD settings.

For yet another example, one or more new DCI fields could be introduced in a DCI format to indicate one or more of the K TTD settings. Alternatively, one or more bits or codepoints of one or more existing DCI fields in a DCI format could be repurposed to indicate one or more of the K TTD settings. The TTD setting(s) indicated in the DCI and the CSI resource subset(s)/group(s) indicated/configured for FSBM could be one-to-one mapped according to one or more examples described herein.

For yet another example, one or more of the above described design examples can be combined to indicate/configure one or more of the K TTD settings, and associate/map them to one or more of the K CSI resource subsets/groups (and therefore, the CSI-RS resources for FSBM configured therein).

There are various means to indicate/configure $N_k$ TTD configurations—e.g., in a CSI-RS resource provided by NZP-CSI-RS-Resource or a CSI resource subset/group provided by CSI-SSB-ResourceSubset or NZP-CSI-RS-ResourceSubSet, and associate/map them to the $N_k$ CSI-RS resources configured in the CSI resource subset/group for FSBM.

For example, the set of $N_k$ TTD configurations could be explicitly indicated/included/provided in the higher layer parameter, e.g., CSI-SSB-ResourceSubset or NZP-CSI-RS-ResourceSubSet, that configures a CSI resource subset/group and/or one or more MAC CE commands and/or one or more DCIs (e.g., via one or more new DCI fields or repurposing one or more bits/codepoints of one or more existing DCI fields), e.g., the $N_k$ TTD configurations are one-to-one mapped to the $N_k$ CSI-RS resources indicated/configured in the CSI resource subset/group such that the first TTD configuration is associated/mapped to the first CSI-RS resource in the CSI resource subset/group, the second TTD configuration is associated/mapped to the second CSI-RS resource in the CSI resource subset/group, and so on, and the $N_k$-th TTD configuration is associated/mapped to the $N_k$-th CSI-RS resource in the CSI resource subset/group.

For another example, the set of $N_k$ TTD configurations could be explicitly indicated/included in the higher layer parameter, e.g., CSI-SSB-ResourceSubset or NZP-CSI-RS-ResourceSubSet that configures a CSI resource subset/group and/or one or more MAC CE commands and/or one or more DCIs (e.g., via one or more new DCI fields or repurposing one or more bits/codepoints of one or more existing DCI fields). Furthermore, the UE 116 could be indicated/configured/provided by the network 130, via higher layer RRC signaling/parameter and/or MAC CE command and/or dynamic DCI based signaling, the association/mapping between the $N_k$ TTD configurations and the $N_k$ CSI-RS resources configured in the CSI resource subset/group.

For yet another example, the higher layer parameter that configures a CSI-RS resource (e.g., NZP-CSI-RS-Resource) or the higher layer parameter that configures/provides resource allocation for a CSI-RS resource (e.g., CSI-RS-ResourceMapping or CSI-FrequencyOccupation) could explicitly indicate/include the TTD configuration corresponding/associated to the CSI-RS resource.

For yet another example, a MAC CE command could indicate a TTD configuration for a CSI-RS resource configured in the CSI resource subset/group. For this case, the corresponding CSI-RS resource ID could be included/provided in the MAC CE command.

For yet another example, a MAC CE command could indicate the $N_k$ TTD configurations each for a CSI-RS resource configured/indicated in a CSI resource subset/group for FSBM. The set of $N_k$ TTD configurations provided in the MAC CE command are one-to-one mapped to the $N_k$ CSI-RS resources indicated/configured in the CSI resource subset/group such that the first TTD configuration in the MAC CE command is associated/mapped to the first CSI-RS resource in the CSI resource subset/group, the second TTD configuration in the MAC CE command is associated/mapped to the second CSI-RS resource in the CSI resource subset/group, and so on, and the $N_k$-th TTD configuration in the MAC CE command is associated/mapped to the $N_k$-th CSI-RS resource in the CSI resource subset/group. For this case, the corresponding CSI resource subset/group ID could be included/provided in the MAC CE command.

For yet another example, one or more new DCI fields could be introduced in a DCI format to indicate one or more of the $N_k$ TTD configurations. Alternatively, one or more bits or codepoints of one or more existing DCI fields in a DCI format could be repurposed to indicate one or more of the $N_k$ TTD configurations. The TTD configuration(s) indicated in the DCI and the CSI-RS resource(s) indicated/configured for FSBM could be one-to-one mapped according to one or more examples described herein.

For yet another example, one or more of the above described design examples can be combined to indicate/configure one or more of the $N_k$ TTD configurations, and associate/map them to one or more of the $N_k$ CSI-RS resources in the CSI resource subset/group.

For another example, a UE could be configured by the network 130 one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM. This indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. For a CSI resource subset/group (and therefore, the corresponding CSI-RS resources configured therein for FSBM) configured in the resource set, the UE 116 could be indicated/configured by the network 130 the corresponding/ associated frequency subbands including their bandwidths/ sizes, starting RBs, etc. This indication/configuration could be via higher layer RRC signaling and/or MAC CE command and/or dynamic DCI based signaling. There are various means to indicate/configure the frequency subbands corresponding/associated with the CSI resource subset/ group (and therefore, the corresponding CSI-RS resources configured therein for FSBM).

For example, the frequency subband for FSBM, across which the $n_k$-th CSI-RS resource in the k-th CSI resource subset/group spans, could be determined according to the (existing) frequency domain resource allocation for the CSI-RS resource, where $n_k=1, \ldots, N_k$. Here, the (existing) frequency domain resource allocation for a CSI-RS resource could comprise/include/contain at least the frequency domain allocation of REs provided by frequencyDomain-Allocation in CSI-RS-ResourceMapping for the CSI-RS resource and/or the frequency domain allocation of RBs provided by CSI-FrequencyOccupation (including the starting RB provided by startingRB and the number of PRBs provided by nrofRBs) in CSI-RS-ResourceMapping for the CSI-RS resource.

For another example, the UE 116 could be provided/ indicated/configured by the network 130, e.g., via higher layer RRC signaling/parameter and/or MAC CE command and/or dynamic DCI based signaling, a set of frequency domain resource allocation parameters for the frequency subband for FSBM, across which the $n_k$-th CSI-RS resource in the k-th CSI resource subset/group spans, where $n_k=1, \ldots, N_k$. The set of frequency domain resource allocation parameters could comprise/include/contain at least a frequency domain allocation of REs and a frequency domain allocation of RBs (comprising at least a starting RB and the number of PRBs across which the corresponding frequency subband spans). The set of frequency domain resource allocation parameters for the frequency subband could be provided in the higher layer parameter, e.g., NZP-CSI-RS-Resource, that configures the corresponding CSI-RS resource (i.e., the $n_k$-th CSI-RS resource in the k-th CSI resource subset/group in this example), and/or the higher layer parameter, e.g., CSI-RS-ResourceMapping/CSI-FrequencyOccupation, that provides resource allocation for the corresponding CSI-RS resource (i.e., the $n_k$-th CSI-RS resource in the k-th CSI resource subset/group in this example). Alternatively, the set of frequency domain resource allocation parameters discussed above could be indicated in one or more DCIs, via one or more new DCI fields or by repurposing one or more bits/codepoints of one or more existing DCI fields in the DCI(s). Optionally, the set of frequency domain resource allocation parameters discussed above could be indicated/provided/included in one or more MAC CE commands. For this case, a MAC CE command could also include/indicate/provide the corresponding CSI-RS resource ID/index and or frequency subband index.

For yet another example, the UE 116 could receive from the network 130, via higher layer RRC signaling (e.g., in NZP-CSI-RS-Resource, CSI-RS-ResourceMapping or CSI-FrequencyOccupation) and/or MAC CE command and/or dynamic DCI based signaling, a bitmap to indicate/provide the frequency domain resource allocation (e.g., configuration of a frequency subband) for the $n_k$-th CSI-RS resource in the k-th CSI resource subset/group, where $n_k=1, \ldots, N_k$. Each bit position/entry in a bitmap could correspond to a PRB or PRB index among all the PRBs across which all the $N_k$ CSI-RS resources in the k-th CSI resource subset/group spans. If a bit position/entry of a bitmap is set to '1' (or '0'), the corresponding PRB or PRB index is allocated for the frequency subband for the CSI-RS resource corresponding/ associated with the bitmap. A bitmap for a CSI-RS resource (and therefore, the corresponding frequency subband) could contain/comprise more than one bit positions/entries set to '1' (or '0'). Different bitmaps for different CSI-RS resources could have the same bit position(s)/entry(s) set to '1' (or '0') meaning that different frequency subbands for different CSI-RS resources in a CSI resource subset/group for FSBM could be overlapped in frequency. If the frequency subband size/allocation for a CSI-RS resource (e.g., the bitmap discussed above) is indicated via one or more DCIs, one or more new DCI fields can be introduced to indicate the bitmap. Alternatively, one or more bits/codepoints of one or more existing DCI fields could be repurposed to indicate the bitmap. If the frequency subband size/allocation for a CSI-RS resource (e.g., the bitmap discussed above) is indicated in one or more MAC CE commands, a MAC CE command could also indicate/provide/include the corresponding CSI-RS resource ID/index and/or frequency subband index(es).

For yet another example, the higher layer parameter that configures a CSI resource subset/group (e.g., the k-th CSI resource subset/group in the resource set), e.g., NZP-CSI-RS-ResourceSubSet, could indicate/include $N_k$ CSI-RS resource mapping configurations each for a frequency subband. A CSI-RS resource mapping configuration could contain/comprise at least a CSI-RS resource ID/index or a frequency subband index, a frequency domain allocation of REs for a CSI-RS resource/frequency subband, and a frequency domain allocation of RBs for a CSI-RS resource/ frequency subband. The frequency domain allocation of RBs for a CSI-RS resource/frequency subband could contain/comprise at least a starting RB and a number of PRBs across which the corresponding CSI-RS resource/frequency subband spans. For this case, the higher layer parameter NZP-CSI-RS-ResourceSubSet that indicates/provides the $N_k$ CSI-RS resource mapping configurations could also include/provide/indicate the $N_k$ CSI-RS resource IDs/indexes and/or the $N_k$ frequency subband indexes each associated/mapped to a CSI-RS resource mapping configuration indicated/configured therein. Alternatively, one or more of the above discussed $N_k$ CSI-RS resource mapping configurations could be indicated in one or more DCIs, via one or more new DCI fields or by repurposing one or more bits/ codepoints of one or more existing DCI fields in the DCI(s). Optionally, one or more of the above discussed $N_k$ CSI-RS resource mapping configurations could be indicated/provided/included in one or more MAC CE commands. For this case, a MAC CE command could also include/indicate/ provide the corresponding CSI resource subset/group ID and/or CSI-RS resource ID(s)/index(es) and/or frequency subband index(es). The $N_k$ CSI-RS resource mapping configurations discussed above, and the $N_k$ CSI-RS resources configured in the k-th CSI resource subset/group for JPTA measurement could be one-to-one mapped. For instance, the first CSI-RS resource mapping configuration could correspond to the first CSI-RS resource in the CSI resource subset/group, the second CSI-RS resource mapping configuration could correspond to the second CSI-RS resource in the CSI resource subset/group, and so on, and the $N_k$-th CSI-RS resource mapping configuration could correspond to the $N_k$-th CSI-RS resource in the CSI resource subset/group. Alternatively, the UE 116 could be indicated/provided by the network 130, e.g., via higher layer RRC signaling/parameter and/or MAC CE command and/or dynamic DCI based signaling, the mapping/association between the $N_k$ CSI-RS resource mapping configurations and the $N_k$ CSI-RS resources configured in the k-th CSI resource subset/group.

For yet another example, the UE 116 could receive from the network 130, via higher layer RRC signaling (e.g., in a CSI resource subset/group provided by NZP-CSI-RS-ResourceSubSet) and/or MAC CE command and/or dynamic DCI based signaling, one or more bitmaps (e.g., $N_k$ bitmaps) each for a frequency subband corresponding/associated to a CSI-RS resource (e.g., the $n_k$-th CSI-RS resource in the k-th CSI resource subset/group for FSBM). Each bit position/ entry in a bitmap could correspond to a PRB or PRB index among all the PRBs across which all the $N_k$ CSI-RS resources in the k-th CSI resource subset/group spans. If a bit position/entry of a bitmap is set to '1' (or '0'), the corresponding PRB or PRB index is allocated for the frequency subband for the CSI-RS resource corresponding/ associated with the bitmap. A bitmap for a CSI-RS resource/ frequency subband could contain/comprise more than one bit positions/entries set to '1' (or '0'). Different bitmaps for different CSI-RS resources could have the same bit position(s)/entry(s) set to '1' (or '0') meaning that different frequency subbands for different CSI-RS resources configured in a CSI resource subset/group for FSBM could be overlapped in frequency. For this case, the higher layer parameter NZP-CSI-RS-ResourceSubSet that indicates/provides the $N_k$ bitmaps could also include/provide/indicate $N_k$ CSI-RS resource IDs/indexes and/or $N_k$ frequency subband indexes each associated/mapped to a bitmap indicated/configured therein. If the frequency subband size/allocation for one or more CSI-RS resources in the CSI resource subset/ group (e.g., the one or more bitmaps discussed above) is indicated via one or more DCIs, one or more new DCI fields can be introduced to indicate the one or more bitmaps. Alternatively, one or more bits/codepoints of one or more existing DCI fields could be repurposed to indicate the one or more bitmaps. If the frequency subband size/allocation for one or more CSI-RS resources in the CSI resource subset/group (e.g., the one or more bitmaps discussed above) is indicated in one or more MAC CE commands, a MAC CE command could also indicate/provide/include the corresponding CSI resource subset/group ID and/or CSI-RS resource ID(s)/index(es) and/or frequency subband index(es). The $N_k$ bitmaps discussed above, and the $N_k$ CSI-RS resources configured in the k-th CSI resource subset/group for FSBM could be one-to-one mapped. For instance, the first bitmap could correspond to the first CSI-RS resource in the CSI resource subset/group, the second bitmap could correspond to the second CSI-RS resource in the CSI resource subset/group, and so on, and the $N_k$-th bitmap could correspond to the $N_k$-th CSI-RS resource in the CSI resource subset/group. Alternatively, the UE 116 could be indicated/provided by the network 130, e.g., via higher layer RRC signaling/parameter and/or MAC CE command and/or dynamic DCI based signaling, the mapping/association between the $N_k$ bitmaps and the $N_k$ CSI-RS resources configured in the k-th CSI resource subset/group.

For yet another example, the UE 116 could receive from the network 130, via higher layer RRC signaling (e.g., in a CSI resource subset/group provided by NZP-CSI-RS-ResourceSubSet) and/or MAC CE command and/or dynamic DCI based signaling, a bitmap for one or more of the frequency subbands corresponding/associated to one or more of the $N_k$ CSI-RS resources configured in the k-th CSI resource subset/group for FSBM. Each bit position/entry in the bitmap could correspond to a PRB or PRB index among all the PRBs across which all the $N_k$ CSI-RS resources in the k-th CSI resource subset/group spans. Furthermore, each bit position/entry in the bitmap could be mapped/associated with a frequency subband for a CSI-RS resource. The mapping/association between the bit positions/entries in the bitmap and the frequency subbands for the CSI-RS resources in a CSI resource subset/group could be fixed. For instance, the bitmap can be partitioned into $N_k$ parts each comprising one or more bit positions/entries. For this case, the first part of the bitmap could correspond to the first frequency subband for the first CSI-RS resource in the CSI resource subset/group, the second part of the bitmap could correspond to the second frequency subband for the second CSI-RS resource in the CSI resource subset/group, and so on, and the $N_k$-th part of the bitmap could correspond to the $N_k$-th frequency subband for the $N_k$-th CSI-RS resource in the CSI resource subset/group. The UE 116 could be provided/indicated/configured by the network 130, via higher layer RRC signaling and/or MAC CE command and/or dynamic DCI based signaling, how the bitmap is partitioned. Alternatively, the UE 116 could be provided/indicated/configured by the network 130, via higher layer RRC signaling and/or MAC CE command and/or dynamic DCI based signaling, the mapping/association between the bit positions/entries in the bitmap and the frequency subbands for the corresponding CSI-RS resources in the CSI resource subset/group for FSBM. If a bit position/entry of a bitmap is set to '1' (or '0'), the corresponding PRB or PRB index is allocated for the frequency subband (and therefore, the corresponding CSI-RS resource) corresponding/associated to the bit position/entry. The bitmap could contain/comprise more than one bit positions/entries set to '1' (or '0'). The higher layer parameter(s), e.g., NZP-CSI-RS-ResourceSubSet, that provides the bitmap could also include/provide/ indicate the $N_k$ CSI-RS resource IDs/indexes and/or the $N_k$ frequency subband indexes each associated/mapped to one or more bit positions/entries (e.g., a part discussed above) in the bitmap. If the frequency subband size/allocation for one or more CSI-RS resources in the CSI resource subset/group (e.g., the bitmap discussed above) is indicated via one or more DCIs, one or more new DCI fields can be introduced to indicate the bitmap. Alternatively, one or more bits/ codepoints of one or more existing DCI fields could be repurposed to indicate the bitmap. If the frequency subband size/allocation for one or more CSI-RS resources in the CSI resource subset/group (e.g., the bitmap discussed above) is indicated in one or more MAC CE commands, a MAC CE command could also indicate/provide/include the corresponding CSI resource subset/group ID and/or CSI-RS resource ID(s)/index(es) and/or frequency subband index(es).

For yet another example, the UE 116 could receive from the network 130 one or more MAC CE activation commands (e.g., $N_k$ MAC CE activation commands) each for a frequency subband corresponding/associated to a CSI-RS resource configured in a CSI resource subset/group for FSBM (e.g., the $n_k$-th CSI-RS resource in the k-th CSI resource subset/group in the resource set). Each MAC CE activation command could activate one or more PRBs or PRB indexes—from all the PRBs across which all the $N_k$ CSI-RS resources in the k-th CSI resource subset/group spans—for the corresponding/associated frequency subband (and therefore, the corresponding CSI-RS resource). For this case, each MAC CE activation command could include/provide/indicate the corresponding CSI resource subset/group ID/index and/or CSI-RS resource ID/index and frequency subband index.

For yet another example, the UE 116 could receive from the network 130 a MAC CE activation command activating one or more PRBs or PRB indexes—from all the PRBs across which all the $N_k$ CSI-RS resources in the k-th CSI resource subset/group spans—for one or more of the frequency subbands corresponding/associated to the one or more of the $N_k$ CSI-RS resources in the k-th CSI resource subset/group for FSBM. For instance, for the k-th CSI resource subset/group in the resource set, the MAC CE activation command could activate one or more PRBs or PRB indexes—from all the PRBs across which all the $N_k$ CSI-RS resources in the k-th CSI resource subset/group spans—for the first frequency subband corresponding/associated to the first CSI-RS resource in the CSI resource subset/group, one or more PRBs or PRB indexes—from all the PRBs across which all the $N_k$ CSI-RS resources in the k-th CSI resource subset/group spans—for the second frequency subband corresponding/associated to the second CSI-RS resource in the CSI resource subset/group, and so on, and one or more PRBs or PRB indexes—from all the PRBs across which all the $N_k$ CSI-RS resources in the k-th CSI resource subset/group spans—for the $N_k$-th frequency subband corresponding/associated to the $N_k$-th CSI-RS resource in the CSI resource subset/group. For this case, the MAC CE activation command could include/provide/indicate the corresponding CSI resource subset/group ID and/or CSI-RS resource ID(s)/index(es) and/or frequency subband index(es).

For yet another example, the frequency subbands for different CSI-RS resources configured in the same CSI resource subset/group—e.g., the $N_k$ frequency subbands for the $N_k$ CSI-RS resources configured in the k-th CSI resource subset/group in the CSI resource set—could have the same bandwidth/size. For this case, the UE 116 could be provided by the network 130, via higher layer RRC signaling (e.g., in a CSI resource subset/group provided by NZP-CSI-RS-ResourceSubSet, or in a CSI-RS resource provided by NZP-CSI-RS-Resource, CSI-RS-ResourceMapping or CSI-FrequencyOccupation) and/or MAC CE command and/or dynamic DCI based signaling, a common frequency subband bandwidth/size (e.g., in number of PRBs) and/or one or more starting RBs of one or more frequency subbands. In addition, the frequency subbands for different CSI-RS resources configured in the same CSI resource subset/group—e.g., the $N_k$ frequency subbands for the $N_k$ CSI-RS resources configured in the k-th CSI resource subset/group in the CSI resource set—could equally divide the total PRBs across which all the $N_k$ CSI-RS resources in the k-th CSI resource subset/group spans. For this case, the UE 116 could be provided by the network 130, via higher layer RRC signaling (e.g., in a CSI resource subset/group provided by NZP-CSI-RS-ResourceSubSet, or in a CSI-RS resource provided by NZP-CSI-RS-Resource, CSI-RS-ResourceMapping or CSI-FrequencyOccupation) and/or MAC CE command and/or dynamic DCI based signaling, one or more starting RBs of one or more frequency subbands for one or more CSI-RS resources configured in the CSI resource subset/group.

For yet another example, the higher layer parameter that configures a CSI resource set for FSBM, e.g., CSI-SSB-ResourceSet or NZP-CSI-RS-ResourceSet, could include/indicate K sets of frequency domain resource allocation parameters each corresponding/associated to a CSI resource subset/group configured therein. A set of frequency domain resource allocation parameters could comprise at least one or more (e.g., $N_k$) frequency domain allocations of REs for one or more frequency subbands corresponding/associated with one or more CSI-RS resources configured in a CSI resource subset/group (e.g., the $N_k$ CSI-RS resources in the k-th CSI resource subset/group in the resource set) and one or more (e.g., $N_k$) frequency domain allocations of RBs (comprising at least a starting RB and the number of PRBs across which the corresponding CSI-RS resource/frequency subband spans) for one or more frequency subbands corresponding/associated to one or more CSI-RS resources configured in a CSI resource subset/group (e.g., the $N_k$ CSI-RS resources in the k-th CSI resource subset/group in the resource set). In one example, the K sets of frequency domain resource allocation parameters and the K CSI resource subsets/groups configured in the same CSI resource set are one-to-one mapped. For instance, the first set of frequency domain resource allocation parameters could correspond to the first CSI resource subset/group (and therefore, the $N_1$ CSI-RS resources for FSBM configured therein) in the CSI resource set, the second set of frequency domain resource allocation parameters could correspond to the second CSI resource subset/group (and therefore, the $N_2$ CSI-RS resources for FSBM configured therein) in the CSI resource set, and so on, and the K-th set of frequency domain resource allocation parameters could correspond to the K-th CSI resource subset/group (and therefore, the $N_K$ CSI-RS resources for FSBM configured therein) in the CSI resource set. In another example, the UE 116 could be indicated/provided by the network 130, e.g., via higher layer RRC signaling/parameter and/or MAC CE command and/or dynamic DCI based signaling, the mapping/association between the K sets of frequency domain resource allocation parameters and the K CSI resource subsets/groups (and therefore, the corresponding CSI-RS resources for FSBM configured therein) configured in the same CSI resource set. Optionally, the higher layer parameter(s), e.g., CSI-SSB-ResourceSet/NZP-CSI-RS-ResourceSet, that configures a CSI resource set and provides the K sets of frequency domain resource allocation parameters could also include/provide/indicate the K CSI resource subset IDs/indexes each associated/mapped to a set of frequency domain resource allocation parameters discussed above. Alternatively, one or more of the above discussed K sets of frequency domain resource allocation parameters could be indicated in one or more DCIs, via one or more new DCI fields or by repurposing one or more bits/codepoints of one or more existing DCI fields in the DCI(s). One or more of the above discussed K sets of frequency domain resource allocation parameters could also be indicated in one or more MAC CE commands. For this case, the MAC CE command(s) that provides/indicates the K sets of frequency domain resource allocation parameters could also include/provide/indicate the K CSI resource subset IDs/indexes each associated/mapped to a set of frequency domain resource allocation parameters discussed above. For both MAC CE and DCI based indication of the K sets of frequency domain resource allocation parameters, the association/mapping between the MAC CE/DCI indicated K sets of frequency domain resource allocation parameters and the K CSI resource subsets/groups (and therefore, the corresponding CSI-RS resources for FSBM configured therein) configured in the same CSI resource set could follow those discussed above for the RRC based configuration/indication of the K sets of frequency domain resource allocation parameters.

For yet another example, the higher layer parameter that configures a CSI resource setting comprising at least one CSI resource set for FSBM, e.g., CSI-ResourceConfig, could include/indicate K sets of frequency domain resource allocation parameters each corresponding/associated to a CSI resource subset/group configured in the CSI resource set(s) for FSBM. A set of frequency domain resource allocation parameters could comprise at least one or more (e.g., $N_k$) frequency domain allocations of REs for one or more frequency subbands corresponding/associated with one or more CSI-RS resources configured in a CSI resource subset/group (e.g., the $N_k$ CSI-RS resources in the k-th CSI resource subset/group in the resource set for FSBM) and one or more (e.g., $N_k$) frequency domain allocations of RBs (comprising at least a starting RB and the number of PRBs across which the corresponding CSI-RS resource/frequency subband spans) for one or more frequency subbands corresponding/associated to one or more CSI-RS resources in a CSI resource subset/group (e.g., the $N_k$ CSI-RS resources in the k-th CSI resource subset/group in the resource set for FSBM). In one example, the K sets of frequency domain resource allocation parameters configured in the CSI resource setting and the K CSI resource subsets/groups configured in the CSI resource set(s) for FSBM are one-to-one mapped. For instance, the first set of frequency domain resource allocation parameters in the CSI resource setting could correspond to the first CSI resource subset/group (and therefore, the $N_1$ CSI-RS resources for FSBM configured therein) in the CSI resource set(s) for FSBM, the second set of frequency domain resource allocation parameters in the CSI resources setting could correspond to the second CSI resource subset/group (and therefore, the $N_2$ CSI-RS resources for FSBM configured therein) in the CSI resource set(s) for FSBM, and so on, and the K-th set of frequency domain resource allocation parameters in the CSI resource setting could correspond to the K-th CSI resource subset/group (and therefore, the $N_K$ CSI-RS resources for FSBM configured therein) in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K sets of frequency domain resource allocation parameters in the CSI resource setting and the K CSI resource subsets/groups (and therefore, the corresponding CSI-RS resources for FSBM configured therein) configured in the CSI resource set(s) for FSBM. Optionally, the higher layer parameter(s), e.g., CSI-ResourceConfig, that configures a CSI resource setting and provides the K sets of frequency domain resource allocation parameters could also include/provide/indicate the K CSI resource subset IDs/indexes each associated/mapped to a set of frequency domain resource allocation parameters discussed above. Alternatively, one or more of the above discussed K sets of frequency domain resource allocation parameters could be indicated in one or more DCIs, via one or more new DCI fields or by repurposing one or more bits/codepoints of one or more existing DCI fields in the DCI(s). One or more of the above discussed K sets of frequency domain resource allocation parameters could also be indicated in one or more MAC CE commands. For this case, the MAC CE command(s) that provides/indicates the K sets of frequency domain resource allocation parameters could also include/provide/indicate the K CSI resource subset IDs/indexes each associated/mapped to a set of frequency domain resource allocation parameters discussed above. For both MAC CE and DCI based indication of the K sets of frequency domain resource allocation parameters, the association/mapping between the MAC CE/DCI indicated K sets of frequency domain resource allocation parameters and the K CSI resource subsets/groups (and therefore, the corresponding CSI-RS resources for FSBM configured therein) configured in the CSI resource set(s) for FSBM could follow those discussed above for the RRC based configuration/indication of the K sets of frequency domain resource allocation parameters.

For yet another example, the higher layer parameter that configures a CSI resource set for FSBM, e.g., CSI-SSB-ResourceSet or NZP-CSI-RS-ResourceSet, could include/indicate K sets of bitmaps with each set comprising one or more bitmaps for a CSI resource subset/group (e.g., a set of $N_k$ bitmaps for the $N_k$ CSI-RS resources configured in the k-th CSI resource subset/group in the resource set). In this example, the configuration/indication of the one or more bitmaps in a set, and the association/mapping between the one or more bitmaps in a set and the frequency subband(s) for the corresponding CSI-RS resource(s) could follow one or more examples described herein. In one example, the K sets of bitmaps and the K CSI resource subsets/groups configured in the same CSI resource set are one-to-one mapped. For instance, the first set of bitmaps could correspond to the first CSI resource subset/group (and therefore, the $N_1$ CSI-RS resources for FSBM configured therein) in the CSI resource set, the second set of bitmaps could correspond to the second CSI resource subset/group (and therefore, the $N_2$ CSI-RS resources for FSBM configured therein) in the CSI resource set, and so on, and the K-th set of bitmaps could correspond to the K-th CSI resource subset/group (and therefore, the $N_K$ CSI-RS resources for FSBM configured therein) in the CSI resource set. In another example, the UE 116 could be indicated/provided by the network 130, e.g., via higher layer RRC signaling/parameter and/or MAC CE command and/or dynamic DCI based signaling, the mapping/association between the K sets of bitmaps and the K CSI resource subsets/groups (and therefore, the corresponding CSI-RS resources for FSBM configured therein) configured in the CSI resource set. Optionally, the higher layer parameter(s), e.g., CSI-SSB-ResourceSet/NZP-CSI-RS-ResourceSet, that configures a CSI resource set and provides the K sets of bitmaps could also include/provide/indicate the K CSI resource subset IDs/indexes each associated/mapped to a set of bitmaps discussed above. Alternatively, one or more of the above discussed K sets of bitmaps could be indicated in one or more DCIs, via one or more new DCI fields or by repurposing one or more bits/codepoints of one or more existing DCI fields in the DCI(s). The association/mapping between the DCI indicated K sets of bitmaps and the K CSI resource subsets/groups (and therefore, the corresponding CSI-RS resources for FSBM configured therein) configured in the same CSI resource set could follow those discussed above for the RRC based configuration/indication of the K sets of bitmaps.

For yet another example, the higher layer parameter that configures a CSI resource setting comprising at least one CSI resource set for FSBM, e.g., CSI-ResourceConfig, could include/indicate K sets of bitmaps with each set comprising one or more bitmaps for a CSI resource subset/ group configured in the CSI resource set(s) for FSBM (e.g., a set of $N_k$ bitmaps for the $N_k$ CSI-RS resources configured in the k-th CSI resource subset/group in the resource set). In this example, the configuration/indication of the one or more bitmaps in a set, and the association/mapping between the one or more bitmaps in a set and the frequency subband(s) for the corresponding CSI-RS resource(s) could follow those according to one or more examples described herein. In one example, the K sets of bitmaps in the CSI resource setting and the K CSI resource subsets/groups configured in the CSI resource set(s) for FSBM are one-to-one mapped. For instance, the first set of bitmaps in the CSI resource setting could correspond to the first CSI resource subset/group (and therefore, the $N_1$ CSI-RS resources for FSBM configured therein) in the CSI resource set(s) for FSBM, the second set of bitmaps in the CSI resource setting could correspond to the second CSI resource subset/group (and therefore, the $N_2$ CSI-RS resources for FSBM configured therein) in the CSI resource set(s) for FSBM, and so on, and the K-th set of bitmaps in the CSI resource setting could correspond to the K-th CSI resource subset/group (and therefore, the $N_K$ CSI-RS resources for FSBM configured therein) in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K sets of bitmaps configured in the CSI resource setting and the K CSI resource subsets/ groups (and therefore, the corresponding CSI-RS resources for FSBM configured therein) configured in the CSI resource set(s) for FSBM. Optionally, the higher layer parameter(s), e.g., CSI-ResourceConfig, that configures a CSI resource setting and provides the K sets of bitmaps could also include/provide/indicate the K CSI resource subset IDs/indexes each associated/mapped to a set of bitmaps discussed above. Alternatively, one or more of the above discussed K sets of bitmaps could be indicated in one or more DCIs, via one or more new DCI fields or by repurposing one or more bits/codepoints of one or more existing DCI fields in the DCI(s). The association/mapping between the DCI indicated K sets of bitmaps and the K CSI resource subsets/groups (and therefore, the corresponding CSI-RS resources for FSBM configured therein) configured in the CSI resource set(s) for FSBM could follow those discussed above for the RRC based configuration/indication of the K sets of bitmaps.

For yet another example, the higher layer parameter that configures a CSI resource set for FSBM, e.g., CSI-SSB-ResourceSet or NZP-CSI-RS-ResourceSet, could include/ indicate K bitmaps each corresponding/associated to a CSI resource subset/group configured therein. In this example, the configuration/indication of a bitmap, and the association/ mapping between each bit position/entry in a bitmap and the frequency subband(s) for the corresponding CSI-RS resource(s) could follow those according to one or more examples described herein. In one example, the K bitmaps and the K CSI resource subsets/groups configured in the same CSI resource set are one-to-one mapped. For instance, the first bitmap could correspond to the first CSI resource subset/group (and therefore, the $N_1$ CSI-RS resources for FSBM configured therein) in the CSI resource set, the second bitmap could correspond to the second CSI resource subset/group (and therefore, the $N_2$ CSI-RS resources for FSBM configured therein) in the CSI resource set, and so on, and the K-th bitmap could correspond to the K-th CSI resource subset/group (and therefore, the $N_K$ CSI-RS resources for FSBM configured therein) in the CSI resource set. In another example, the UE 116 could be indicated/ provided by the network 130, e.g., via higher layer RRC signaling/parameter and/or MAC CE command and/or dynamic DCI based signaling, the mapping/association between the K bitmaps and the K CSI resource subsets/ groups (and therefore, the corresponding CSI-RS resources for FSBM configured therein) configured in the CSI resource set. Optionally, the higher layer parameter(s), e.g., CSI-SSB-ResourceSet or NZP-CSI-RS-ResourceSet, that configures a CSI resource set and provides the K bitmaps could also include/provide/indicate the K CSI resource subset IDs/indexes each associated/mapped to a bitmap discussed above. Alternatively, one or more of the above discussed K bitmaps could be indicated in one or more DCIs, via one or more new DCI fields or by repurposing one or more bits/codepoints of one or more existing DCI fields in the DCI(s). The association/mapping between the DCI indicated K bitmaps and the K CSI resource subsets/groups (and therefore, the corresponding CSI-RS resources for FSBM configured therein) configured in the same CSI resource set could follow those discussed above for the RRC based configuration/indication of the K bitmaps.

For yet another example, the higher layer parameter that configures a CSI resource setting comprising at least one CSI resource set for FSBM, e.g., CSI-ResourceConfig, could include/indicate K bitmaps each corresponding/asso-ciated to a CSI resource subset/group configured in the CSI resource set(s) for FSBM. In this example, the configura-tion/indication of a bitmap, and the association/mapping between each bit position/entry in a bitmap and the fre-quency subband(s) for the corresponding CSI-RS resource(s) could follow those according to one or more examples described herein. In one example, the K bitmaps in the CSI resource setting and the K CSI resource subsets/ groups configured in the CSI resource set(s) for FSBM are one-to-one mapped. For instance, the first bitmap in the CSI resource setting could correspond to the first CSI resource subset/group (and therefore, the $N_1$ CSI-RS resources for FSBM configured therein) in the CSI resource set(s) for FSBM, the second bitmap in the CSI resource setting could correspond to the second CSI resource subset/group (and therefore, the $N_2$ CSI-RS resources for FSBM configured therein) in the CSI resource set(s) for FSBM, and so on, and the K-th bitmap in the CSI resource setting could correspond to the K-th CSI resource subset/group (and therefore, the $N_K$ CSI-RS resources for FSBM configured therein) in the CSI resource set(s) for FSBM. In another example, the UE 116 could be indicated/provided by the network 130, e.g., via higher layer RRC signaling/parameter and/or MAC CE command and/or dynamic DCI based signaling, the map-ping/association between the K bitmaps configured in the CSI resource setting and the K CSI resource subsets/groups (and therefore, the corresponding CSI-RS resources for FSBM configured therein) configured in the CSI resource set(s) for FSBM. Optionally, the higher layer parameter(s), e.g., CSI-ResourceConfig, that configures a CSI resource setting and provides the K bitmaps could also include/ provide/indicate the K CSI resource subset IDs/indexes each associated/mapped to a bitmap discussed above. Alterna-tively, one or more of the above discussed K bitmaps could be indicated in one or more DCIs, via one or more new DCI fields or by repurposing one or more bits/codepoints of one or more existing DCI fields in the DCI(s). The association/ mapping between the DCI indicated K bitmaps and the K CSI resource subsets/groups (and therefore, the corresponding CSI-RS resources for FSBM configured therein) configured in the CSI resource set(s) for FSBM could follow those discussed above for the RRC based configuration/ indication of the K bitmaps.

For yet another example, the UE 116 could receive from the network 130 a MAC CE command indicating/providing/ including K sets of bitmaps with each set comprising one or more bitmaps for a CSI resource subset/group (and therefore, the corresponding CSI-RS resources configured therein) configured in the CSI resource set(s) for FSBM (e.g., a set of $N_k$ bitmaps for the $N_k$ CSI-RS resources configured in the k-th CSI resource subset/group in the resource set). In this example, the configuration/indication of the one or more bitmaps in a set, and the association/ mapping between the one or more bitmaps in a set and the frequency subband(s) for the corresponding CSI-RS resource(s) could follow those according to one or more examples described herein. In one example, the K sets of bitmaps in the MAC CE command and the K CSI resource subsets/groups configured in the CSI resource set(s) for FSBM are one-to-one mapped. For instance, the first set of bitmaps in the MAC CE command could correspond to the first CSI resource subset/group (and therefore, the $N_1$ CSI-RS resources for FSBM configured therein) in the CSI resource set(s) for FSBM, the second set of bitmaps in the MAC CE command could correspond to the second CSI resource subset/group (and therefore, the $N_2$ CSI-RS resources for FSBM configured therein) in the CSI resource set(s) for FSBM, and so on, and the K-th set of bitmaps in the MAC CE command could correspond to the K-th CSI resource subset/group (and therefore, the $N_K$ CSI-RS resources for FSBM configured therein) in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K sets of bitmaps configured in the MAC CE command and the K CSI resource subsets/groups (and therefore, the corresponding CSI-RS resources for FSBM configured therein) configured in the CSI resource set(s) for FSBM. Optionally, the MAC CE command that provides/ indicates the K sets of bitmaps could also include/provide/ indicate the K CSI resource subset IDs/indexes each associated/mapped to a set of bitmaps discussed above.

For yet another example, a UE could receive from the network 130 a MAC CE command indicating/providing/ including K bitmaps each corresponding/associated to a CSI resource subset/group configured in a CSI-RS resource set for FSBM. In this example, the configuration/indication of a bitmap, and the association/mapping between each bit position/entry in a bitmap and the frequency subband(s) for the corresponding CSI-RS resource(s) could follow those according to one or more examples described herein. In one example, the K bitmaps indicated in the MAC CE command and the K CSI resource subsets/groups configured in the CSI resource set(s) for FSBM are one-to-one mapped. For instance, the first bitmap in the MAC CE command could correspond to the first CSI resource subset/group (and therefore, the $N_1$ CSI-RS resources for FSBM configured therein) in the CSI resource set(s) for FSBM, the second bitmap in the MAC CE command could correspond to the second CSI resource subset/group (and therefore, the $N_2$ CSI-RS resources for FSBM configured therein) in the CSI resource set(s) for FSBM, and so on, and the K-th bitmap in the MAC CE command could correspond to the K-th CSI resource subset/group (and therefore, the $N_K$ CSI-RS resources for FSBM configured therein) in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K bitmaps in the MAC CE command and the K CSI resource subsets/groups (and therefore, the corresponding CSI-RS resources for FSBM configured therein) configured in the CSI resource set(s) for FSBM. Optionally, the MAC CE command that provides/indicates the K bitmaps could also include/provide/indicate the K CSI resource subset IDs/indexes each associated/mapped to a bitmap discussed above.

For yet another example, one or more of the above described design examples can be combined to indicate/ configure one or more frequency subbands for one or more CSI-RS resources in each of the K CSI resource subsets/ groups configured in the CSI resource set(s) for FSBM.

A UE could be configured by the network 130 one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM. This indication could be via higher layer RRC signaling/param-eter and/or MAC CE command and/or dynamic DCI based signaling. For instance, a higher layer parameter, e.g., denoted by FreqSelectiveBeamMeasurement, could be indi-cated/provided in CSI-ResourceConfig to turn on/off the frequency-selective beam measurement for FSBM. For a CSI resource subset/group configured in the CSI resource set for FSBM, and therefore, the corresponding/associated fre-quency subbands (e.g., the $N_k$ frequency subbands for the $N_k$ CSI-RS resources configured in the k-th CSI resource sub-set/group in the resource set for FSBM) configured/indicated according to one or more of the above discussed design examples, the UE 116 could be further indicated/configured/ provided by the network 130, via higher layer RRC signal-ing/parameter and/or MAC CE command and/or dynamic DCI based signaling, one or more of the total configured/ indicated frequency subbands (e.g., one or more of the $N_k$ frequency subbands for the k-th CSI resource subset/group in the resource set), and therefore, the corresponding one or more of the total configured/indicated CSI-RS resources in the CSI resource subset/group (e.g., one or more of the $N_k$ CSI-RS resources in the k-th CSI resource subset/group in the resource set), for FSBM.

For example, the UE 116 could receive from the network 130, via higher layer RRC signaling/parameter and/or MAC CE command and/or dynamic DCI based signaling, a bitmap of length $N_k$ for the k-th CSI resource subset/group in the resource set, where $k \in \{1, \ldots, K\}$. Each bit position/entry in the bitmap could correspond to a frequency subband, and therefore a CSI-RS resource—configured in the k-th CSI resource subset/group in the resource set—corresponding/ associated to the frequency subband. If a bit position/entry in the bitmap is set to '1' (or '0'), the corresponding frequency subband/CSI-RS resource in the CSI resource subset/group is used/active for FSBM. The bitmap could comprise more than one bit positions/entries set to '1' (or '0') indicating that more than one frequency subbands/CSI-RS resources in the CSI resource subset/group can be used/active for FSBM. The UE 116 could receive at least one bitmap for each CSI resource subset/group configured in the resource set for FSBM. For RRC based configuration:

In one example, the bitmap(s) corresponding/associated with a CSI resource subset/group could be provided in the higher layer parameter NZP-CSI-RS-ResourceSubSet that configures the CSI resource subset/group.

In another example, the higher layer parameter that configures a CSI resource set for FSBM, e.g., NZP-CSI-RS-ResourceSet, could include/indicate a set of one or more (e.g., K) such bitmaps each corresponding/associated to a CSI resource subset/group configured in the same CSI resource set. For example, the K bitmaps are one-to-one mapped to the K CSI resource subsets/groups configured in the same CSI resource set. For instance, the first bitmap could correspond to the first CSI resource subset/group (and therefore, the $N_1$ CSI-RS resources for FSBM configured therein) in the resource set, the second bitmap could correspond to the second CSI resource subset/group (and therefore, the $N_2$ CSI-RS resources for FSBM configured therein) in the resource set, and so on, and the K-th bitmap could correspond to the K-th CSI resource subset/group (and therefore, the $N_K$ CSI-RS resources for FSBM configured therein) in the resource set. For another example, the UE 116 could be provided/indicated by the network 130, via higher layer RRC signaling/parameter and/or MAC CE command and/or dynamic DCI based signaling, the mapping/association between the K bitmaps and the K CSI resource subsets/groups (and therefore, the corresponding CSI-RS resources for FSBM configured therein) indicated/configured in the same CSI resource set. Optionally, the higher layer parameter(s), e.g., CSI-SSB-ResourceSet/NZP-CSI-RS-Resource-Set, that configures a CSI resource set and provides the K bitmaps could also include/provide/indicate the K CSI resource subset/group IDs/indexes each associated/mapped to a bitmap discussed above.

In yet another example, the higher layer parameter that configures a CSI resource setting comprising at least one CSI resource set for FSBM, e.g., CSI-ResourceConfig, could include/indicate a set of one or more (e.g., K) such bitmaps each corresponding/associated to a CSI resource subset/group configured in the CSI resource set(s) for FSBM. For example, the K bitmaps provided in the CSI resource setting are one-to-one mapped to the K CSI resource subsets/groups configured in the CSI resource set(s) for FSBM. For instance, the first bitmap in the resource setting could correspond to the first CSI resource subset/group (and therefore, the $N_1$ CSI-RS resources for FSBM configured therein) in the resource set, the second bitmap in the resource setting could correspond to the second CSI resource subset/group (and therefore, the $N_2$ CSI-RS resources for FSBM configured therein) in the resource set, and so on, and the K-th bitmap in the resource setting could correspond to the K-th CSI resource subset/group (and therefore, the $N_K$ CSI-RS resources for FSBM configured therein) in the resource set. For another example, the UE 116 could be provided/indicated by the network 130, via higher layer RRC signaling/parameter and/or MAC CE command and/or dynamic DCI based signaling, the mapping/association between the K bitmaps indicated/configured in the CSI resource setting and the K CSI resource subsets/groups (and therefore, the corresponding CSI-RS resources for FSBM configured therein) indicated/configured in the CSI resource set(s) for FSBM. Optionally, the higher layer parameter(s), e.g., CSI-ResourceConfig, that configures a CSI resource setting and provides the K bitmaps could also include/provide/indicate the K CSI resource subset/group IDs/indexes each associated/mapped to a bitmap discussed above.

For the MAC CE based indication, one approach is to contain/comprise/include/provide at least one bitmap corresponding/associated to a CSI resource subset/group configured/indicated in the CSI resource set for FSBM in a MAC CE command. For this case, the MAC CE command could also contain/comprise/include the corresponding CSI resource subset/group ID.

In another example, a MAC CE command could contain/comprise/include/provide multiple (e.g., K) bitmaps each corresponding/associated to a CSI resource subset/group configured/indicated in the CSI resource set for FSBM. For example, the K bitmaps provided in the MAC CE command are one-to-one mapped to the K CSI resource subsets/groups configured in the CSI resource set(s) for FSBM. For instance, the first bitmap in the MAC CE command could correspond to the first CSI resource subset/group (and therefore, the $N_1$ CSI-RS resources for FSBM configured therein) in the resource set, the second bitmap in the MAC CE command could correspond to the second CSI resource subset/group (and therefore, the $N_2$ CSI-RS resources for FSBM configured therein) in the resource set, and so on, and the K-th bitmap in the MAC CE command could correspond to the K-th CSI resource subset/group (and therefore, the $N_K$ CSI-RS resources for FSBM configured therein) in the resource set. For another example, the UE 116 could be provided/indicated by the network 130, via higher layer RRC signaling/parameter and/or MAC CE command and/or dynamic DCI based signaling, the mapping/association between the K bitmaps indicated/configured/provided in the MAC CE command and the K CSI resource subsets/groups (and therefore, the corresponding CSI-RS resources for FSBM configured therein) indicated/configured in the CSI resource set(s) for FSBM. Optionally, the MAC CE command that provides the K bitmaps could also include/provide/indicate the K CSI resource subset/group IDs/indexes each associated/mapped to a bitmap discussed above.

For dynamic DCI based signaling, one or more new DCI fields can be introduced to indicate one or more of the bitmaps each indicating one or more frequency subbands/CSI-RS resources (in a CSI resource subset/group) for FSBM. Alternatively, one or more bits/codepoints of one or more existing DCI fields could be repurposed to indicate one or more of the bitmaps each indicating one or more frequency subbands/CSI-RS resources (in a CSI resource subset/group) for FSBM.

For another example, the UE 116 could receive from the network 130, via higher layer RRC signaling/parameter and/or MAC CE command and/or dynamic DCI based signaling, a set of one or more frequency subband indexes each determined from $\{1, \ldots, N_k\}$ for the k-th CSI resource subset/group in the resource set, where $k \in \{1, \ldots, K\}$. Here, a frequency subband index is equivalent to a CSI-RS resource ID/index, a frequency subband is equivalent to a CSI-RS resource, a set of one or more frequency subband indexes are equivalent to a set of one or more CSI-RS resource indexes/IDs, and a set of one or more frequency subbands are equivalent to a set of one or more CSI-RS resources. For this case, the frequency subband(s) corresponding to the indicated/configured/provided frequency subband index(es), and therefore, the corresponding CSI-RS resource(s) configured in the CSI resource subset/group, is used/active for FSBM. The UE 116 could receive at least one set of one or more frequency subband indexes for each CSI resource subset/group configured in the resource set for FSBM.

As an example of RRC based configuration, the set of one or more frequency subband indexes corresponding/associated to a CSI resource subset/group could be provided in the higher layer parameter NZP-CSI-RS-ResourceSubSet that configures the CSI resource subset/group.

In another example, the higher layer parameter that configures a CSI resource set for FSBM, e.g., NZP-CSI-RS-ResourceSet, could include/indicate one or more sets (e.g., K) of one or more frequency subband indexes with each set corresponding/associated to a CSI resource subset/group configured in the same CSI resource set. For example, the K sets of frequency subband index(es) are one-to-one mapped to the K CSI resource subsets/groups configured in the same CSI resource set. For instance, the first set of one or more frequency subband indexes could correspond to the first CSI resource subset/group (and therefore, the $N_1$ CSI-RS resources for FSBM configured therein) in the resource set, the second set of one or more frequency subband indexes could correspond to the second CSI resource subset/group (and therefore, the $N_2$ CSI-RS resources for FSBM configured therein) in the resource set, and so on, and the K-th set of one or more frequency subband indexes could correspond to the K-th CSI resource subset/group (and therefore, the $N_K$ CSI-RS resources for FSBM configured therein) in the resource set. For another example, the UE 116 could be provided/indicated by the network 130, via higher layer RRC signaling/parameter and/or MAC CE command and/or dynamic DCI based signaling, the mapping/association between the K sets of frequency subband index(es) and the K CSI resource subsets/groups (and therefore, the corresponding CSI-RS resources for FSBM configured therein) indicated/configured in the same CSI resource set. Optionally, the higher layer parameter(s), e.g., CSI-SSB-Resource-Set/NZP-CSI-RS-ResourceSet, that configures a CSI resource set and provides the K sets of frequency subband indexes could also include/provide/indicate the K CSI resource subset/group IDs/indexes each associated/mapped to a set of frequency subband indexes discussed above.

In yet another example, the higher layer parameter that configures a CSI resource setting comprising at least one CSI resource set for FSBM, e.g., CSI-ResourceConfig, could include/indicate one or more sets (e.g., K) of one or more frequency subband indexes with each set corresponding/associated to a CSI resource subset/group configured in the CSI resource set(s) for FSBM. For example, the K sets of frequency subband index(es) configured in the resource setting are one-to-one mapped to the K CSI resource subsets/groups configured in the CSI resource set(s) for FSBM. For instance, the first set of one or more frequency subband indexes in the resource setting could correspond to the first CSI resource subset/group (and therefore, the $N_1$ CSI-RS resources for FSBM configured therein) in the resource set, the second set of one or more frequency subband indexes in the resource setting could correspond to the second CSI resource subset/group (and therefore, the $N_2$ CSI-RS resources for FSBM configured therein) in the resource set, and so on, and the K-th set of one or more frequency subband indexes in the resource setting could correspond to the K-th CSI resource subset/group (and therefore, the $N_K$ CSI-RS resources for FSBM configured therein) in the resource set. For another example, the UE 116 could be provided/indicated by the network 130, via higher layer RRC signaling/parameter and/or MAC CE command and/or dynamic DCI based signaling, the mapping/association between the K sets of frequency subband index(es) indicated/configured in the CSI resource setting and the K CSI resource subsets/groups (and therefore, the corresponding CSI-RS resources for FSBM configured therein) indicated/configured in the CSI resource set(s) for FSBM. Optionally, the higher layer parameter(s), e.g., CSI-ResourceConfig, that configures a CSI resource setting and provides the K sets of frequency subband indexes could also include/provide/indicate the K CSI resource subset/group IDs/indexes each associated/mapped to a set of frequency subband indexes discussed above.

In one example for MAC CE based indication, a MAC CE command could contain/comprise/include/provide at least one set of frequency subband index(es) corresponding/associated to a CSI resource subset/group configured/indicated in the CSI resource set for FSBM. For this case, the MAC CE command could also contain/comprise/include/provide the corresponding CSI resource subset/group ID.

In another example, a MAC CE command could contain/comprise/include/provide multiple (e.g., K) sets of frequency subband index(es) each corresponding/associated to a CSI resource subset/group configured/indicated in the CSI resource set for FSBM. For example, the K sets of frequency subband index(es) provided in the MAC CE command are one-to-one mapped to the K CSI resource subsets/groups configured in the CSI resource set(s) for FSBM. For instance, the first set of one or more frequency subband indexes in the MAC CE command could correspond to the first CSI resource subset/group (and therefore, the $N_1$ CSI-RS resources for FSBM configured therein) in the resource set, the second set of one or more frequency subband indexes in the MAC CE command could correspond to the second CSI resource subset/group (and therefore, the $N_2$ CSI-RS resources for FSBM configured therein) in the resource set, and so on, and the K-th set of one or more frequency subband indexes in the MAC CE command could correspond to the K-th CSI resource subset/group (and therefore, the $N_K$ CSI-RS resources for FSBM configured therein) in the resource set. For another example, the UE 116 could be provided/indicated by the network 130, via higher layer RRC signaling/parameter and/or MAC CE command and/or dynamic DCI based signaling, the mapping/association between the K sets of frequency subband index(es) indicated/configured/provided in the MAC CE command and the K CSI resource subsets/groups (and therefore, the corresponding CSI-RS resources for FSBM configured therein) indicated/configured in the CSI resource set(s) for FSBM. Optionally, the MAC CE command that provides the K sets of frequency subband indexes could also include/provide/indicate the K CSI resource subset/group IDs/indexes each associated/mapped to a set of frequency subband indexes discussed above.

For dynamic DCI based signaling, one or more new DCI fields can be introduced to indicate one or more of the sets of frequency subband index(es), wherein each set could indicate one or more frequency subbands/CSI-RS resources configured in a CSI resource subset/group for FSBM. Alternatively, one or more bits/codepoints of one or more existing DCI fields in a DCI format could be repurposed to indicate one or more of the sets of frequency subband index(es), wherein each set could indicate one or more frequency subbands/CSI-RS resources in a CSI resource subset/group for FSBM.

For yet another example, the UE 116 could receive from the network 130 one or more MAC CE activation commands each activating one or more of the frequency subbands/CSI-RS resources configured in one or more CSI resource subsets/groups, where the activated one or more frequency subbands/CSI-RS resources are used/active for FSBM.

In one example, a MAC CE activation command could activate one or more of the frequency subbands configured/indicated for a CSI resource subset/group (and therefore, one or more of the CSI-RS resources configured/indicated in the CSI resource subset/group), and the activated one or more frequency subbands/CSI-RS resources in the CSI resource subset/group are used/active for FSBM. For this case, the MAC CE activation command could also contain/comprise/include/provide the corresponding CSI resource subset/group ID.

In another example, a MAC CE activation command could activate multiple (e.g., K) sets of one or more frequency subbands/CSI-RS resources with each set corresponding/associated to a CSI resource subset/group configured/indicated in the CSI resource set for FSBM. For example, the MAC CE activation command could activate the first set of one or more frequency subbands/CSI-RS resources from the $N_1$ frequency subbands/CSI-RS resources indicated/configured for/in the first CSI resource subset/group in the resource set, the second set of one or more frequency subbands/CSI-RS resources from the $N_2$ frequency subbands/CSI-RS resources indicated/configured for/in the second CSI resource subset/group in the resource set, and so on, and the K-th set of one or more frequency subbands/CSI-RS resources from the $N_K$ frequency subbands/CSI-RS resources indicated/configured for/in the K-th CSI resource subset/group in the resource set. For another example, the UE 116 could be provided/indicated by the network 130, via higher layer RRC signaling/parameter and/or MAC CE command and/or dynamic DCI based signaling, the mapping/association between the K sets of frequency subbands/CSI-RS resources activated by the MAC CE activation command and the K CSI resource subsets/groups indicated/configured in the CSI resource set(s) for FSBM. A set of frequency subbands/CSI-RS resources activated by the MAC CE activation command are used/active for FSBM. Optionally, the MAC CE activation command that activates the K sets of frequency subbands/CSI-RS resources could also include/provide/indicate the K CSI resource IDs/indexes each associated/mapped to a set of activated frequency subbands/CSI-RS resources.

For yet another example, the higher layer parameter, e.g., NZP-CSI-RS-Resource, that configures a CSI-RS resource in a CSI resource subset/group for FSBM could include/indicate/comprise an indicator. If the indicator is set to 'enabled'/'on' or the like, the corresponding CSI-RS resource (and therefore, the corresponding frequency subband) is used/active for FSBM for the corresponding CSI resource subset/group. Alternatively, the indicator could correspond to a one-big flag indicator. That is, if the one-bit flag indicator is set to '1' (or '0') or the like, the corresponding CSI-RS resource (and therefore, the corresponding frequency subband) is used/active for FSBM for the corresponding CSI resource subset/group.

In yet another example, a UE could be configured by the network 130 one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM. This indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. the UE 116 could be configured by the network 130, e.g., in a CSI resource setting provided by CSI-ResourceConfig, one or more (e.g., K≥1) CSI resource sets (each provided by, e.g., CSI-SSB-ResourceSet/NZP-CSI-RS-ResourceSet) each comprising one or more (e.g., $N_k$) CSI-RS resources for FSBM, where k=1, . . . , K. In particular, the k-th CSI resource set, and therefore, the $N_k$ CSI-RS resources configured therein, could correspond to a set of $N_k≥1$ frequency-selective beams (and therefore, the corresponding set of $N_k≥1$ frequency subbands), where each CSI-RS resource configured in the k-th CSI resource set could correspond to a frequency-selective beam (and therefore, the corresponding frequency subband). In the present disclosure, the set of $N_k≥1$ frequency-selective beams can also be referred to as a frequency-selective multi-beam. The indication/configuration of the TTD settings, TTD configurations, frequency subbands (in terms of their sizes and/or frequency domain resource allocations and/or etc.) for one or more CSI-RS resources, and the mapping/association between the TTD settings/TTD configurations/frequency subbands and the CSI-RS resources could follow those specified in the design examples according to one or more examples described herein (e.g., by replacing CSI resource subset/group with CSI resource set in one or more examples described herein). Furthermore, the activation/indication of one or more frequency subbands/CSI-RS resources in a CSI resource set for FSBM could follow those specified in the design examples according to one or more examples described herein (e.g., by replacing CSI resource subset/group with CSI resource set in one or more examples described herein).

In yet another example, a UE could be configured by the network 130 one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM. This indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. The UE 116 could be configured by the network 130 one or more (e.g., K≥1) CSI resource settings (each provided by, e.g., CSI-ResourceConfig) each comprising one or more (e.g., $N_k$) CSI-RS resources for FSBM, where k=1, . . . , K. In particular, the k-th CSI resource setting, and therefore, the $N_k$ CSI-RS resources configured therein, could correspond to a set of $N_k≥1$ frequency-selective beams (and therefore, the corresponding set of $N_k≥1$ frequency subbands), where each CSI-RS resource configured in the k-th CSI resource setting could correspond to a frequency-selective beam (and therefore, the corresponding frequency subband). In the present disclosure, the set of $N_k≥1$ frequency-selective beams can also be referred to as a frequency-selective multi-beam. The indication/configuration of the TTD settings, TTD configurations, frequency subbands (in terms of their sizes and/or frequency domain resource allocations and/or etc.) for one or more CSI-RS resources, and the mapping/association between the TTD settings/TTD configurations/frequency subbands and the CSI-RS resources could follow those specified in the design examples according to one or more examples described herein (e.g., by replacing CSI resource subset/group with CSI resource setting in one or more examples described herein). Furthermore, the activation/indication of one or more frequency subbands/CSI-RS resources in a CSI resource setting for FSBM could follow those specified in the design examples according to one or more examples described herein (e.g., by replacing CSI resource subset/ group with CSI resource setting in one or more examples described herein).

In a FSBM framework, a UE could be indicated/config-ured/provided by the network 130, e.g., via higher layer RRC signaling/parameter and/or MAC CE command and/or dynamic DCI based signaling, that frequency-selective beam management (FSBM) is enabled (or not enabled/ disabled).

In one example, the UE 116 could receive from the network 130, e.g., in the higher layer parameter CSI-Res-portConfig that configures a CSI reporting setting, CSI-ResourceConfig that configures a CSI resource setting, CSI-SSB-ResourceSet/NZP-CSI-RS-ResourceSet that con-figures a CSI resource set, NZP-CSI-RS-Resource that con-figures a NZP CSI-RS resource, TCI-State/QCL-Info/DLor-JointTCI-State/UL-TCIState that configures a TCI state, a higher layer parameter, e.g., denoted by FreqSelectiveBeam-Management, set to 'enabled'/'disabled' to turn on/off fre-quency selective or frequency subband specific/dependent beam management. When/if the higher layer parameter FreqSelectiveBeamManagement that is configured/provided in the higher layer parameter(s) CSI-ReportConfig, CSI-ResourceConfig, CSI-SSB-ResourceSet/NZP-CSI-RS-Re-sourceSet or NZP-CSI-RS-Resource is set to 'enabled', the corresponding CSI reporting setting, CSI resource setting, CSI resource set (e.g., SSB resource set or NZP CSI-RS resource set) or NZP-CSI-RS resource could be referred to as the CSI reporting setting for FSBM, CSI resource setting for FSBM, CSI resource set (e.g., SSB resource set or NZP CSI-RS resource set) for FSBM, or NZP CSI-RS resource for FSBM.

In another example, the UE 116 could receive from the network 130, e.g., a MAC CE activation/deactivation com-mand, to activate and/or deactivate the FSBM or the fre-quency selective/frequency subband specific/dependent beam management.

In yet another example, one or more new/dedicated DCI fields could be introduced in a DCI format (e.g., DCI format 1_1 or 1_2) or one or more bits/codepoints of one or more existing/reserved DCI fields in a DCI format (e.g., DCI format 1_1 or 1_2) could be repurposed to indicate that the FSBM or the frequency selective/frequency subband spe-cific/dependent beam management is enabled. For instance, the UE 116 could receive, e.g., in a DCI, a one-bit indicator set to '1' (or '0') indicating that the FSBM or the frequency selective/frequency subband specific/dependent beam man-agement is enabled, and/or '0' (or '1') indicating that the FSBM or the frequency selective/frequency subband spe-cific/dependent beam management is not enabled/disabled. As discussed above, the one-bit indicator could be indicated in a DCI by introducing one or more new/dedicated DCI fields in a DCI format (e.g., DCI format 11 or 1_2) or repurposing one or more bits/codepoints of one or more existing/reserved DCI fields in a DCI format (e.g., DCI format 1_1 or 1_2).

When the FSBM or frequency selective/frequency sub-band specific/dependent beam management is enabled (ac-cording to one or more examples described herein), a UE could be configured/indicated/provided by the network 130, e.g., via higher layer RRC signaling/parameter and/or MAC CE command and/or dynamic DCI based signaling, one or more (e.g., $N_{meas} \geq 1$) frequency subbands each comprising one or more PRBs for frequency-selective beam measure-ment for FSBM—referred to as $N_{meas}$ FSBM measurement subbands in the present disclosure. The one or more PRBs in each FSBM measurement subband could be continuous, e.g., continuously indexed in frequency, or non-continuous. The UE 116 could be configured/indicated/provided by the network 130, e.g., via higher layer RRC signaling/parameter and/or MAC CE command and/or dynamic DCI based signaling, the FSBM measurement subband size—in num-ber of PRBs (or size of each of the FSBM measurement subbands in number of PRBs).

For instance, the UE 116 could be first indicated/config-ured/provided by the network 130, e.g., via higher layer RRC signaling/parameter and/or MAC CE command and/or dynamic DCI based signaling, a bandwidth part (BWP) (therefore, the corresponding BWP size in number of PRBs and etc.) for FSBM.

In another instance, the UE 116 could be provided by the network 130, e.g., in a CSI resource setting provided by CSI-ResourceConfig or a CSI reporting setting provided by CSI-ReportConfig, a higher layer parameter subbandsize-forFSBMmeas set to either 'value 1' or 'value2'.

In yet another instance, if the higher layer parameter subbandsizeforFSBMmeas is set to 'value 1', the first value/ number of subband size corresponding/associated to the BWP is used/determined as the FSBM measurement sub-band size. If the higher layer parameter subbandsize-forFSBMmeas is set to 'value2', the second value/number of subband size corresponding/associated to the BWP is used/ determined as the FSBM measurement subband size.

In yet another instance, the association/mapping between the potential/candidate subband size(s) and BWP(s) could be fixed in the system specifications (see table 1), and known to both the network 130 and UE 116 sides a prior. As can be seen from the below table 1 the present disclosure, each BWP could correspond to two candidate values/numbers of (FSBM) subband size. Alternatively, the UE 116 could be configured/indicated/provided by the network 130, e.g., via higher layer RRC signaling/parameter and/or MAC CE command and/or dynamic DCI based signaling, the poten-tial/candidate subband size(s) for a BWP or the association/ mapping between the potential/candidate subband size(s) and BWP(s).

TABLE 1

| Bandwidth part (BWP) - PRBs | Subband size (PRBs) |
|---|---|
| <24 | N/A |
| 24-72 | 4, 8 |
| 73-144 | 8, 16 |
| 145-275 | 16, 32 |

Furthermore, the UE 116 could be indicated/configured/ provided by the network 130, e.g., via higher layer RRC signaling/parameter and/or MAC CE command and/or dynamic DCI based signaling, a bitmap with each bit position/entry in the bitmap corresponding/associated to a subband within the BWP. For instance, the UE 116 could receive from the network 130, e.g., in a CSI resource setting provided by CSI-ResourceConfig or a CSI resource set provided by CSI-SSB-ResourceSet/NZP-CSI-RS-Resource-Set or a CSI-RS resource provided by NZP-CSI-RS-Resource or a CSI reporting setting provided by CSI-Report-Config, the bitmap. If a bit position/entry of the bitmap is set to '1' (or '0'), the frequency subband corresponding/associated to the bit position/entry is used/determined as a FSBM measurement subband. For this case, the bitmap could contain/comprise $N_{meas}$ bit positions/entries set to '1's (or '0's) indicating/configuring a total of $N_{meas}$ FSBM measurement subbands.

In the present disclosure, when the FSBM or frequency selective/frequency subband specific/dependent beam management is enabled (according to one or more examples described herein), a UE could be configured by the network 130 one or more RS resources for frequency-selective beam measurement for FSBM, and report to the network 130, e.g., in a CSI report, one or more beam/report quantities for one or more of the RS resources configured for the frequency-selective beam measurement for FSBM, wherein one RS resource (e.g., corresponding to a SSB resource index or a NZP CSI-RS resource configuration index) could correspond to one or more FSBM measurement subbands, and each of the reported beam/report quantities (e.g., comprising at least one resource indicator such as SSBRI/CRI and/or one beam metric such as L1-RSRP/L1-SINR) could correspond to one or more FSBM measurement subbands.

In one example, when the FSBM or frequency selective/frequency subband specific/dependent beam management is enabled (according to one or more examples described herein), the UE 116 could be configured by the network 130 one or more CSI-RS resources such as NZP CSI-RS resources (each provided by NZP-CSI-RS-Resource)—also referred to as CSI-RS resources for FSBM, in a CSI resource subset/group (e.g., provided by NZP-CSI-RS-ResourceSubSet)—also referred to as a CSI resource subset/group for FSBM, or a CSI resource set (e.g., provided by NZP-CSI-RS-ResourceSet)—also referred to as a CSI resource set for FSBM, or a CSI resource setting (e.g., provided by CSI-ResourceConfig)—also referred to as a CSI resource setting for FSBM, each configured/associated with one or more (e.g., $1 \le M_{meas} \le N_{meas}$) of the total configured $N_{meas} \ge 1$ FSBM measurement subbands. In particular, for a CSI-RS resource (e.g., a NZP CSI-RS resource provided by NZP-CSI-RS-Resource) or each of the CSI-RS resources configured for frequency-selective beam measurement for FSBM, For example, all of the configured $N_{meas}$ FSBM measurement subbands could be active/used for frequency-selective beam measurement/reporting for the corresponding CSI-RS resource. For this case, $M_{meas} = N_{meas}$. The UE 116 could also be indicated/configured/provided by the network 130, e.g., via higher layer RRC signaling and/or MAC CE command and/or dynamic DCI based signaling, that $M_{meas} = N_{meas}$.

For another example, the UE 116 could be configured/indicated/provided by the network 130, e.g., via higher layer RRC signaling/parameter and/or MAC CE command and/or dynamic DCI based signaling, a bitmap of length $N_{meas}$ for the CSI-RS resource with each bit position/entry of the bitmap corresponding/associated to a FSBM measurement subband. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the bitmap. If a bit position/entry of the bitmap is set to '1' (or '0'), the FSBM measurement subband corresponding/associated with the bit position/entry is active/used for frequency-selective beam measurement/reporting for the corresponding CSI-RS resource. For this example, the bitmap could contain/comprise $1 \le M_{meas} \le N_{meas}$ bit positions/entries set to '1's (or '0's) indicating that a total of $M_{meas}$ FSBM measurement subbands—out of the total $N_{meas}$ configured FSBM measurement subbands—could be active/used for the frequency-selective beam measurement/reporting for the corresponding CSI-RS resource. Furthermore, the UE 116 could be configured/indicated/provided by the network 130, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, $K \ge 1$ such bitmaps each associated/mapped to a CSI-RS resource configured therein—e.g., the first bitmap could be associated/mapped to the first CSI-RS resource, the second bitmap could be associated/mapped to the second CSI-RS resource, and so on. Different bitmaps could have the same bit position(s)/entry(s) set to '1' (or '0').

For yet another example, the UE 116 could be configured/indicated/provided by the network 130, e.g., via higher layer RRC signaling/parameter and/or MAC CE command and/or dynamic DCI based signaling, a set of $1 \le M_{meas} \le N_{meas}$ (subband) indexes for the CSI-RS resource with each (subband) index corresponding/pointing to a FSBM measurement subband—e.g., the (subband) indexes $1, 2, \ldots, M_{meas}$ could correspond/point to the first FSBM measurement subband, the second FSBM measurement subband, . . . , the $M_{meas}$-th FSBM measurement subband, respectively, among all the configured $N_{meas}$ FSBM measurement subbands. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes. For this case, the $M_{meas}$ FSBM measurement subband(s) corresponding/associated to the indicated/provided/configured (subband) index(es) could be active/used for the frequency-selective beam measurement/reporting for the corresponding CSI-RS resource. Furthermore, the UE 116 could be configured/indicated/provided by the network 130, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, $K \ge 1$ such sets of (subband) indexes each associated/mapped to a CSI-RS resource configured therein—e.g., the first set could be associated/mapped to the first CSI-RS resource, the second set could be associated/mapped to the second CSI-RS resource, and so on. Different sets of (subband) indexes could contain/comprise the same (subband) indexes.

In another example, when the FSBM or frequency selective/frequency subband specific/dependent beam management is enabled (according to one or more examples described herein), the UE 116 could be configured by the network 130 one or more (e.g., K≥1) CSI-RS resources such as NZP CSI-RS resources (each provided by NZP-CSI-RS-Resource)—also referred to as CSI-RS resources for FSBM, in a CSI resource subset/group (e.g., provided by NZP-CSI-RS-ResourceSubSet)—also referred to as a CSI resource subset/group for FSBM, or a CSI resource set (e.g., provided by NZP-CSI-RS-ResourceSet)—also referred to as a CSI resource set for FSBM, or a CSI resource setting (e.g., provided by CSI-ResourceConfig)—also referred to as a CSI resource setting for FSBM, each configured/associated with a FSBM measurement subband. In particular, for the one or more (e.g., K≥1) CSI-RS resources (e.g., K≥1 NZP CSI-RS resources each provided by NZP-CSI-RS-Resource) configured in the same CSI resource subset/group (e.g., provided by NZP-CSI-RS-ResourceSubSet) or the same CSI resource set (e.g., provided by NZP-CSI-RS-ResourceSet) or the same CSI resource setting (e.g., provided by CSI-ResourceConfig) for frequency-selective beam measurement for FSBM.

For example, the first configured CSI-RS resource (e.g., the first NZP CSI-RS resource) could be associated/mapped to the first configured FSBM measurement subband, the second configured CSI-RS resource (e.g., the second NZP CSI-RS resource) could be associated/mapped to the second configured FSBM measurement subband, and so on, and the K-th configured CSI-RS resource (e.g., the K-th NZP CSI-RS resource) could be associated/mapped to the $N_{meas}$-th configured FSBM measurement subband. For this case, $K=N_{meas}$.

For another example, the UE 116 could be configured/indicated/provided by the network 130, e.g., via higher layer RRC signaling/parameter and/or MAC CE command and/or dynamic DCI based signaling, a bitmap of length $N_{meas}$ for the one or more (e.g., K≥1) CSI-RS resources configured in the same CSI resource subset/group or the same CSI resource set or the same CSI resource setting with each bit position/entry of the bitmap corresponding/associated to a FSBM measurement subband. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the bitmap. If a bit position/entry of the bitmap is set to '1' (or '0'), the FSBM measurement subband corresponding/associated to the bit position/entry is active/used for frequency-selective beam measurement/reporting for one of the one or more (e.g., K≥1) CSI-RS resources (e.g., one of the K≥1 NZP CSI-RS resources). For this example, the bitmap could contain/comprise $1 \leq M_{meas} \leq N_{meas}$ bit positions/entries set to '1's (or '0's) indicating that a total of $M_{meas}$ FSBM measurement subbands—out of the total $N_{meas}$ configured FSBM measurement subbands—could be active/used for the frequency-selective beam measurement/reporting for the one or more (e.g., K≥1) CSI-RS resources (or the K≥1 NZP CSI-RS resources)—e.g., the first bit position/entry in the bitmap set to '1' (or '0')—and therefore, the corresponding FSBM measurement subband—could be associated/mapped to the first CSI-RS resource (or the first NZP CSI-RS resource), the second bit position/entry in the bitmap set to '1' (or '0')—and therefore, the corresponding FSBM measurement subband—could be associated/mapped to the second CSI-RS resource (or the second NZP CSI-RS resource), and so on, and the $M_{meas}$-th bit position/entry set to '1' (or '0')—and therefore, the corresponding FSBM measurement subband—could be associated/mapped to the K-th CSI-RS resource (or the K-th NZP CSI-RS resource). For this case, $M_{meas}=K$. Alternatively, the higher layer parameter NZP-CSI-RS-Resource that configures a NZP CSI-RS resource could contain/comprise/provide a bitmap of length $N_{meas}$ for the corresponding NZP CSI-RS resource with each bit position/entry of the bitmap corresponding/associated to a FSBM measurement subband. For instance, if a bit position/entry of the bitmap is set to '1' (or '0'), the FSBM measurement subband corresponding/associated with the bit position/entry could be used/active for the frequency-selective beam measurement/reporting for the corresponding NZP CSI-RS resource.

For yet another example, the UE 116 could be configured/indicated/provided by the network 130, e.g., via higher layer RRC signaling/parameter and/or MAC CE command and/or dynamic DCI based signaling, a set of $1 \leq M_{meas} \leq N_{meas}$ (subband) indexes for the one or more (e.g., K≥1) CSI-RS resources configured in the same CSI resource subset/group or the same CSI resource set or the same CSI resource setting with each (subband) index corresponding/pointing to a FSBM measurement subband—e.g., the (subband) indexes 1, 2, . . . , $M_{meas}$ could correspond/point to the first FSBM measurement subband, the second FSBM measurement subband, . . . , the $M_{meas}$-th FSBM measurement subband, respectively, among all the configured $N_{meas}$ FSBM measurement subbands. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes. For this case, each of the $M_{meas}$ FSBM measurement subband(s) corresponding/associated to the indicated/provided/configured (subband) index(es) could be active/used for the frequency-selective beam measurement/reporting for one of the one or more (e.g., K≥1) CSI-RS resources (e.g., one of the K≥1 NZP CSI-RS resources)—e.g., the first (subband) index in the set—and therefore, the corresponding FSBM measurement subband—could be associated/mapped to the first CSI-RS resource (or the first NZP CSI-RS resource), the second (subband) index in the set—and therefore, the corresponding FSBM measurement subband—could be associated/mapped to the second CSI-RS resource (or the second NZP CSI-RS resource), and so on, and the $M_{meas}$-th (subband) index in the set—and therefore, the corresponding FSBM measurement subband—could be associated/mapped to the K-th CSI-RS resource (or the K-th NZP CSI-RS resource). For this case, $M_{meas}=K$. Alternatively, the higher layer parameter NZP-CSI-RS-Resource that configures a NZP CSI-RS resource could contain/comprise/provide a (subband) index for the corresponding NZP CSI-RS resource. For instance, the FSBM measurement subband corresponding/associated with the (subband) index could be used/active for the frequency-selective beam measurement/reporting for the corresponding NZP CSI-RS resource.

When the FSBM or frequency selective/frequency subband specific/dependent beam management is enabled (according to one or more examples described herein), a UE could be configured/indicated/provided by the network 130, e.g., via higher layer RRC signaling/parameter and/or MAC CE command and/or dynamic DCI based signaling, one or more (e.g., $N_{report} \geq 1$) frequency subbands each comprising one or more PRBs for frequency-selective beam reporting for FSBM—referred to as $N_{report}$ FSBM reporting subbands in the present disclosure. The one or more PRBs in each FSBM reporting subband could be continuous, e.g., continuously indexed in frequency, or non-continuous. The UE 116 could be configured/indicated/provided by the network 130, e.g., via higher layer RRC signaling/parameter and/or MAC CE command and/or dynamic DCI based signaling, the FSBM reporting subband size—in number of PRBs (or size of each of the FSBM reporting subbands in number of PRBs).

For instance, the UE 116 could be first indicated/configured/provided by the network 130, e.g., via higher layer RRC signaling/parameter and/or MAC CE command and/or dynamic DCI based signaling, a BWP (therefore, the corresponding BWP size in number of PRBs, etc.) for FSBM.

For another instance, the UE 116 could be provided by the network 130, e.g., in a CSI resource setting provided by CSI-ResourceConfig or a CSI reporting setting provided by CSI-ReportConfig, a higher layer parameter subbandsizeforFSBMreport set to either 'value 1' or 'value2'.

For yet another instance, if the higher layer parameter subbandsizeforFSBMreport is set to 'value 1', the first value/number of subband size corresponding/associated to the BWP is used/determined as the FSBM reporting subband size. If the higher layer parameter subbandsizeforFSBMreport is set to 'value2', the second value/number of subband size corresponding/associated to the BWP is used/determined as the FSBM reporting subband size.

For yet another instance, the association/mapping between the potential/candidate subband size(s) and BWP(s) could be fixed in the system specifications (see table 1) and known to both the network 130 and the UE 116 sides prior. As can be seen from table 1, each BWP could correspond to two candidate values/numbers of (FSBM) subband size. Alternatively, the UE 116 could be configured/indicated/provided by the network 130, e.g., via higher layer RRC signaling/parameter and/or MAC CE command and/or dynamic DCI based signaling, the potential/candidate subband size(s) for a BWP or the association/mapping between the potential/candidate subband size(s) and BWP(s).

Furthermore, the UE 116 could be indicated/configured/provided by the network 130, e.g., via higher layer RRC signaling/parameter and/or MAC CE command and/or dynamic DCI based signaling, a bitmap with each bit position/entry in the bitmap corresponding/associated to a subband within the BWP. For instance, the UE 116 could receive from the network 130, e.g., in a CSI resource setting provided by CSI-ResourceConfig or a CSI resource set provided by CSI-SSB-ResourceSet/NZP-CSI-RS-Resource-Set or a CSI-RS resource provided by ZP-CSI-RS-Resource or a CSI reporting setting provided by CSI-ReportConfig, the bitmap. If a bit position/entry of the bitmap is set to '1' (or '0'), the frequency subband corresponding/associated to the bit position/entry is used/determined as a FSBM reporting subband. For this case, the bitmap could contain/comprise $N_{report}$ bit positions/entries set to '1's (or '0's) indicating/configuring a total of $N_{report}$ FSBM reporting subbands.

In the present disclosure, when the FSBM or frequency selective/frequency subband specific/dependent beam management is enabled (according to one or more examples described herein), a UE could be configured by the network 130 one or more RS resources for frequency-selective beam measurement for FSBM, and report to the network 130, e.g., in a CSI report, one or more beam/report quantities for one or more of the RS resources configured for the frequency-selective beam measurement for FSBM, wherein one RS resource (e.g., corresponding to a SSB resource index or a NZP CSI-RS resource configuration index) could correspond to one or more FSBM reporting subbands, and each of the reported beam/report quantities (e.g., comprising at least one resource indicator such as SSBRI/CRI and/or one beam metric such as L1-RSRP/L1-SINR) could correspond to one or more FSBM reporting subbands.

In one example, when the FSBM or frequency selective/frequency subband specific/dependent beam management is enabled (according to one or more of the examples described herein), the UE 116 could be configured by the network 130 one or more CSI-RS resources such as NZP CSI-RS resources (each provided by NZP-CSI-RS-Resource)—also referred to as CSI-RS resources for FSBM, in a CSI resource subset/group (e.g., provided by NZP-CSI-RS-ResourceSub-Set)—also referred to as a CSI resource subset/group for FSBM, or a CSI resource set (e.g., provided by NZP-CSI-RS-ResourceSet)—also referred to as a CSI resource set for FSBM, or a CSI resource setting (e.g., provided by CSI-ResourceConfig)—also referred to as a CSI resource setting for FSBM, each configured/associated with one or more (e.g., $1 \leq M_{report} \leq N_{report}$) of the total configured $N_{report} \geq 1$ FSBM reporting subbands. In particular, for a CSI-RS resource (e.g., a NZP CSI-RS resource provided by NZP-CSI-RS-Resource) or each of the CSI-RS resources configured for frequency-selective beam measurement for FSBM.

For example, all of the configured $N_{report}$ FSBM reporting subbands could be active/used for frequency-selective beam measurement/reporting for the corresponding CSI-RS resource. For this case, $M_{report} = N_{report}$. The UE 116 could also be indicated/configured/provided by the network, e.g., via higher layer RRC signaling and/or MAC CE command and/or dynamic DCI based signaling, that $M_{report} = N_{report}$.

For another example, the UE 116 could be configured/indicated/provided by the network 130, e.g., via higher layer RRC signaling/parameter and/or MAC CE command and/or dynamic DCI based signaling, a bitmap of length $N_{report}$ for the CSI-RS resource with each bit position/entry of the bitmap corresponding/associated to a FSBM reporting subband. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ReSourceConfig that configures a CSI resource setting or the higher layer parameter CSI-ReportConfig that configures a CSI reporting setting, the bitmap. If a bit position/entry of the bitmap is set to '1' (or '0'), the FSBM reporting subband corresponding/associated with the bit position/entry is active/used for frequency-selective beam measurement/reporting for the corresponding CSI-RS resource. For this example, the bitmap could contain/comprise $1 \leq M_{report} \leq N_{report}$ bit positions/entries set to '1's (or '0's) indicating that a total of $M_{report}$ FSBM reporting subbands—out of the total $N_{report}$ configured FSBM reporting subbands—could be active/used for the frequency-selective beam measurement/ reporting for the corresponding CSI-RS resource. Furthermore, the UE 116 could be configured/indicated/provided by the network 130, e.g., via higher layer RRC signaling/ parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-Re-sourceConfig that configures a CSI resource setting or the higher layer parameter CSI-ReportConfig that configures a CSI reporting setting) and/or MAC CE command and/or dynamic DCI based signaling, K≥1 such bitmaps each associated/mapped to a CSI-RS resource configured therein—e.g., the first bitmap could be associated/mapped to the first CSI-RS resource, the second bitmap could be associated/mapped to the second CSI-RS resource, and so on. Different bitmaps could have the same bit position(s)/ entry(s) set to '1' (or '0').

For yet another example, the UE 116 could be configured/ indicated/provided by the network 130, e.g., via higher layer RRC signaling/parameter and/or MAC CE command and/or dynamic DCI based signaling, a set of $1 \leq M_{report} \leq N_{report}$ (subband) indexes for the CSI-RS resource with each (sub-band) index corresponding/pointing to a FSBM reporting subband—e.g., the (subband) indexes $1, 2, \ldots, M_{report}$ could correspond/point to the first FSBM reporting subband, the second FSBM reporting subband, . . . , the $M_{report}$-th FSBM reporting subband, respectively, among all the configured $N_{report}$ FSBM reporting subbands. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/ group or the higher layer parameter NZP-CSI-RS-Resource-Set that configures a CSI resource set or the higher layer parameter CSI-ResourceConfig that configures a CSI resource setting or the higher layer parameter CSI-Report-Config that configures a CSI reporting setting, the set of (subband) indexes. For this case, the $M_{report}$ FSBM report-ing subband(s) corresponding/associated to the indicated/ provided/configured (subband) index(es) could be active/ used for the frequency-selective beam measurement/ reporting for the corresponding CSI-RS resource. Furthermore, the UE 116 could be configured/indicated/ provided by the network 130, e.g., via higher layer RRC signaling/parameter (e.g., in the higher layer parameter NZP-CSI-RS-Resource that configures a NZP CSI-RS resource or the higher layer parameter NZP-CSI-RS-Re-sourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that con-figures a CSI reporting setting) and/or MAC CE command and/or dynamic DCI based signaling, K≥1 such sets of (subband) indexes each associated/mapped to a CSI-RS resource configured therein—e.g., the first set could be associated/mapped to the first CSI-RS resource, the second set could be associated/mapped to the second CSI-RS resource, and so on. Different sets of (subband) indexes could contain/comprise the same (subband) indexes.

In another example, when the FSBM or frequency selec-tive/frequency subband specific/dependent beam management is enabled (according to one or more examples described herein), the UE 116 could be configured by the network 130 one or more (e.g., K≥1) CSI-RS resources such as NZP CSI-RS resources (each provided by NZP-CSI-RS-Resource)—also referred to as CSI-RS resources for FSBM, in a CSI resource subset/group (e.g., provided by NZP-CSI-RS-ResourceSubSet)—also referred to as a CSI resource subset/group for FSBM, or a CSI resource set (e.g., provided by NZP-CSI-RS-ResourceSet)—also referred to as a CSI resource set for FSBM, or a CSI resource setting (e.g., provided by CSI-ResourceConfig)—also referred to as a CSI resource setting for FSBM, each configured/associated with a FSBM reporting subband. In particular, for the one or more (e.g., K≥1) CSI-RS resources (e.g., K≥1 NZP CSI-RS resources each provided by NZP-CSI-RS-Resource) config-ured in the same CSI resource subset/group (e.g., provided by NZP-CSI-RS-ResourceSubSet) or the same CSI resource set (e.g., provided by NZP-CSI-RS-ResourceSet) or the same CSI resource setting (e.g., provided by CSI-Re-sourceConfig) for frequency-selective beam measurement for FSBM.

For example, the first configured CSI-RS resource (e.g., the first NZP CSI-RS resource) could be associated/mapped to the first configured FSBM reporting subband, the second configured CSI-RS resource (e.g., the second NZP CSI-RS resource) could be associated/mapped to the second config-ured FSBM reporting subband, and so on, and the K-th configured CSI-RS resource (e.g., the K-th NZP CSI-RS resource) could be associated/mapped to the $N_{report}$-th con-figured FSBM reporting subband. For this case, $K = N_{report}$.

For another example, the UE 116 could be configured/ indicated/provided by the network 130, e.g., via higher layer RRC signaling/parameter and/or MAC CE command and/or dynamic DCI based signaling, a bitmap of length $N_{report}$ for the one or more (e.g., K≥1) CSI-RS resources configured in the same CSI resource subset/group or the same CSI resource set or the same CSI resource setting with each bit position/entry of the bitmap corresponding/associated to a FSBM reporting subband. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/ group or the higher layer parameter NZP-CSI-RS-Resource-Set that configures a CSI resource set or the higher layer parameter CSI-ResourceConfig that configures a CSI resource setting or the higher layer parameter CSI-Report-Config that configures a CSI reporting setting, the bitmap. If a bit position/entry of the bitmap is set to '1' (or '0'), the FSBM reporting subband corresponding/associated to the bit position/entry is active/used for frequency-selective beam measurement/reporting for one of the one or more (e.g., K≥1) CSI-RS resources (e.g., one of the K≥1 NZP CSI-RS resources). For this example, the bitmap could contain/comprise $1 \leq M_{report} \leq N_{report}$ bit positions/entries set to '1's (or '0's) indicating that a total of $M_{report}$ FSBM measurement subbands—out of the total $N_{report}$ configured FSBM reporting subbands—could be active/used for the frequency-selective beam measurement/reporting for the one or more (e.g., K≥1) CSI-RS resources (or the K≥1 NZP CSI-RS resources)—e.g., the first bit position/entry in the bitmap set to '1' (or '0')—and therefore, the corresponding FSBM reporting subband—could be associated/mapped to the first CSI-RS resource (or the first NZP CSI-RS resource), the second bit position/entry in the bitmap set to '1' (or '0')—and therefore, the corresponding FSBM reporting subband—could be associated/mapped to the second CSI- RS resource (or the second NZP CSI-RS resource), and so on, and the $M_{report}$-th bit position/entry set to '1' (or '0')—and therefore, the corresponding FSBM reporting subband—could be associated/mapped to the K-th CSI-RS resource (or the K-th NZP CSI-RS resource). For this case, $M_{report}$=K. Alternatively, the higher layer parameter NZP-CSI-RS-Resource that configures a NZP CSI-RS resource could contain/comprise/provide a bitmap of length $N_{report}$ for the corresponding NZP CSI-RS resource with each bit position/entry of the bitmap corresponding/associated to a FSBM reporting subband. For instance, if a bit position/entry of the bitmap is set to '1' (or '0'), the FSBM reporting subband corresponding/associated with the bit position/entry could be used/active for the frequency-selective beam measurement/reporting for the corresponding NZP CSI-RS resource.

For yet another example, the UE 116 could be configured/indicated/provided by the network 130, e.g., via higher layer RRC signaling/parameter and/or MAC CE command and/or dynamic DCI based signaling, a set of $1 \le M_{report} \le N_{report}$ (subband) indexes for the one or more (e.g., K≥1) CSI-RS resources configured in the same CSI resource subset/group or the same CSI resource set or the same CSI resource setting with each (subband) index corresponding/pointing to a FSBM reporting subband—e.g., the (subband) indexes 1, 2, . . . , $M_{report}$ could correspond/point to the first FSBM reporting subband, the second FSBM reporting subband, . . . , the $M_{report}$-th FSBM reporting subband, respectively, among all the configured $N_{report}$ FSBM reporting subbands. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes. For this case, each of the $M_{report}$ FSBM reporting subband(s) corresponding/associated to the indicated/provided/configured (subband) index(es) could be active/used for the frequency-selective beam measurement/reporting for one of the one or more (e.g., K≥1) CSI-RS resources (e.g., one of the K≥1 NZP CSI-RS resources)—e.g., the first (subband) index in the set—and therefore, the corresponding FSBM reporting subband—could be associated/mapped to the first CSI-RS resource (or the first NZP CSI-RS resource), the second (subband) index in the set—and therefore, the corresponding FSBM reporting subband—could be associated/mapped to the second CSI-RS resource (or the second NZP CSI-RS resource), and so on, and the $M_{report}$-th (subband) index in the set—and therefore, the corresponding FSBM reporting subband—could be associated/mapped to the K-th CSI-RS resource (or the K-th NZP CSI-RS resource). For this case, $M_{report}$=K. Alternatively, the higher layer parameter NZP-CSI-RS-Resource that configures a NZP CSI-RS resource could contain/comprise/provide a (subband) index for the corresponding NZP CSI-RS resource. For instance, the FSBM reporting subband corresponding/associated with the (subband) index could be used/active for the frequency-selective beam measurement/reporting for the corresponding NZP CSI-RS resource.

Figure 10:
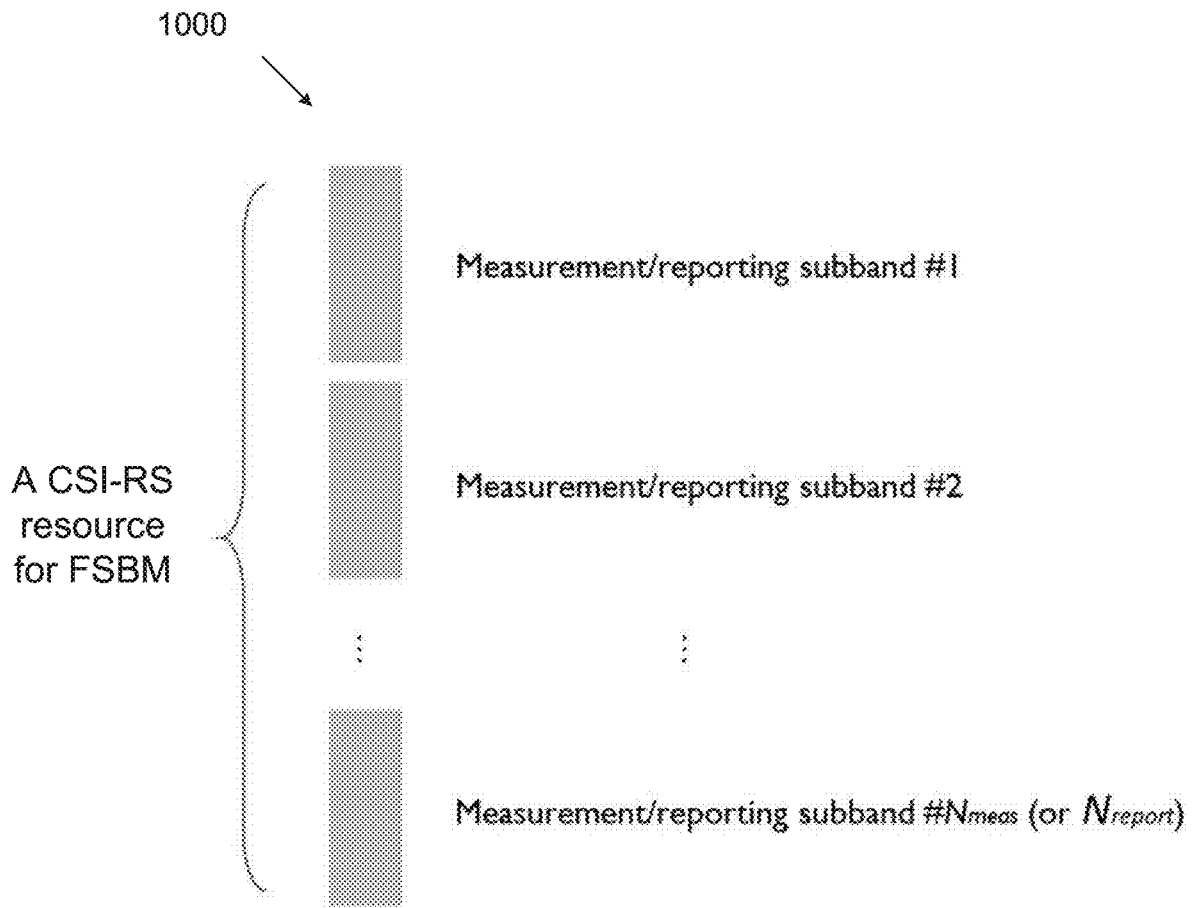
FIG. 10 illustrates an example of mapping a CSI-RS resource for FSBM and FSBM measurement/reporting sub-band(s) according to embodiments of the present disclosure.

FIG. 10 illustrates an example of mapping a CSI-RS resource for FSBM and FSBM measurement/reporting subband(s) 1000 according to embodiments of the present disclosure. For example, the mapping of the CSI-RS resource for FSBM and the FSBM measurement/reporting subband(s) 1000 may be utilized for measurement and/or reporting by the gNB 101 or the UE 116 in FIG. 1. This example is for illustration only and other embodiments can be used without departing from the scope of the present disclosure.

In one embodiment, when the FSBM or frequency selective/frequency subband specific/dependent beam management is enabled (according to one or more examples described herein), the FSBM measurement subband(s) and the FSBM reporting subband(s) could be the same or different (i.e., $N_{meas}=N_{report}$, $N_{meas} \ge N_{report}$ or $N_{meas} \le N_{report}$). This example is for illustration only and other embodiments can be used without departing from the scope of the present disclosure.

For example, when the FSBM or frequency selective/frequency subband specific/dependent beam management is enabled (according to one or more examples described herein), the UE 116 could be configured/indicated/provided by the network 130, e.g., via higher layer RRC signaling/parameter and/or MAC CE command and/or dynamic DCI based signaling, the same frequency subband(s) for both frequency-selective beam measurement and reporting (i.e., $N_{meas}=N_{report}$). For this case, the UE 116 could only be configured/indicated/provided by the network 130, e.g., via higher layer RRC signaling/parameter and/or MAC CE command and/or dynamic DCI based signaling, either the FSBM measurement subband(s) or the FSBM reporting subband(s) according to the above discussed/described design examples. The UE 116 could be further indicated by the network 130 that the FSBM measurement subband(s) is the same as the FSBM reporting subband(s) or vice versa. This indication could be via higher layer RRC signaling/parameter and/or MAC CE command and/or dynamic DCI based signaling.

For another example, when the FSBM or frequency selective/frequency subband specific/dependent beam management is enabled (according to one or more examples described herein), the FSBM measurement subband(s) could be a subset of the FSBM reporting subband(s), or vice versa.

In one example, when the FSBM or frequency selective/frequency subband specific/dependent beam management is enabled (according to one or more examples described herein), the association/mapping between the FSBM measurement subband(s) and the FSBM reporting subband(s) could be fixed in the system specification(s)—e.g., the first FSBM measurement subband could correspond to the first FSBM reporting subband, the second FSBM measurement subband could correspond to the second FSBM reporting subband, and so on.

In another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between one or more of the FSBM measurement subband(s) and one or more of the FSBM reporting subband(s).

Furthermore, when the FSBM or frequency selective/frequency subband specific/dependent beam management is enabled (according to one or more examples described herein), the FSBM measurement subband(s) that is active/used for frequency-selective beam measurement/reporting for one or more CSI-RS resources—referred to as active FSBM measurement subband(s) in the present disclosure (configured according to one or more examples described herein) and the FSBM reporting subband(s) that is active/ used for frequency-selective beam measurement/reporting for one or more CSI-RS resources—referred to as active FSBM reporting subband(s) in the present disclosure (configured according to one or more examples described herein) could be the same or different (i.e., $M_{meas}=M_{report}$, $M_{meas}\geq M_{report}$ or $M_{meas}\leq M_{report}$).

For example, when the FSBM or frequency selective/ frequency subband specific/dependent beam management is enabled (according to one or more examples described herein), the UE 116 could be configured/indicated/provided by the network 130, e.g., via higher layer RRC signaling/ parameter and/or MAC CE command and/or dynamic DCI based signaling, the same frequency subband(s) for both active FSBM measurement subband(s) and active FSBM reporting subband(s) (i.e., $M_{meas}=M_{report}$). For this case, the UE 116 could only be configured/indicated/provided by the network 130, e.g., via higher layer RRC signaling/parameter and/or MAC CE command and/or dynamic DCI based signaling, either the active FSBM measurement subband(s)—following one or more examples described herein, or the active FSBM reporting subband(s). The UE 116 could be further indicated by the network 130 that the active FSBM measurement subband(s) is the same as the active FSBM reporting subband(s) or vice versa. This indication could be via higher layer RRC signaling/parameter and/or MAC CE command and/or dynamic DCI based signaling.

For another example, when the FSBM or frequency selective/frequency subband specific/dependent beam management is enabled (according to one or more examples described herein), the active FSBM measurement subband(s) could be a subset of the active FSBM reporting subband(s), or vice versa.

In one example, when the FSBM or frequency selective/ frequency subband specific/dependent beam management is enabled (according to one or more examples described herein), the association/mapping between the active FSBM measurement subband(s) and the active FSBM reporting subband(s) could be fixed in the system specification(s)— e.g., the first active FSBM measurement subband could correspond to the first active FSBM reporting subband, the second active FSBM measurement subband could correspond to the second active FSBM reporting subband, and so on.

In another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between one or more of the active FSBM measurement subband(s) and one or more of the active FSBM reporting subband(s).

As discussed above, when the FSBM or frequency selective/frequency subband specific/dependent beam management is enabled ((according to one or more examples described herein), a UE could report to the network 130, e.g., in a CSI report (provided/configured by a CSI reporting setting CSI-ReportConfig—also referred to as a CSI reporting setting for FSBM), one or more (e.g., $K_{report}\geq 1$) beam/ report quantities for one or more of the RS resources configured for the frequency-selective beam measurement for FSBM, wherein each of the reported beam/report quantities (e.g., comprising at least one resource indicator such as SSBRI/CRI and/or one beam metric such as L1-RSRP/L1-SINR) could correspond to one or more FSBM measurement/reporting subbands.

In one example, when the FSBM or frequency selective/ frequency subband specific/dependent beam management is enabled (according to one or more examples described herein), the UE 116 could report, e.g., in a CSI report (provided/configured by a CSI reporting setting CSI-ReportConfig—also referred to as a CSI reporting setting for FSBM), $K_{report}\geq 1$ beam/report quantities each for a FSBM measurement subband or a FSBM reporting subband configured according to the above discussed/design examples.

For example, when the FSBM or frequency selective/ frequency subband specific/dependent beam management is enabled (according to one or more examples described herein), the association/mapping between the beam/report quantity(s) and the FSBM measurement/reporting subband(s) is fixed in the system specification(s)—e.g., the first reported beam/report quantity could correspond to the first FSBM measurement/reporting subband, the second reported beam/report quantity could correspond to the second FSBM measurement/reporting subband, and so on.

For another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between one or more of the beam/report quantity(s) and one or more of the FSBM measurement/reporting subband(s).

In another example, when the FSBM or frequency selective/frequency subband specific/dependent beam management is enabled (according to one or more examples described herein), the UE 116 could report, e.g., in a CSI report (provided/configured by a CSI reporting setting CSI-ReportConfig—also referred to as a CSI reporting setting for FSBM), $K_{report}\geq 1$ beam/report quantities each for an active FSBM measurement subband or an active FSBM reporting subband configured according to the above discussed/design examples.

For example, when the FSBM or frequency selective/ frequency subband specific/dependent beam management is enabled (according to one or more examples described herein), the association/mapping between the beam/report quantity(s) and the active FSBM measurement/reporting subband(s) is fixed in the system specification(s)—e.g., the first reported beam/report quantity could correspond to the first active FSBM measurement/reporting subband, the second reported beam/report quantity could correspond to the second active FSBM measurement/reporting subband, and so on.

For another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between one or more of the beam/report quantity(s) and one or more of the active FSBM measurement/reporting subband(s).

In yet another example, when the FSBM or frequency selective/frequency subband specific/dependent beam management is enabled (according to one or more examples described herein), the UE 116 could report, e.g., in a CSI report (configured/provided by a CSI reporting setting CSI- ReportConfig—also referred to as a CSI reporting setting for FSBM), $K_{report} \geq 1$ beam/report quantities each for a subset of the total configured $N_{meas}$ FSBM measurement subbands (the subset could comprise one or more FSBM measurement subbands) or a subset of the total configured $N_{report}$ FSBM reporting subbands (the subset could comprise one or more FSBM reporting subbands) configured according to the above discussed/design examples. The UE 116 could be configured/indicated/provided by the network 130, e.g., via higher layer RRC signaling/parameter and/or MAC CE command and/or dynamic DCI based signaling, one or more subsets of the total configured $N_{meas}$ FSBM measurement subbands or how the ($N_{meas}$) FSBM measurement subbands are partitioned into one or more subsets of FSBM measurement subbands and/or one or more subsets of the total configured $N_{report}$ FSBM reporting subbands or how the ($N_{report}$) FSBM reporting subbands are partitioned into one or more subsets of FSBM reporting subbands.

For example, when the FSBM or frequency selective/frequency subband specific/dependent beam management is enabled (according to one or more examples described herein), the association/mapping between the beam/report quantity(s) and the subset(s) of FSBM measurement/reporting subband(s) is fixed in the system specification(s)—e.g., the first reported beam/report quantity could correspond to the first subset of FSBM measurement/reporting subband(s), the second reported beam/report quantity could correspond to the second subset of FSBM measurement/reporting subband(s), and so on.

For another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between one or more of the beam/report quantity(s) and one or more of the subset(s) of FSBM measurement/reporting subband(s).

In yet another example, when the FSBM or frequency selective/frequency subband specific/dependent beam management is enabled (according to one or more examples described herein), the UE 116 could report, e.g., in a CSI report (configured/provided by a CSI reporting setting CSI-ReportConfig—also referred to as a CSI reporting setting for FSBM), $K_{report} \geq 1$ beam/report quantities each for a subset of the total configured $M_{meas}$ active FSBM measurement subbands (the subset could comprise one or more active FSBM measurement subbands) or a subset of the total configured $M_{report}$ active FSBM reporting subbands (the subset could comprise one or more active FSBM reporting subbands) configured according to the above discussed/design examples. The UE 116 could be configured/indicated/provided by the network 130, e.g., via higher layer RRC signaling/parameter and/or MAC CE command and/or dynamic DCI based signaling, one or more subsets of the total configured $M_{meas}$ active FSBM measurement subbands or how the ($M_{meas}$) active FSBM measurement subbands are partitioned into one or more subsets of active FSBM measurement subbands and/or one or more subsets of the total configured $M_{report}$ active FSBM reporting subbands or how the ($M_{report}$) active FSBM reporting subbands are partitioned into one or more subsets of active FSBM reporting subbands.

For example, when the FSBM or frequency selective/frequency subband specific/dependent beam management is enabled (according to one or more examples described herein), the association/mapping between the beam/report quantity(s) and the subset(s) of active FSBM measurement/reporting subband(s) is fixed in the system specification(s)—e.g., the first reported beam/report quantity could correspond to the first subset of active FSBM measurement/reporting subband(s), the second reported beam/report quantity could correspond to the second subset of active FSBM measurement/reporting subband(s), and so on.

For another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between one or more of the beam/report quantity(s) and one or more of the subset(s) of active FSBM measurement/reporting subband(s).

FIG. 11 illustrates an example of a flowchart of method 1100 of a UE reporting for a configured reporting subband or subset of reporting subbands when the FSBM or frequency selective/frequency subband specific/dependent beam management is enabled according to one or more examples described herein. For example, the method 1100 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 1100 is for illustration only and other embodiments can be used without departing from the scope of the present disclosure.

In one embodiment, the UE 116 could be indicated/provided/configured by the network 130, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-Resource-Set that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, the value/number of $K_{report}$ one or more reporting subbands or one or more subsets of one or more reporting subband, where each reporting subband or each subset of reporting subband(s) is for at least one beam/report quantity (1101). The UE then performs the measurements and reports, e.g., in a CSI report/CSI reporting instance, one or more beam/report quantities each for a configured reporting subband or a configured subset of reporting subband(s) (1102).

Alternatively, when the FSBM or frequency selective/frequency subband specific/dependent beam management is enabled (according to one or more examples described herein), the UE 116 could be configured/indicated/provided by the network 130, e.g., via higher layer RRC signaling/parameter (e.g., in the higher layer parameter NZP-CSI-RS-Resource) that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, to report, e.g., in a CSI report, $K_{report} \geq 1$ beam/report quantities each for a FSBM measurement subband or a FSBM reporting subband according to one or more examples described herein (an example of the corresponding flowchart is presented in FIG. 11), or $K_{report} \geq 1$ beam/report quantities each for an active FSBM measurement subband or an active FSBM reporting subband following one or more examples described herein, or $K_{report} \geq 1$ beam/report quantities each for a subset of the total configured $M_{meas}$ FSBM measurement subbands (the subset could comprise one or more active FSBM measurement subbands) or a subset of the total configured $M_{report}$ FSBM reporting subbands (the subset could comprise one or more active FSBM reporting subbands) according to one or more examples described herein, or $K_{report} \geq 1$ beam/report quantities each for a subset of the total configured $M_{meas}$ active FSBM measurement subbands (the subset could comprise one or more active FSBM measurement subbands) or a subset of the total configured $M_{report}$ active FSBM reporting subbands (the subset could comprise one or more active FSBM reporting subbands) following one or more examples described herein. The UE 116 could be indicated/provided/ configured by the network 130, e.g., via higher layer RRC signaling/parameter (e.g., in the higher layer parameter NZP-CSI-RS-Resource that configures a NZP CSI-RS resource or the higher layer parameter NZP-CSI-RS-Re-sourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that con-figures a CSI reporting setting) and/or MAC CE command and/or dynamic DCI based signaling, the value/number of $K_{report}$.

When the FSBM or frequency selective/frequency sub-band specific/dependent beam management is enabled (ac-cording to one or more examples described herein), a UE could be configured/indicated/provided by the network 130, e.g., via higher layer RRC signaling/parameter and/or MAC CE command and/or dynamic DCI based signaling, one or more (e.g., $N_{tx} \geq 1$) frequency subbands each comprising one or more PRBs for frequency-selective transmission(s) of one or more DL/UL control/data channels/signals for FSBM— referred to as $N_{tx}$ FSBM transmission subbands in the present disclosure. The one or more PRBs in each FSBM transmission subband could be continuous, e.g., continu-ously indexed in frequency, or non-continuous. The UE 116 could be configured/indicated/provided by the network 130, e.g., via higher layer RRC signaling/parameter and/or MAC CE command and/or dynamic DCI based signaling, the FSBM transmission subband size—in number of PRBs (or size of each of the FSBM transmission subbands in number of PRBs)—for one or more DL/UL control/data channels/ signals.

For instance, the UE 116 could be first indicated/config-ured/provided by the network 130, e.g., via higher layer RRC signaling/parameter and/or MAC CE command and/or dynamic DCI based signaling, a BWP (therefore, the corre-sponding BWP size in number of PRBs, etc.) for FSBM.

For instance, the UE 116 could be provided/configured/ indicated by the network 130, e.g., via higher layer RRC signaling/parameter (e.g., in PDCCH-Config/PDSCH-Con-fig, a CSI resource setting provided by CSI-ResourceConfig, or a CSI reporting setting provided by CSI-ReportConfig) and/or MAC CE command and/or dynamic DCI based signaling (e.g., in DCI format 1_1 or 1_2 with or without DL assignment), a parameter/field subbandsizeforFSBMtrans-mission—for one or more DL/UL control/data channels/ signals—set to either 'value 1' or 'value2'.

For instance, if the parameter/field subbandsize-forFSBMtransmission is set to 'value 1', the first value/ number of subband size corresponding/associated to the BWP is used/determined as the FSBM transmission subband size for the one or more DL/UL control/data channels/ signals. If the parameter/field subbandsizeforFSBMtrans-mission is set to 'value2', the second value/number of subband size corresponding/associated to the BWP is used/ determined as the FSBM transmission subband size for the one or more DL/UL control/data channels/signals.

For instance, the association/mapping between the poten-tial/candidate subband size(s) and BWP(s)—e.g., for one or more DL/UL control/data channels/signals—could be fixed in the system specifications (see table 1) and known to both the network 130 and the UE 116 sides a prior. As can be seen from table 1, each BWP could correspond to two candidate values/numbers of (FSBM) subband size. Alternatively, the UE 116 could be configured/indicated/provided by the net-work 130, e.g., via higher layer RRC signaling/parameter and/or MAC CE command and/or dynamic DCI based signaling, the potential/candidate subband size(s) for a BWP for the one or more DL/UL control/data channels/signals or the association/mapping between the potential/candidate subband size(s) and BWP(s) for the one or more DL/UL control/data channels/signals.

The indicated/configured/provided FSBM transmission subband size could be for all DL/UL control/data channels/ signals (e.g., PDCCH, PDSCH, PUCCH, and PUSCH). Optionally, the UE 116 could be indicated/configured/pro-vided by network 130, e.g., via higher layer RRC signaling/ parameter and/or MAC CE command and/or dynamic DCI based signaling as discussed/described above, a set of one or more subband sizes with each subband size corresponding/ associated to a channel/signal (e.g., PDCCH, PDSCH, PUCCH or PUSCH) or a subset of one or more channels/ signals (e.g., PDCCH and PDSCH).

In one example, when the FSBM or frequency selective/ frequency subband specific/dependent beam management is enabled (according to one or more examples described herein), the association/mapping between the (set of) one or more subband sizes and the channels/signals are fixed in the system specifications. For example, the first subband size could be indicated/configured for PDCCH, the second sub-band size could be indicated/configured for PDSCH, the third subband size could be indicated/configured for PUCCH, and the fourth subband size could be indicated/ configured for PUSCH. For another example, the first sub-band size could be indicated/configured for DL control/data channels/signals such as PDCCH and PDSCH, and the second subband size could be indicated/configured for UL control/data channels/signals such as PUCCH and PUSCH. For yet another example, the first subband size could be indicated/configured for control channels/signals such as PDCCH and PUCCH, and the second subband size could be indicated/configured for data channels/signals such as PDSCH and PUSCH.

In another example, when the FSBM or frequency selec-tive/frequency subband specific/dependent beam manage-ment is enabled (according to one or more examples described herein), the UE 116 could be indicated/config-ured/provided by network 130, e.g., via higher layer RRC signaling/parameter and/or MAC CE command and/or dynamic DCI based signaling, the association/mapping between the (set of) one or more subband sizes and the channels/signals. For example, the subband size(s) for a channel/signal or a subset of one or more channels/signals could be indicated/configured/provided in the higher layer parameter(s)—e.g., PDCCH-Config, PDSCH-Config, ControlResourceSet, PUCCH-Config, PUSCH-Config, etc. —that configures the corresponding channel/signal or the corresponding subset of one or more channels/signals. For another example, the subband size(s) for a channel/signal or a subset of one or more channels/signals could be indicated in one or more DCIs (e.g., in DCI format 1_1 or 1_2). The indication could be via one or more new/dedicated DCI fields in the DCI format(s) or repurposing one or more bits/codepoints of one or more existing/reserved DCI fields in the DCI format(s). Furthermore, the DCI(s)/DCI format(s)—e.g., DCI format 1_1 or 1_2 with or without DL assignment—that indicates the subband size(s) for a channel/signal or a subset of one or more channels/signals could also provide/indicate one or more TCI states/TCI state IDs for the corresponding channel/signal or the corresponding subset of channels/signals. Alternatively, the DCI(s)/DCI format(s)—e.g., DCI format 1_1 or 1_2—that indicates the subband size(s) for a channel/signal or a subset of one or more channels/signals could also provide/indicate resource assignment/allocation/scheduling for the corresponding channel/signal or the corresponding subset of channels/signals.

Furthermore, when the FSBM or frequency selective/frequency subband specific/dependent beam management is enabled (according to one or more examples described herein), the UE 116 could be indicated/configured/provided by network 130, e.g., via higher layer RRC signaling/parameter (e.g., in PDCCH-Config, PDSCH-Config, CSI-ResourceConfig, CSI-ReportConfig, TCI-State, QCL-Info, DLorJointTCI-State or ULTCI-State) and/or MAC CE command and/or dynamic DCI based signaling (e.g., in DCI format 1_1 or 1_2 with or without DL assignment), a bitmap—for one or more DL/UL control/data channels/signals—with each bit position/entry in the bitmap corresponding/associated to a subband within the BWP. For instance, the UE 116 could be indicated by network 130, e.g., in a DCI (e.g., DCI format 1_1 or 1_2), the bitmap. For this case, one or more new/dedicated DCI fields could be introduced in the corresponding DCI format(s), and/or one or more bits/codepoints of one or more existing/reserved DCI fields in the corresponding DCI format(s) could be repurposed to indicate the bitmap. If a bit position/entry of the bitmap is set to '1' (or '0'), the frequency subband corresponding/associated to the bit position/entry is used/determined as a FSBM transmission subband for the one or more DL/UL control/data channels/signals. For this case, the bitmap could contain/comprise $N_{tx}$ bit positions/entries set to '1's (or '0's) indicating/configuring a total of $N_{tx}$ FSBM transmission subbands for the one or more DL/UL control/data channels/signals. The bitmap, and therefore, the corresponding indicated/configured $N_{tx}$ FSBM transmission subbands, could be for all DL/UL control/data channels/signals such as PDCCH, PDSCH, PUCCH, and PUSCH. Optionally, the UE 116 could be indicated/configured/provided by network 130, e.g., via higher layer RRC signaling/parameter and/or MAC CE command and/or dynamic DCI based signaling as discussed/described above, a set of one or more such bitmaps with each bitmap corresponding/associated to a channel/signal (e.g., PDCCH, PDSCH, PUCCH or PUSCH) or a subset of one or more channels/signals (e.g., PDCCH and PDSCH).

In one example, when the FSBM or frequency selective/frequency subband specific/dependent beam management is enabled (according to one or more examples described herein), the association/mapping between the (set of) one or more bitmaps and the channels/signals are fixed in the system specifications. For example, the first bitmap could be indicated/configured for PDCCH, the second bitmap could be indicated/configured for PDSCH, the third bitmap could be indicated/configured for PUCCH, and the fourth bitmap could be indicated/configured for PUSCH. For another example, the first bitmap could be indicated/configured for DL control/data channels/signals such as PDCCH and PDSCH, and the second bitmap could be indicated/configured for UL control/data channels/signals such as PUCCH and PUSCH. For yet another example, the first bitmap could be indicated/configured for control channels/signals such as PDCCH and PUCCH, and the second bitmap could be indicated/configured for data channels/signals such as PDSCH and PUSCH.

In another example, when the FSBM or frequency selective/frequency subband specific/dependent beam management is enabled (according to one or more examples described herein), the UE 116 could be indicated/configured/provided by network 130, e.g., via higher layer RRC signaling/parameter and/or MAC CE command and/or dynamic DCI based signaling, the association/mapping between the (set of) one or more bitmaps and the channels/signals. For example, the bitmap(s) for a channel/signal or a subset of one or more channels/signals could be indicated/configured/provided in the higher layer parameter(s)—e.g., PDCCH-Config, PDSCH-Config, ControlResourceSet, PUCCH-Config, PUSCH-Config, etc. —that configures the corresponding channel/signal or the corresponding subset of one or more channels/signals. For another example, the bitmap(s) for a channel/signal or a subset of one or more channels/signals could be indicated in one or more DCIs (e.g., in DCI format 1_1 or 1_2). The indication could be via one or more new/dedicated DCI fields in the DCI format(s) or repurposing one or more bits/codepoints of one or more existing/reserved DCI fields in the DCI format(s). Furthermore, the DCI(s)/DCI format(s)—e.g., DCI format 1_1 or 1_2 with or without DL assignment—that indicates the bitmap(s) for a channel/signal or a subset of one or more channels/signals could also provide/indicate one or more TCI states/TCI state IDs for the corresponding channel/signal or the corresponding subset of channels/signals. Alternatively, the DCI(s)/DCI format(s)—e.g., DCI format 1_1 or 1_2—that indicates the bitmap(s) for a channel/signal or a subset of one or more channels/signals could also provide/indicate resource assignment/allocation/scheduling for the corresponding channel/signal or the corresponding subset of channels/signals.

When the FSBM or frequency selective/frequency subband specific/dependent beam management is enabled (according to one or more examples described herein), the FSBM transmission subband(s) and the FSBM measurement/reporting subband(s) could be the same or different (i.e., $N_{tx}=N_{meas}$ (or $N_{report}$), $N_{tx}\geq N_{meas}$ (or $N_{report}$) or $N_{tx}\leq N_{meas}$ (or $N_{report}$)).

For example, when the FSBM or frequency selective/frequency subband specific/dependent beam management is enabled (according to one or more examples described herein), the UE 116 could be configured/indicated/provided by the network 130, e.g., via higher layer RRC signaling/parameter and/or MAC CE command and/or dynamic DCI based signaling, the same frequency subband(s) for frequency-selective transmission(s) and frequency-selective beam measurement/reporting (i.e., $N_{tx}=N_{meas}$ (or $N_{report}$)). For this case, the UE 116 could only be configured/indicated/provided by the network 130, e.g., via higher layer RRC signaling/parameter and/or MAC CE command and/or dynamic DCI based signaling, the FSBM transmission subband(s) or the FSBM measurement subband(s) or the FSBM reporting subband(s) according to the above discussed/described design examples. The UE 116 could be further indicated by the network 130 that the FSBM transmission subband(s) is the same as the FSBM measurement/reporting subband(s) or vice versa. This indication could be via higher layer RRC signaling/parameter and/or MAC CE command and/or dynamic DCI based signaling.

For another example, when the FSBM or frequency selective/frequency subband specific/dependent beam management is enabled (according to one or more examples described herein), the FSBM transmission subband(s) could be a subset of the FSBM measurement/reporting subband(s), or vice versa.

In one example, when the FSBM or frequency selective/frequency subband specific/dependent beam management is enabled (according to one or more examples described herein), the association/mapping between the FSBM transmission subband(s) and the FSBM measurement/reporting subband(s) could be fixed in the system specification(s)—e.g., the first FSBM transmission subband could correspond to the first FSBM measurement/reporting subband, the second FSBM transmission subband could correspond to the second FSBM measurement/reporting subband, and so on.

In another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between one or more of the FSBM transmission subband(s) and one or more of the FSBM measurement/reporting subband(s).

Furthermore, when the FSBM or frequency selective/frequency subband specific/dependent beam management is enabled (according to one or more examples described herein), the FSBM transmission subband(s) that is active for one or more TCI states (and therefore, the corresponding QCL source RS(s) indicated therein) indicated in a MAC CE/DCI—referred to as active FSBM transmission subband(s) in the present disclosure (configured according to one or more examples described herein), the FSBM measurement subband(s) that is active/used for frequency-selective beam measurement/reporting for one or more CSI-RS resources—referred to as active FSBM measurement subband(s) in the present disclosure (configured according to one or more examples described herein) and the FSBM reporting subband(s) that is active/used for frequency-selective beam measurement/reporting for one or more CSI-RS resources—referred to as active FSBM reporting subband(s) in the present disclosure (configured according to one or more examples described herein) could be the same or different (i.e., $M_{tx}=M_{meas}$ (or $M_{report}$), $M_{tx}\geq M_{meas}$ (or $M_{report}$) or $M_{tx}\leq M_{meas}$ (or $M_{report}$)).

For example, when the FSBM or frequency selective/frequency subband specific/dependent beam management is enabled (according to one or more examples described herein), the UE 116 could be configured/indicated/provided by the network 130, e.g., via higher layer RRC signaling/parameter and/or MAC CE command and/or dynamic DCI based signaling, the same frequency subband(s) for both active FSBM transmission subband(s) and active FSBM measurement/reporting subband(s) (i.e., $M_{tx}=M_{meas}$ (or $M_{report}$)). For this case, the UE 116 could only be configured/indicated/provided by the network 130, e.g., via higher layer RRC signaling/parameter and/or MAC CE command and/or dynamic DCI based signaling, the active FSBM transmission subband(s)—following one or more examples described herein, the active FSBM measurement subband(s)—following one or more examples described herein, or the active FSBM reporting subband(s)—following one or more examples described herein. The UE 116 could be further indicated by the network 130 that the active FSBM transmission subband(s) is the same as the active FSBM measurement/reporting subband(s) or vice versa. This indication could be via higher layer RRC signaling/parameter and/or MAC CE command and/or dynamic DCI based signaling.

For another example, when the FSBM or frequency selective/frequency subband specific/dependent beam management is enabled (according to one or more examples described herein), the active FSBM transmission subband(s) could be a subset of the active FSBM measurement/reporting subband(s), or vice versa.

In one example, when the FSBM or frequency selective/frequency subband specific/dependent beam management is enabled (according to one or more examples described herein), the association/mapping between the active FSBM transmission subband(s) and the active FSBM measurement/reporting subband(s) could be fixed in the system specification(s)—e.g., the first active FSBM transmission subband could correspond to the first active FSBM measurement/reporting subband, the second active FSBM transmission subband could correspond to the second active FSBM measurement/reporting subband, and so on.

In another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between one or more of the active FSBM transmission subband(s) and one or more of the active FSBM measurement/reporting subband(s).

Furthermore, when the FSBM or frequency selective/frequency subband specific/dependent beam management is enabled (according to one or more examples described herein), the (active) FSBM transmission subband(s) and the subband(s) for frequency domain resource assignment/allocation indicated in/by the frequency domain resource assignment (FD-RA) field in a DCI (e.g., DCI formats 00, 01, 10, 11 or 1_2) could be the same or different.

For example, when the FSBM or frequency selective/frequency subband specific/dependent beam management is enabled (according to one or more examples described herein), the UE 116 could be configured/indicated/provided by the network 130, e.g., via higher layer RRC signaling/parameter and/or MAC CE command and/or dynamic DCI based signaling, that the (active) FSBM transmission subband(s) is identical to the subband(s) indicated by/in the FD-RA field in a DCI.

For another example, when the FSBM or frequency selective/frequency subband specific/dependent beam management is enabled (according to one or more examples described herein), the (active) FSBM transmission subband(s) could be a subset of the subband(s) indicated by/in the FD-RA field in a DCI, or vice versa.

In one example, when the FSBM or frequency selective/frequency subband specific/dependent beam management is enabled (according to one or more examples described herein), the association/mapping between the FSBM transmission subband(s) and the subband(s) indicated by/in the FD-RA field in a DCI could be fixed in the system specification(s)—e.g., the first FSBM transmission subband could correspond to the first subband indicated by/in the FD-RA field in a DCI, the second FSBM transmission subband could correspond to the second subband indicated by/in the FD-RA field in the DCI, and so on.

In another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between one or more of the FSBM transmission subband(s) and one or more of the subband(s) indicated by/in the FD-RA field in a DCI.

When the FSBM or frequency selective/frequency subband specific/dependent beam management is enabled (according to one or more examples described herein), the association/mapping relationship between the following (i) and (ii) could follow or be determined/configured according to one or more examples described herein: (i) active FSBM measurement subband(s) and (ii) FSBM reporting subband(s), (i) active FSBM measurement subband(s) and (ii) FSBM transmission subband(s), (i) FSBM measurement subband(s) and (ii) subband(s) indicated by/in the FD-RA field in a DCI, (i) active FSBM measurement subband(s) and (ii) subband(s) indicated by/in the FD-RA field in a DCI, (i) active FSBM reporting subband(s) and (ii) FSBM measurement subband(s), (i) active FSBM reporting subband(s) and (ii) FSBM transmission subband(s), (i) FSBM reporting subband(s) and (ii) subband(s) indicated by/in the FD-RA field in a DCI, (i) active FSBM reporting subband(s) and (ii) subband(s) indicated by/in the FD-RA field in a DCI, (i) active FSBM transmission subband(s) and (ii) FSBM measurement subband(s), (i) active FSBM transmission subband(s) and (ii) FSBM reporting subband(s).

As discussed above, when the FSBM or frequency selective/frequency subband specific/dependent beam management is enabled (according to one or more examples described herein), the UE 116 could be configured/indicated/provided by the network 130, e.g., via higher layer RRC signaling/parameter and/or MAC CE command and/or dynamic DCI based signaling, the FSBM measurement subband size—in number of PRBs (or size of each of the FSBM measurement subbands in number of PRBs), the FSBM reporting subband size—in number of PRBs (or size of each of the FSBM reporting subbands in number of PRBs), and/or the FSBM transmission subband size—in number of PRBs (or size of each of the FSBM transmission subbands in number of PRBs)—for one or more DL/UL control/data channels/signals.

In one example, the FSBM measurement subband size could be the same as the FSBM reporting subband size, the FSBM transmission subband size, or the subband size indicated in/by the frequency domain resource assignment (FD-RA) field in a DCI (e.g., DCI formats 00, 01, 10, 1_1 or 12).

In another example, the FSBM measurement subband size is related to the FSBM reporting subband size, the FSBM transmission subband size, or the subband size indicated in/by the frequency domain resource assignment (FD-RA) field in a DCI (e.g., DCI formats 0_0, 01, 10, 1_1 or 12) by a fixed (mapping/association) relationship. For instance, the FSBM measurement subband size is a multiple (e.g., a multiple/scaling factor k) of the FSBM reporting subband size, the FSBM transmission subband size, or the subband size indicated in/by the frequency domain resource assignment (FD-RA) field in a DCI (e.g., DCI formats 00, 0_1, 10, 1_1 or 12). The multiple/scaling factor k could be fixed in the system specifications and/or indicated/configured/provided to the UE 116 via higher layer RRC signaling/parameter and/or MAC CE command and/or dynamic DCI based signaling.

In yet another example, the FSBM measurement subband size is independently/separately configured/indicated relative to the FSBM reporting subband size, the FSBM transmission subband size or the subband size indicated in/by the frequency domain resource assignment (FD-RA) field in a DCI (e.g., DCI formats 0_0, 01, 1_0, 1_1 or 12).

In one example, the FSBM reporting subband size could be the same as the FSBM measurement subband size, the FSBM transmission subband size, or the subband size indicated in/by the frequency domain resource assignment (FD-RA) field in a DCI (e.g., DCI formats 00, 01, 10, 1_1 or 12).

In another example, the FSBM reporting subband size is related to the FSBM measurement subband size, the FSBM transmission subband size, or the subband size indicated in/by the frequency domain resource assignment (FD-RA) field in a DCI (e.g., DCI formats 0_0, 01, 10, 1_1 or 12) by a fixed (mapping/association) relationship. For instance, the FSBM reporting subband size is a multiple (e.g., a multiple/scaling factor k) of the FSBM measurement subband size, the FSBM transmission subband size, or the subband size indicated in/by the frequency domain resource assignment (FD-RA) field in a DCI (e.g., DCI formats 0_0, 01, 10, 1_1 or 12). The multiple/scaling factor k could be fixed in the system specifications and/or indicated/configured/provided to the UE 116 via higher layer RRC signaling/parameter and/or MAC CE command and/or dynamic DCI based signaling.

In yet another example, the FSBM reporting subband size is independently/separately configured/indicated relative to the FSBM measurement subband size, the FSBM transmission subband size, or the subband size indicated in/by the frequency domain resource assignment (FD-RA) field in a DCI (e.g., DCI formats 0_0, 01, 10, 1_1 or 1_2).

In one example, the FSBM transmission subband size could be the same as the FSBM measurement subband size, the FSBM reporting subband size, or the subband size indicated in/by the frequency domain resource assignment (FD-RA) field in a DCI (e.g., DCI formats 00, 01, 10, 1_1 or 12).

In another example, the FSBM transmission subband size is related to the FSBM measurement subband size, the FSBM reporting subband size, or the subband size indicated in/by the frequency domain resource assignment (FD-RA) field in a DCI (e.g., DCI formats 00, 01, 10, 1_1 or 12) by a fixed (mapping/association) relationship. For instance, the FSBM transmission subband size is a multiple (e.g., a multiple/scaling factor k) of the FSBM measurement subband size, the FSBM reporting subband size, or the subband size indicated in/by the frequency domain resource assignment (FD-RA) field in a DCI (e.g., DCI formats 0_0, 01, 10, 1_1 or 12). The multiple/scaling factor k could be fixed in the system specifications and/or indicated/configured/provided to the UE 116 via higher layer RRC signaling/parameter and/or MAC CE command and/or dynamic DCI based signaling.

In yet another example, the FSBM transmission subband size is independently/separately configured/indicated relative to the FSBM measurement subband size, the FSBM reporting subband size, or the subband size indicated in/by the frequency domain resource assignment (FD-RA) field in a DCI (e.g., DCI formats 0_0, 01, 10, 1_1 or 1_2).

As discussed above, the UE 116 could be configured by the network 130 one or more CSI-RS resources for channel measurement each associated/configured with one or more FSBM measurement/reporting frequency subbands. The CSI-RS resources for FSBM could be configured in one or more CSI resource sets for FSBM (e.g., each provided by CSI-SSB-ResourceSet/NZP-CSI-RS-ResourceSet), and/or one or more CSI resource subsets/groups for FSBM (e.g., each provided by CSI-SSB-ResourceSubset/NZP-CSI-RS-ResourceSubSet), and/or one or more CSI resource settings for FSBM (e.g., each provided by CSI-ResourceConfig). Furthermore, different CSI-RS resources for FSBM could be configured/associated with the same FSBM measurement/reporting subbands (and therefore, the same number of FSBM measurement/reporting subbands). Alternatively, different CSI-RS resources for FSBM could be configured/associated with different FSBM measurement/reporting subbands (and therefore, different numbers of FSBM measurement/reporting subbands). The higher layer parameter, e.g., CSI-ResourceConfig, that configures a CSI resource setting for FSBM, and/or the higher layer parameter, e.g., CSI-SSB-ResourceSet/NZP-CSI-RS-ResourceSet, that configures a CSI resource set for FSBM, and/or the higher layer parameter, e.g., CSI-SSB-ResourceSubset/NZP-CSI-RS-ResourceSubSet, that configures a CSI resource subset for FSBM, and/or the higher layer parameter, e.g., NZP-CSI-RS-Resource, that configures a NZP CSI-RS resource for FSBM, could contain/configure/provide/include/indicate a higher layer parameter repetition. If a UE is configured with a CSI-ResourceConfig for FSBM, and/or a CSI-SSB-ResourceSet/NZP-CSI-RS-ResourceSet for FSBM, and/or a CSI-SSB-ResourceSubset/NZP-CSI-RS-ResourceSubSet for FSBM, and/or NZP-CSI-RS-Resource for FSBM configured with the higher layer parameter repetition set to 'on', the UE 116 may assume that one or more CSI-RS resources—within the CSI-ResourceConfig, and/or CSI-SSB-ResourceSet/NZP-CSI-RS-ResourceSet, and/or CSI-SSB-ResourceSubset/NZP-CSI-RS-ResourceSubSet, and/or NZP-CSI-RS-Resource—on one or more configured FSBM measurement/reporting subbands are transmitted with the same downlink spatial domain transmission filter(s). If repetition is set to 'off', the UE 116 shall not assume that the one or more CSI-RS resources—within the CSI-ResourceConfig, and/or CSI-SSB-ResourceSet/NZP-CSI-RS-ResourceSet, and/or CSI-SSB-ResourceSubset/NZP-CSI-RS-ResourceSubSet, and/or NZP-CSI-RS-Resource—on one or more configured FSBM measurement/reporting subbands are transmitted with the same downlink spatial domain transmission filter(s).

In one embodiment, the UE 116 could be configured by the network 130 one or more (e.g., K≥1) CSI-RS resources for channel measurement (e.g., each provided by NZP-CSI-RS-Resource for FSBM) in a CSI resource set. Each configured CSI-RS resource for FSBM could be associated/configured with one or more (e.g., $N_{mr} \geq 1$, $N_{mr} = N_{meas}$ or $N_{report}$) FSBM measurement/reporting subbands.

In one example, when the FSBM or frequency selective/frequency subband specific/dependent beam management is enabled (according to one or more examples described herein) and/or if a UE is configured with a NZP-CSI-RS-ResourceSet configured with the higher layer parameter repetition set to 'on', the UE 116 could be configured/indicated/provided by the network 130, e.g., via higher layer RRC signaling/parameter and/or MAC CE command and/or dynamic DCI based signaling, one or more FSBM measurement/reporting subbands, on which, one or more CSI-RS resources within the CSI resource set are transmitted with the same downlink spatial domain transmission filter(s).

For example, the higher layer parameter NZP-CSI-RS-ResourceSet that configures the CSI resource set for FSBM (and/or a MAC CE command and/or a DCI) could configure/indicate/provide a set/list of one or more (e.g. $N_{rep} \geq 1$) subband indexes, wherein each subband index could point/correspond to a FSBM measurement/reporting subband among all the configured $N_{mr}$ FSBM measurement/reporting subbands. The (e.g., $N_{rep}$) FSBM measurement/reporting subbands that correspond to the set/list of (e.g., $N_{rep}$) subband indexes could be referred to as FSBM measurement/reporting subbands for repetition. Alternatively, the higher layer parameter NZP-CSI-RS-ResourceSet that configures the CSI resource set for FSBM (and/or a MAC CE command and/or a DCI) could configure/indicate/provide a bitmap of length $N_{mr}$ with each bit position/entry in the bitmap corresponding to a FSBM measurement/reporting subband among all the configured $N_{mr}$ FSBM measurement/reporting subbands. If a bit position/entry in the bitmap is set to '1' (or '0'), the FSBM measurement/reporting subband corresponding/associated to the bit position/entry is used/determined as a FSBM measurement/reporting subband for repetition. The bitmap could contain/include/provide one or more (e.g., $N_{rep}$) bit positions/entries set to '1' (or '0') indicating a total of $N_{rep}$ FSBM measurement/reporting subbands for repetition. Optionally, the $N_{rep}$ FSBM measurement/reporting subbands for repetition could correspond to all the configured $N_{mr}$ FSBM measurement/reporting subbands (i.e., $N_{rep} = N_{mr}$). For this case, the UE 116 may not need to be indicated/configured/provided by the network 130 with the exact FSBM measurement/reporting subbands for repetition. If the UE 116 is not indicated/configured/provided by the network 130 with the exact FSBM measurement/reporting subbands for repetition, the UE 116 could assume that the $N_{rep}$ FSBM measurement/reporting subbands for repetition correspond to all the configured $N_{mr}$ FSBM measurement/reporting subbands (i.e., $N_{rep} = N_{mr}$), or the UE 116 could be indicated/configured/provided by the network 130, e.g., via higher layer RRC signaling and/or MAC CE command and/or dynamic DCI based L1 signaling, that the $N_{rep}$ FSBM measurement/reporting subbands for repetition correspond to all the configured $N_{mr}$ FSBM measurement/reporting subbands (i.e., $N_{rep} = N_{mr}$). the UE 116 could assume that one or more of the K CSI-RS resources within the CSI resource set (provided by, e.g., NZP-CSI-RS-ResourceSet), on the same FSBM frequency measurement/reporting subband(s) for repetition (i.e., with the same subband index(es) among all the configured $N_{mr}$ FSBM measurement/reporting subbands or among all the $N_{rep}$ FSBM measurement/reporting subbands for repetition), are transmitted with the same downlink spatial domain transmission filter(s).

In one example, the UE 116 cold assume that all of the K CSI-RS resources within the CSI resource set (provided by, e.g., NZP-CSI-RS-ResourceSet), on the same FSBM frequency measurement/reporting subband(s) for repetition (i.e., with the same subband index(es) among all the configured $N_{mr}$ FSBM measurement/reporting subbands or among all the $N_{rep}$ FSBM measurement/reporting subbands for repetition), are transmitted with the same downlink spatial domain transmission filter(s).

In another example, the UE 116 could assume that K' out of the K CSI-RS resources within the CSI resource set (provided by, e.g., NZP-CSI-RS-ResourceSet), on the same FSBM frequency measurement/reporting subband(s) for repetition (i.e., with the same subband index(es) among all the configured $N_{mr}$ FSBM measurement/reporting subbands or among all the $N_{rep}$ FSBM measurement/reporting subbands for repetition), are transmitted with the same downlink spatial domain transmission filter(s). The UE 116 could receive from the network 130, e.g., via higher layer RRC signaling/parameter (e.g., in the higher layer parameter NZP-CSI-RS-ResourceSet that configures the NZP CSI-RS resource set for FSBM) and/or MAC CE command and/or dynamic DCI based signaling, a bitmap of length K with each bit position/entry of the bitmap corresponding to a CSI-RS resource within the set. If a bit position/entry of the bitmap is set to '1' (or '0'), the CSI-RS resource corresponding/associated with the bit position/entry is determined as one CSI-RS resource out of the K' CSI-RS resources. The bitmap could contain/provide/include K' bit positions/entries set to '1' (or '0'). Alternatively, the UE 116 could receive from the network 130, e.g., via higher layer RRC signaling/parameter (e.g., in the higher layer parameter NZP-CSI-RS-ResourceSet that configures the NZP CSI-RS resource set for FSBM) and/or MAC CE command and/or dynamic DCI based signaling, a set/list of K' CSI-RS resource indexes. Optionally, the UE 116 could receive from the network 130 a MAC CE activation command activating the K' CSI-RS resources from/out of the K CSI-RS resources for FSBM configured within the CSI resource set.

For another example, the higher layer parameter NZP-CSI-RS-Resource that configures a NZP CSI-RS resource for channel measurement in the CSI resource set for FSBM (and/or a MAC CE command and/or a DCI) could configure/indicate/provide a set/list of one or more (e.g. $N_{rep} \geq 1$) subband indexes, wherein each subband index could point/correspond to a FSBM measurement/reporting subband among all the configured $N_{mr}$ FSBM measurement/reporting subbands. The (e.g., $N_{rep}$) FSBM measurement/reporting subbands that correspond to the set/list of (e.g., $N_{rep}$) subband indexes could be referred to as FSBM measurement/reporting subbands for repetition for the NZP CSI-RS resource. Alternatively, the higher layer parameter NZP-CSI-RS-Resource that configures a NZP CSI-RS resource for channel measurement in the CSI resource set for FSBM (and/or a MAC CE command and/or a DCI) could configure/indicate/provide a bitmap of length $N_{mr}$ with each bit position/entry in the bitmap corresponding to a FSBM measurement/reporting subband among all the configured $N_{mr}$ FSBM measurement/reporting subbands. If a bit position/entry in the bitmap is set to '1' (or '0'), the FSBM measurement/reporting subband corresponding/associated to the bit position/entry is used/determined as a FSBM measurement/reporting subband for repetition for the NZP CSI-RS resource. The bitmap could contain/include/provide one or more (e.g., $N_{rep}$) bit positions/entries set to '1' (or '0') indicating a total of $N_{rep}$ FSBM measurement/reporting subbands for repetition for the NZP CSI-RS resource. Optionally, the $N_{rep}$ FSBM measurement/reporting subbands for repetition could correspond to all the configured $N_{mr}$ FSBM measurement/reporting subbands (i.e., $N_{rep}=N_{mr}$). For this case, the UE 116 may not need to be indicated/configured/provided by the network 130 with the exact FSBM measurement/reporting subbands for repetition. If the UE 116 is not indicated/configured/provided by the network 130 the exact FSBM measurement/reporting subbands for repetition, the UE 116 could assume that the $N_{rep}$ FSBM measurement/reporting subbands for repetition correspond to all the configured $N_{mr}$ FSBM measurement/reporting subbands (i.e., $N_{rep}=N_{mr}$), or the UE 116 could be indicated/configured/provided by the network 130, e.g., via higher layer RRC signaling and/or MAC CE command and/or dynamic DCI based L1 signaling, that the $N_{rep}$ FSBM measurement/reporting subbands for repetition correspond to all the configured $N_{mr}$ FSBM measurement/reporting subbands (i.e., $N_{rep}=N_{mr}$). The UE 116 could assume that one or more of the K CSI-RS resources within the CSI resource set (provided by, e.g., NZP-CSI-RS-ResourceSet), on the same FSBM frequency measurement/reporting subband(s) for repetition (i.e., with the same subband index(es) among all the configured $N_{mr}$ FSBM measurement/reporting subbands or among all the $N_{rep}$ FSBM measurement/reporting subbands for repetition), are transmitted with the same downlink spatial domain transmission filter(s).

In one example, the UE 116 could assume that all of the K CSI-RS resources within the CSI resource set (provided by, e.g., NZP-CSI-RS-ResourceSet), on the same FSBM frequency measurement/reporting subband(s) for repetition (i.e., with the same subband index(es) among all the configured $N_{mr}$ FSBM measurement/reporting subbands or among all the $N_{rep}$ FSBM measurement/reporting subbands for repetition), are transmitted with the same downlink spatial domain transmission filter(s).

In another example, the UE 116 could assume that K' out of the K CSI-RS resources within the CSI resource set (provided by, e.g., NZP-CSI-RS-ResourceSet), on the same FSBM frequency measurement/reporting subband(s) for repetition (i.e., with the same subband index(es) among all the configured $N_{mr}$ FSBM measurement/reporting subbands or among all the $N_{rep}$ FSBM measurement/reporting subbands for repetition), are transmitted with the same downlink spatial domain transmission filter(s). The UE 116 could receive from the network 130, e.g., via higher layer RRC signaling/parameter (e.g., in the higher layer parameter NZP-CSI-RS-ResourceSet that configures the NZP CSI-RS resource set for FSBM) and/or MAC CE command and/or dynamic DCI based signaling, a bitmap of length K with each bit position/entry of the bitmap corresponding to a CSI-RS resource within the set. If a bit position/entry of the bitmap is set to '1' (or '0'), the CSI-RS resource corresponding/associated with the bit position/entry is determined as one CSI-RS resource out of the K' CSI-RS resources. The bitmap could contain/provide/include K' bit positions/entries set to '1' (or '0'). Alternatively, the UE 116 could receive from the network 130, e.g., via higher layer RRC signaling/parameter (e.g., in the higher layer parameter NZP-CSI-RS-ResourceSet that configures the NZP CSI-RS resource set for FSBM) and/or MAC CE command and/or dynamic DCI based signaling, a set/list of K' CSI-RS resource indexes. Optionally, the UE 116 could receive from the network 130 a MAC CE activation command activating the K' CSI-RS resources from/out of the K CSI-RS resources for FSBM configured within the CSI resource set.

For yet another example, the higher layer parameter NZP-CSI-RS-ResourceSet that configures the CSI resource set for FSBM (and/or a MAC CE command and/or a DCI) could configure/indicate/provide one or more (e.g., K) sets/lists of subband indexes with each set comprising one or more (e.g. $N_{rep,k} \geq 1$) subband indexes for the k-th CSI-RS resource for FSBM within the resource set (e.g., k=1, . . . , K), wherein each subband index could point/correspond to a FSBM measurement/reporting subband among all the configured $N_{mr}$ FSBM measurement/reporting subbands. The (e.g., $N_{rep,k}$) FSBM measurement/reporting subbands that correspond to the (e.g., k-th) set/list of (e.g., $N_{rep,k}$) subband indexes could be referred to as FSBM measurement/reporting subbands for repetition for the k-th CSI-RS resource within the set provided by, e.g., NZP-CSI-RS-ResourceSet. Alternatively, the higher layer parameter NZP- CSI-RS-ResourceSet that configures the CSI resource set for FSBM (and/or a MAC CE command and/or a DCI) could configure/indicate/provide one or more (e.g., K) bitmaps. Each bitmap could have a length $N_{mr}$ with each bit position/entry in the bitmap corresponding to a FSBM measurement/reporting subband among all the configured $N_{mr}$ FSBM measurement/reporting subbands. Furthermore, each bitmap could be associated with a CSI-RS resource for FSBM within the CSI resource set provided by, e.g., NZP-CSI-RS-ResourceSet. If a bit position/entry in a (e.g., the k-th) bitmap is set to '1' (or '0'), the FSBM measurement/reporting subband corresponding/associated to the bit position/entry is used/determined as a FSBM measurement/reporting subband for repetition for a (e.g., the k-th) CSI-RS resource for channel measurement in the resource set for FSBM, where k=1, . . . , K. The k-th bitmap could contain/include/provide one or more (e.g., $N_{rep,k}$) bit positions/entries set to '1' (or '0') indicating a total of $N_{rep,k}$ FSBM measurement/reporting subbands for repetition for the k-th CSI-RS resource for FSBM. Optionally, the $N_{rep,k}$ FSBM measurement/reporting subbands for repetition for the k-th CSI-RS resource for FSBM could correspond to all the configured $N_{mr}$ FSBM measurement/reporting subbands (i.e., $N_{rep,k}=N_{mr}$), where k∈{1, . . . , K} or k=1, . . . , K. For this case, the UE 116 may not need to be indicated/configured/provided by the network 130 the exact FSBM measurement/reporting subbands for repetition for the k-th CSI-RS resource for FSBM within the resource set. If the UE 116 is not indicated/configured/provided by the network 130 with the exact FSBM measurement/reporting subbands for repetition for the k-th CSI-RS resource for FSBM within the CSI resource set provided by, e.g., NZP-CSI-RS-ResourceSet, the UE 116 could assume that the $N_{rep,k}$ FSBM measurement/reporting subbands for repetition for the k-th CSI-RS resource corresponds to all the configured $N_{mr}$ FSBM measurement/reporting subbands (i.e., $N_{rep,k}=N_{mr}$), or the UE 116 could be indicated/configured/provided by the network 130, e.g., via higher layer RRC signaling and/or MAC CE command and/or dynamic DCI based L1 signaling, that the $N_{rep,k}$ FSBM measurement/reporting subbands for repetition for the k-th CSI-RS resource in the set correspond to all the configured $N_{mr}$ FSBM measurement/reporting subbands (i.e., $N_{rep,k}=N_{mr}$). The UE 116 could assume that one or more of the KCSI-RS resources within the CSI resource set (provided by, e.g., NZP-CSI-RS-ResourceSet), on the same FSBM frequency measurement/reporting subband(s) for repetition for the corresponding CSI-RS resource(s) (i.e., with the same subband index(es) among all the configured $N_{mr}$ FSBM measurement/reporting subbands or among the corresponding $N_{rep,k}$ FSBM measurement/reporting subbands for repetition for the k-th CSI-RS resource for FSBM within the resource set with k∈{1, . . . , K}), are transmitted with the same downlink spatial domain transmission filter(s).

In one example, the UE 116 cold assume that all of the K CSI-RS resources within the CSI resource set (provided by, e.g., NZP-CSI-RS-ResourceSet), on the same FSBM frequency measurement/reporting subband(s) for repetition for the corresponding CSI-RS resources (i.e., with the same subband index(es) among all the configured $N_{mr}$ FSBM measurement/reporting subbands or among the corresponding $N_{rep,k}$ FSBM measurement/reporting subbands for repetition for the k-th CSI-RS resource for FSBM within the resource set with k∈{1, . . . , K}), are transmitted with the same downlink spatial domain transmission filter(s).

In another example, the UE 116 could assume that K' out of the K CSI-RS resources within the CSI resource set (provided by, e.g., NZP-CSI-RS-ResourceSet), on the same FSBM frequency measurement/reporting subband(s) for repetition for the corresponding CSI-RS resources (i.e., with the same subband index(es) among all the configured $N_{mr}$ FSBM measurement/reporting subbands or among the corresponding $N_{rep,k}$ FSBM measurement/reporting subbands for repetition for the k'-th CSI-RS resource for FSBM among all the K' CSI-RS resources with k'∈{1, . . . , K'}), are transmitted with the same downlink spatial domain transmission filter(s). The UE 116 could receive from the network 130, e.g., via higher layer RRC signaling/parameter (e.g., in the higher layer parameter NZP-CSI-RS-ResourceSet that configures the NZP CSI-RS resource set for FSBM) and/or MAC CE command and/or dynamic DCI based signaling, a bitmap of length K with each bit position/entry of the bitmap corresponding to a CSI-RS resource within the set. If a bit position/entry of the bitmap is set to '1' (or '0'), the CSI-RS resource corresponding/associated with the bit position/entry is determined as one CSI-RS resource out of the K' CSI-RS resources. The bitmap could contain/provide/include K' bit positions/entries set to '1' (or '0'). Alternatively, the UE 116 could receive from the network 130, e.g., via higher layer RRC signaling/parameter (e.g., in the higher layer parameter NZP-CSI-RS-ResourceSet that configures the NZP CSI-RS resource set for FSBM) and/or MAC CE command and/or dynamic DCI based signaling, a set/list of K' CSI-RS resource indexes. Optionally, the UE 116 could receive from the network 130 a MAC CE activation command activating the K' CSI-RS resources from/out of the K CSI-RS resources for FSBM configured within the CSI resource set.

For yet another example, the higher layer parameter NZP-CSI-RS-Resource that configures a NZP CSI-RS resource for channel measurement—e.g., the k-th CSI-RS resource—in the CSI resource set for FSBM (and/or a MAC CE command and/or a DCI) could configure/indicate/provide a set/list of one or more (e.g. $N_{rep,k}≥1$) subband indexes, wherein each subband index could point/correspond to a FSBM measurement/reporting subband among all the configured $N_{mr}$ FSBM measurement/reporting subbands and k=1, . . . , K. The (e.g., $N_{rep,k}$) FSBM measurement/reporting subbands that correspond to the set/list of (e.g., $N_{rep,k}$) subband indexes could be referred to as FSBM measurement/reporting subbands for repetition for the k-th CSI-RS resource within the CSI resource set provided by, e.g., NZP-CSI-RS-ResourceSet. Alternatively, the higher layer parameter NZP-CSI-RS-Resource that configures a NZP CSI-RS resource for channel measurement—e.g., the k-th CSI-RS resource—in the CSI resource set for FSBM (and/or a MAC CE command and/or a DCI) could configure/indicate/provide a bitmap of length $N_{mr}$ with each bit position/entry in the bitmap corresponding to a FSBM measurement/reporting subband among all the configured $N_{mr}$ FSBM measurement/reporting subbands, where k=1, . . . , K. If a bit position/entry in the bitmap is set to '1' (or '0'), the FSBM measurement/reporting subband corresponding/associated to the bit position/entry is used/determined as a FSBM measurement/reporting subband for repetition for the k-th CSI-RS resource within the CSI resource set provided by, e.g., NZP-CSI-RS-ResourceSet. The bitmap could contain/include/provide one or more (e.g., $N_{rep,k}$) bit positions/entries set to '1' (or '0') indicating a total of $N_{rep,k}$ FSBM measurement/reporting subbands for repetition for the k-th CSI-RS resource within the CSI resource set. Optionally, the $N_{rep,k}$ FSBM measurement/reporting subbands for repetition for the k-th CSI-RS resource for FSBM could correspond to all the configured $N_{mr}$ FSBM measurement/reporting subbands (i.e., $N_{rep,k}=N_{mr}$), where $k\in\{1, \ldots, K\}$ or $k=1, \ldots, K$. For this case, the UE 116 may not need to be indicated/configured/provided by the network 130 with the exact FSBM measurement/reporting subbands for repetition for the k-th CSI-RS resource for FSBM within the resource set. If the UE 116 is not indicated/configured/provided by the network 130 with the exact FSBM measurement/reporting subbands for repetition for the k-th CSI-RS resource for FSBM within the CSI resource set provided by, e.g., NZP-CSI-RS-ResourceSet, the UE 116 could assume that the $N_{rep,k}$ FSBM measurement/reporting subbands for repetition for the k-th CSI-RS resource corresponds to all the configured $N_{mr}$ FSBM measurement/reporting subbands (i.e., $N_{rep,k}=N_{mr}$), or the UE 116 could be indicated/configured/provided by the network 130, e.g., via higher layer RRC signaling and/or MAC CE command and/or dynamic DCI based L1 signaling, that the $N_{rep,k}$ FSBM measurement/reporting subbands for repetition for the k-th CSI-RS resource in the set correspond to all the configured $N_{mr}$ FSBM measurement/reporting subbands (i.e., $N_{rep,k}=N_{mr}$). The UE 116 could assume that one or more of the KCSI-RS resources within the CSI resource set (provided by, e.g., NZP-CSI-RS-ResourceSet), on the same FSBM frequency measurement/reporting subband(s) for repetition for the corresponding CSI-RS resource(s) (i.e., with the same subband index(es) among all the configured $N_{mr}$ FSBM measurement/reporting subbands or among the corresponding $N_{rep,k}$ FSBM measurement/reporting subbands for repetition for the k-th CSI-RS resource for FSBM within the resource set with $k\in\{1, \ldots, K\}$), are transmitted with the same downlink spatial domain transmission filter(s).

In one example, the UE 116 cold assume that all of the K CSI-RS resources within the CSI resource set (provided by, e.g., NZP-CSI-RS-ResourceSet), on the same FSBM frequency measurement/reporting subband(s) for repetition for the corresponding CSI-RS resources (i.e., with the same subband index(es) among all the configured $N_{mr}$ FSBM measurement/reporting subbands or among the corresponding $N_{rep,k}$ FSBM measurement/reporting subbands for repetition for the k-th CSI-RS resource for FSBM within the resource set with $k\in\{1, \ldots, K\}$), are transmitted with the same downlink spatial domain transmission filter(s).

In another example, the UE 116 could assume that K' out of the K CSI-RS resources within the CSI resource set (provided by, e.g., NZP-CSI-RS-ResourceSet), on the same FSBM frequency measurement/reporting subband(s) for repetition for the corresponding CSI-RS resources (i.e., with the same subband index(es) among all the configured $N_{mr}$ FSBM measurement/reporting subbands or among the corresponding $N_{rep,k'}$ FSBM measurement/reporting subbands for repetition for the k'-th CSI-RS resource for FSBM among all the K' CSI-RS resources with $k'\in\{1, \ldots, K'\}$), are transmitted with the same downlink spatial domain transmission filter(s). The UE 116 could receive from the network 130, e.g., via higher layer RRC signaling/parameter (e.g., in the higher layer parameter NZP-CSI-RS-Resource-Set that configures the NZP CSI-RS resource set for FSBM) and/or MAC CE command and/or dynamic DCI based signaling, a bitmap of length K with each bit position/entry of the bitmap corresponding to a CSI-RS resource within the set. If a bit position/entry of the bitmap is set to '1' (or '0'), the CSI-RS resource corresponding/associated with the bit position/entry is determined as one CSI-RS resource out of the K' CSI-RS resources. The bitmap could contain/provide/include K' bit positions/entries set to '1' (or '0'). Alternatively, the UE 116 could receive from the network 130, e.g., via higher layer RRC signaling/parameter (e.g., in the higher layer parameter NZP-CSI-RS-ResourceSet that configures the NZP CSI-RS resource set for FSBM) and/or MAC CE command and/or dynamic DCI based signaling, a set/list of K' CSI-RS resource indexes. Optionally, the UE 116 could receive from the network 130 a MAC CE activation command activating the K' CSI-RS resources from/out of the K CSI-RS resources for FSBM configured within the CSI resource set.

In another example, when the FSBM or frequency selective/frequency subband specific/dependent beam management is enabled (according to one or more examples described herein) and/or if a UE is configured with one or more (e.g., $L\geq1$) CSI-RS resources, e.g., each provided by NZP-CSI-RS-Resource configured with the higher layer parameter repetition set to 'on', the UE 116 could be configured/indicated/provided by the network 130, e.g., via higher layer RRC signaling/parameter and/or MAC CE command and/or dynamic DCI based signaling, one or more FSBM measurement/reporting subbands, on which, the one or more CSI-RS resources—each with the higher layer parameter repetition set to 'on'—within the CSI resource set are transmitted with the same downlink spatial domain transmission filter(s).

For example, the higher layer parameter NZP-CSI-RS-ResourceSet that configures the CSI resource set for FSBM (and/or a MAC CE command and/or a DCI) could configure/indicate/provide a set/list of one or more (e.g. $N_{rep}\geq1$) subband indexes, wherein each subband index could point/correspond to a FSBM measurement/reporting subband among all the configured $N_{mr}$ FSBM measurement/reporting subbands. The (e.g., $N_{rep}$) FSBM measurement/reporting subbands that correspond to the set/list of (e.g., $N_{rep}$) subband indexes could be referred to as FSBM measurement/reporting subbands for repetition. Alternatively, the higher layer parameter NZP-CSI-RS-ResourceSet that configures the CSI resource set for FSBM (and/or a MAC CE command and/or a DCI) could configure/indicate/provide a bitmap of length $N_{mr}$ with each bit position/entry in the bitmap corresponding to a FSBM measurement/reporting subband among all the configured $N_{mr}$ FSBM measurement/reporting subbands. If a bit position/entry in the bitmap is set to '1' (or '0'), the FSBM measurement/reporting subband corresponding/associated to the bit position/entry is used/determined as a FSBM measurement/reporting subband for repetition. The bitmap could contain/include/provide one or more (e.g., $N_{rep}$) bit positions/entries set to '1' (or '0') indicating a total of $N_{rep}$ FSBM measurement/reporting subbands for repetition. Optionally, the $N_{rep}$ FSBM measurement/reporting subbands for repetition could correspond to all the configured $N_{mr}$ FSBM measurement/reporting subbands (i.e., $N_{rep}=N_{mr}$). For this case, the UE 116 may not need to be indicated/configured/provided by the network 130 with the exact FSBM measurement/reporting subbands for repetition. If the UE 116 is not indicated/configured/provided by the network 130 with the exact FSBM measurement/reporting subbands for repetition, the UE 116 could assume that the $N_{rep}$ FSBM measurement/reporting subbands for repetition correspond to all the configured $N_{mr}$ FSBM measurement/reporting subbands (i.e., $N_{rep}=N_{mr}$), or the UE 116 could be indicated/configured/provided by the network 130, e.g., via higher layer RRC signaling and/or MAC CE command and/or dynamic DCI based L1 signaling, that the $N_{rep}$ FSBM measurement/reporting subbands for repetition correspond to all the configured $N_{mr}$ FSBM measurement/reporting subbands (i.e., $N_{rep}=N_{mr}$). The UE 116 could assume that one or more of the L CSI-RS resources—each with the higher layer parameter repetition set to 'on'—within the CSI resource set (provided by, e.g., NZP-CSI-RS-ResourceSet), on the same FSBM frequency measurement/reporting subband(s) for repetition (i.e., with the same subband index(es) among all the configured $N_{mr}$ FSBM measurement/reporting subbands or among all the $N_{rep}$ FSBM measurement/reporting subbands for repetition), are transmitted with the same downlink spatial domain transmission filter(s).

In one example, the UE 116 cold assume that all of the L CSI-RS resources—each with the higher layer parameter repetition set to 'on'—within the CSI resource set (provided by, e.g., NZP-CSI-RS-ResourceSet), on the same FSBM frequency measurement/reporting subband(s) for repetition (i.e., with the same subband index(es) among all the configured $N_{mr}$ FSBM measurement/reporting subbands or among all the $N_{rep}$ FSBM measurement/reporting subbands for repetition), are transmitted with the same downlink spatial domain transmission filter(s).

In another example, the UE 116 could assume that L' out of the L CSI-RS resources—each with the higher layer parameter repetition set to 'on'—within the CSI resource set (provided by, e.g., NZP-CSI-RS-ResourceSet), on the same FSBM frequency measurement/reporting subband(s) for repetition (i.e., with the same subband index(es) among all the configured $N_{mr}$ FSBM measurement/reporting subbands or among all the $N_{rep}$ FSBM measurement/reporting subbands for repetition), are transmitted with the same downlink spatial domain transmission filter(s). The UE 116 could receive from the network 130, e.g., via higher layer RRC signaling/parameter (e.g., in the higher layer parameter NZP-CSI-RS-ResourceSet that configures the NZP CSI-RS resource set for FSBM) and/or MAC CE command and/or dynamic DCI based signaling, a bitmap of length L with each bit position/entry of the bitmap corresponding to a CSI-RS resource within the set. If a bit position/entry of the bitmap is set to '1' (or '0'), the CSI-RS resource corresponding/associated with the bit position/entry is determined as one CSI-RS resource out of the L' CSI-RS resources, each with the higher layer parameter repetition set to 'on'. The bitmap could contain/provide/include L' bit positions/entries set to '1' (or '0'). Alternatively, the UE 116 could receive from the network 130, e.g., via higher layer RRC signaling/parameter (e.g., in the higher layer parameter NZP-CSI-RS-ResourceSet that configures the NZP CSI-RS resource set for FSBM) and/or MAC CE command and/or dynamic DCI based signaling, a set/list of L' CSI-RS resource indexes. Optionally, the UE 116 could receive from the network 130 a MAC CE activation command activating the L' CSI-RS resources from/out of the L CSI-RS resources for FSBM—each with the higher layer parameter repetition set to 'on'—configured within the CSI resource set.

For another example, the higher layer parameter NZP-CSI-RS-Resource that configures a NZP CSI-RS resource for channel measurement—with the higher layer parameter repetition set to 'on'—in the CSI resource set for FSBM (and/or a MAC CE command and/or a DCI) could configure/indicate/provide a set/list of one or more (e.g. $N_{rep} \geq 1$) subband indexes, wherein each subband index could point/correspond to a FSBM measurement/reporting subband among all the configured $N_{mr}$ FSBM measurement/reporting subbands. The (e.g., $N_{rep}$) FSBM measurement/reporting subbands that correspond to the set/list of (e.g., $N_{rep}$) subband indexes could be referred to as FSBM measurement/reporting subbands for repetition for the NZP CSI-RS resource with the higher layer parameter repetition set to 'on'. Alternatively, the higher layer parameter NZP-CSI-RS-Resource that configures a NZP CSI-RS resource for channel measurement—with the higher layer parameter repetition set to 'on'—in the CSI resource set for FSBM (and/or a MAC CE command and/or a DCI) could configure/indicate/provide a bitmap of length $N_{mr}$ with each bit position/entry in the bitmap corresponding to a FSBM measurement/reporting subband among all the configured $N_{mr}$ FSBM measurement/reporting subbands. If a bit position/entry in the bitmap is set to '1' (or '0'), the FSBM measurement/reporting subband corresponding/associated with the bit position/entry is used/determined as a FSBM measurement/reporting subband for repetition for the NZP CSI-RS resource with the higher layer parameter repetition set to 'on'. The bitmap could contain/include/provide one or more (e.g., $N_{rep}$) bit positions/entries set to '1' (or '0') indicating a total of $N_{rep}$ FSBM measurement/reporting subbands for repetition for the NZP CSI-RS resource with the higher layer parameter repetition set to 'on'. Optionally, the $N_{rep}$ FSBM measurement/reporting subbands for repetition could correspond to all the configured $N_{mr}$ FSBM measurement/reporting subbands (i.e., $N_{rep}=N_{mr}$). For this case, the UE 116 may not need to be indicated/configured/provided by the network 130 with the exact FSBM measurement/reporting subbands for repetition. If the UE 116 is not indicated/configured/provided by the network 130 with the exact FSBM measurement/reporting subbands for repetition, the UE 116 could assume that the $N_{rep}$ FSBM measurement/reporting subbands for repetition correspond to all the configured $N_{mr}$ FSBM measurement/reporting subbands (i.e., $N_{rep}=N_{mr}$), or the UE 116 could be indicated/configured/provided by the network 130, e.g., via higher layer RRC signaling and/or MAC CE command and/or dynamic DCI based L1 signaling, that the $N_{rep}$ FSBM measurement/reporting subbands for repetition correspond to all the configured $N_{mr}$ FSBM measurement/reporting subbands (i.e., $N_{rep}=N_{mr}$). The UE 116 could assume that one or more of the L CSI-RS resources—each with the higher layer parameter repetition set to 'on'—within the CSI resource set (provided by, e.g., NZP-CSI-RS-ResourceSet), on the same FSBM frequency measurement/reporting subband(s) for repetition (i.e., with the same subband index(es) among all the configured $N_{mr}$ FSBM measurement/reporting subbands or among all the $N_{rep}$ FSBM measurement/reporting subbands for repetition), are transmitted with the same downlink spatial domain transmission filter(s).

In one example, the UE 116 cold assume that all of the L CSI-RS resources—each with the higher layer parameter repetition set to 'on'—within the CSI resource set (provided by, e.g., NZP-CSI-RS-ResourceSet), on the same FSBM frequency measurement/reporting subband(s) for repetition (i.e., with the same subband index(es) among all the configured $N_{mr}$ FSBM measurement/reporting subbands or among all the $N_{rep}$ FSBM measurement/reporting subbands for repetition), are transmitted with the same downlink spatial domain transmission filter(s).

In another example, the UE 116 could assume that L' out of the L CSI-RS resources—each with the higher layer parameter repetition set to 'on'—within the CSI resource set (provided by, e.g., NZP-CSI-RS-ResourceSet), on the same FSBM frequency measurement/reporting subband(s) for repetition (i.e., with the same subband index(es) among all the configured $N_{mr}$ FSBM measurement/reporting subbands or among all the $N_{rep}$ FSBM measurement/reporting subbands for repetition), are transmitted with the same downlink spatial domain transmission filter(s). The UE 116 could receive from the network 130, e.g., via higher layer RRC signaling/parameter (e.g., in the higher layer parameter NZP-CSI-RS-ResourceSet that configures the NZP CSI-RS resource set for FSBM) and/or MAC CE command and/or dynamic DCI based signaling, a bitmap of length L with each bit position/entry of the bitmap corresponding to a CSI-RS resource within the set. If a bit position/entry of the bitmap is set to '1' (or '0'), the CSI-RS resource corresponding/associated with the bit position/entry is determined as one CSI-RS resource out of the L' CSI-RS resources, each with the higher layer parameter repetition set to 'on'. The bitmap could contain/provide/include L' bit positions/entries set to '1' (or '0'). Alternatively, the UE 116 could receive from the network 130, e.g., via higher layer RRC signaling/parameter (e.g., in the higher layer parameter NZP-CSI-RS-ResourceSet that configures the NZP CSI-RS resource set for FSBM) and/or MAC CE command and/or dynamic DCI based signaling, a set/list of L' CSI-RS resource indexes. Optionally, the UE 116 could receive from the network 130 a MAC CE activation command activating the L' CSI-RS resources from/out of the L CSI-RS resources for FSBM—each with the higher layer parameter repetition set to 'on'—configured within the CSI resource set.

For yet another example, the higher layer parameter NZP-CSI-RS-ResourceSet that configures the CSI resource set for FSBM (and/or a MAC CE command and/or a DCI) could configure/indicate/provide one or more (e.g., L) sets/lists of subband indexes with each set comprising one or more (e.g. $N_{rep,l} \geq 1$) subband indexes for the l-th CSI-RS resource for FSBM among all the L CSI-RS resources with the higher layer parameter repetition set to 'on' within the resource set (e.g., l=1, . . . , L), wherein each subband index could point/correspond to a FSBM measurement/reporting subband among all the configured $N_{mr}$ FSBM measurement/reporting subbands. The (e.g., $N_{rep,l}$) FSBM measurement/reporting subbands that correspond to the (e.g., l-th) set/list of (e.g., $N_{rep,l}$) subband indexes could be referred to as FSBM measurement/reporting subbands for repetition for the l-th CSI-RS resource among all the L CSI-RS resources with the higher layer parameter repetition set to 'on' within the set provided by, e.g., NZP-CSI-RS-ResourceSet. Alternatively, the higher layer parameter NZP-CSI-RS-ResourceSet that configures the CSI resource set for FSBM (and/or a MAC CE command and/or a DCI) could configure/indicate/provide one or more (e.g., L) bitmaps. Each bitmap could have a length $N_{mr}$ with each bit position/entry in the bitmap corresponding to a FSBM measurement/reporting subband among all the configured $N_{mr}$ FSBM measurement/reporting subbands. Furthermore, each bitmap could be associated with a CSI-RS resource for FSBM among the L CSI-RS resources each with the higher layer parameter repetition set to 'on' within the CSI resource set provided by, e.g., NZP-CSI-RS-ResourceSet. If a bit position/entry in a (e.g., the l-th) bitmap is set to '1' (or '0'), the FSBM measurement/reporting subband corresponding/associated to the bit position/entry is used/determined as a FSBM measurement/reporting subband for repetition for a (e.g., the l-th) CSI-RS resource for channel measurement among all the L CSI-RS resources with the higher layer parameter repetition set to 'on' in the resource set for FSBM, where l=1, . . . , L. The l-th bitmap could contain/include/provide one or more (e.g., $N_{rep,l}$) bit positions/entries set to '1' (or '0') indicating a total of $N_{rep,l}$ FSBM measurement/reporting subbands for repetition for the l-th CSI-RS resource for FSBM among all the L CSI-RS resources each with the higher layer parameter repetition set to 'on'. Optionally, the $N_{rep,l}$ FSBM measurement/reporting subbands for repetition for the l-th CSI-RS resource for FSBM—among all the L CSI-RS resources with the higher layer parameter repetition set to 'on'—could correspond to all the configured $N_{mr}$ FSBM measurement/ reporting subbands (i.e., $N_{rep,l} = N_{mr}$), where $l \in \{1, . . . , L\}$ or l=1, . . . , L. For this case, the UE 116 may not need to be indicated/configured/provided by the network 130 with the exact FSBM measurement/reporting subbands for repetition for the l-th CSI-RS resource for FSBM—among all the L CSI-RS resources with the higher layer parameter repetition set to 'on'—within the resource set. If the UE 116 is not indicated/configured/provided by the network 130 the exact FSBM measurement/reporting subbands for repetition for the l-th CSI-RS resource for FSBM—among all the L CSI-RS resources with the higher layer parameter repetition set to 'on'—within the CSI resource set provided by, e.g., NZP-CSI-RS-ResourceSet, the UE 116 could assume that the $N_{rep,l}$ FSBM measurement/reporting subbands for repetition for the l-th CSI-RS resource corresponds to all the configured $N_{mr}$ FSBM measurement/reporting subbands (i.e., $N_{rep,l} = N_{mr}$), or the UE 116 could be indicated/configured/provided by the network 130, e.g., via higher layer RRC signaling and/or MAC CE command and/or dynamic DCI based L1 signaling, that the $N_{rep,l}$ FSBM measurement/reporting subbands for repetition for the l-th CSI-RS resource among all the L CSI-RS resources with the higher layer parameter repetition set to 'on' in the set corresponds to all the configured $N_{mr}$ FSBM measurement/reporting subbands (i.e., $N_{rep,l} = N_{mr}$). The UE 116 could assume that one or more of the L CSI-RS resources—each with the higher layer parameter repetition set to 'on'—within the CSI resource set (provided by, e.g., NZP-CSI-RS-ResourceSet), on the same FSBM frequency measurement/reporting subband(s) for repetition for the corresponding CSI-RS resource(s) (i.e., with the same subband index(es) among all the configured $N_{mr}$ FSBM measurement/reporting subbands or among the corresponding $N_{rep,l}$ FSBM measurement/reporting subbands for repetition for the l-th CSI-RS resource for FSBM among all the L CSI-RS resources each with the higher layer parameter repetition set to 'on' within the resource set with $l \in \{1, . . . , L\}$), are transmitted with the same downlink spatial domain transmission filter(s).

In one example, the UE 116 cold assume that all of the L CSI-RS resources—each with the higher layer parameter repetition set to 'on'—within the CSI resource set (provided by, e.g., NZP-CSI-RS-ResourceSet), on the same FSBM frequency measurement/reporting subband(s) for repetition for the corresponding CSI-RS resources (i.e., with the same subband index(es) among all the configured $N_{mr}$ FSBM measurement/reporting subbands or among the corresponding $N_{rep,l}$ FSBM measurement/reporting subbands for repetition for the l-th CSI-RS resource for FSBM among all the L CSI-RS resources each with the higher layer parameter repetition set to 'on' within the resource set with $l \in \{1, . . . , L\}$), are transmitted with the same downlink spatial domain transmission filter(s).

In another example, the UE 116 could assume that L' out of the L CSI-RS resources—each with the higher layer parameter repetition set to 'on'—within the CSI resource set (provided by, e.g., NZP-CSI-RS-ResourceSet), on the same FSBM frequency measurement/reporting subband(s) for repetition for the corresponding CSI-RS resources (i.e., with the same subband index(es) among all the configured $N_{mr}$ FSBM measurement/reporting subbands or among the corresponding $N_{rep,l'}$ FSBM measurement/reporting subbands for repetition for the l'-th CSI-RS resource for FSBM among all the L' CSI-RS resources—each with the higher layer parameter repetition set to 'on'—with $l' \in \{1, . . . , L'\}$), are transmitted with the same downlink spatial domain transmission filter(s). The UE 116 could receive from the network 130, e.g., via higher layer RRC signaling/parameter (e.g., in the higher layer parameter NZP-CSI-RS-ResourceSet that configures the NZP CSI-RS resource set for FSBM) and/or MAC CE command and/or dynamic DCI based signaling, a bitmap of length L with each bit position/entry of the bitmap corresponding to a CSI-RS resource within the set. If a bit position/entry of the bitmap is set to '1' (or '0'), the CSI-RS resource corresponding/associated with the bit position/entry is determined as one CSI-RS resource out of the L' CSI-RS resources. The bitmap could contain/provide/include L' bit positions/entries set to '1' (or '0'). Alternatively, the UE 116 could receive from the network 130, e.g., via higher layer RRC signaling/parameter (e.g., in the higher layer parameter NZP-CSI-RS-ResourceSet that configures the NZP CSI-RS resource set for FSBM) and/or MAC CE command and/or dynamic DCI based signaling, a set/list of L' CSI-RS resource indexes. Optionally, the UE 116 could receive from the network 130 a MAC CE activation command activating the L' CSI-RS resources from/out of the L CSI-RS resources for FSBM configured within the CSI resource set.

For yet another example, the higher layer parameter NZP-CSI-RS-Resource that configures a NZP CSI-RS resource for channel measurement—e.g., the l-th CSI-RS resource among the L CSI-RS resources each with the higher layer parameter repetition set to 'on'—in the CSI resource set for FSBM (and/or a MAC CE command and/or a DCI) could configure/indicate/provide a set/list of one or more (e.g. $N_{rep,l} \geq 1$) subband indexes, wherein each subband index could point/correspond to a FSBM measurement/reporting subband among all the configured $N_{mr}$ FSBM measurement/reporting subbands and l=1, . . . , L. The (e.g., $N_{rep,l}$) FSBM measurement/reporting subbands that correspond to the set/list of (e.g., $N_{rep,l}$) subband indexes could be referred to as FSBM measurement/reporting subbands for repetition for the l-th CSI-RS resource among all the L CSI-RS resources—each with the higher layer parameter repetition set to 'on'—within the CSI resource set provided by, e.g., NZP-CSI-RS-ResourceSet. Alternatively, the higher layer parameter NZP-CSI-RS-Resource configures a NZP CSI-RS resource for channel measurement—e.g., the l-th CSI-RS resource among all the L CSI-RS resources each with the higher layer parameter repetition set to 'on'—in the CSI resource set for FSBM (and/or a MAC CE command and/or a DCI) could configure/indicate/provide a bitmap of length $N_{mr}$ with each bit position/entry in the bitmap corresponding to a FSBM measurement/reporting subband among all the configured $N_{mr}$ FSBM measurement/reporting subbands, where l=1, . . . , L. If a bit position/entry in the bitmap is set to '1' (or '0'), the FSBM measurement/reporting subband corresponding/associated with the bit position/entry is used/determined as a FSBM measurement/reporting subband for repetition for the l-th CSI-RS resource—among all the L CSI-RS resources each with the higher layer parameter repetition set to 'on'—within the CSI resource set provided by, e.g., NZP-CSI-RS-ResourceSet. The bitmap could contain/include/provide one or more (e.g., $N_{rep,l}$) bit positions/entries set to '1' (or '0') indicating a total of $N_{rep,l}$ FSBM measurement/reporting subbands for repetition for the l-th CSI-RS resource—among all the L CSI-RS resources each with the higher layer parameter repetition set to 'on'—within the CSI resource set. Optionally, the $N_{rep,l}$ FSBM measurement/reporting subbands for repetition for the l-th CSI-RS resource for FSBM—among all the L CSI-RS resources with the higher layer parameter repetition set to 'on'—could correspond to all the configured $N_{mr}$ FSBM measurement/reporting subbands (i.e., $N_{rep,i}=N_{mr}$), where i∈{1, . . . , L} or l=1, . . . , L. For this case, the UE 116 may not need to be indicated/configured/provided by the network 130 with the exact FSBM measurement/reporting subbands for repetition for the l-th CSI-RS resource for FSBM—among all the L CSI-RS resources with the higher layer parameter repetition set to 'on'—within the resource set. If the UE 116 is not indicated/configured/provided by the network 130 the exact FSBM measurement/reporting subbands for repetition for the l-th CSI-RS resource for FSBM—among all the L CSI-RS resources with the higher layer parameter repetition set to 'on'—within the CSI resource set provided by, e.g., NZP-CSI-RS-ResourceSet, the UE 116 could assume that the $N_{rep,l}$ FSBM measurement/reporting subbands for repetition for the l-th CSI-RS resource corresponds to all the configured $N_{mr}$ FSBM measurement/reporting subbands (i.e., $N_{rep,i}=N_{mr}$), or the UE 116 could be indicated/configured/provided by the network 130, e.g., via higher layer RRC signaling and/or MAC CE command and/or dynamic DCI based L1 signaling, that the $N_{rep,l}$ FSBM measurement/reporting subbands for repetition for the l-th CSI-RS resource among all the L CSI-RS resources with the higher layer parameter repetition set to 'on' in the set corresponds to all the configured $N_{mr}$ FSBM measurement/reporting subbands (i.e., $N_{rep,l}=N_{mr}$). The UE 116 could assume that one or more of the L CSI-RS resources—each with the higher layer parameter repetition set to 'on'—within the CSI resource set (provided by, e.g., NZP-CSI-RS-ResourceSet), on the same FSBM frequency measurement/reporting subband(s) for repetition for the corresponding CSI-RS resource(s) (i.e., with the same subband index(es) among all the configured $N_{mr}$ FSBM measurement/reporting subbands or among the corresponding $N_{rep,l}$ FSBM measurement/reporting subbands for repetition for the l-th CSI-RS resource for FSBM among all the L CSI-RS resources each with the higher layer parameter repetition set to 'on' within the resource set with l∈{1, . . . , L}), are transmitted with the same downlink spatial domain transmission filter(s).

In one example, the UE 116 cold assume that all of the L CSI-RS resources—each with the higher layer parameter repetition set to 'on'—within the CSI resource set (provided by, e.g., NZP-CSI-RS-ResourceSet), on the same FSBM frequency measurement/reporting subband(s) for repetition for the corresponding CSI-RS resources (i.e., with the same subband index(es) among all the configured $N_{mr}$ FSBM measurement/reporting subbands or among the corresponding $N_{rep,l}$ FSBM measurement/reporting subbands for repetition for the l-th CSI-RS resource for FSBM among all the L CSI-RS resources each with the higher layer parameter repetition set to 'on' within the resource set with l∈{1, . . . , L}), are transmitted with the same downlink spatial domain transmission filter(s).

In another example, the UE 116 could assume that L' out of the L CSI-RS resources—each with the higher layer parameter repetition set to 'on'—within the CSI resource set (provided by, e.g., NZP-CSI-RS-ResourceSet), on the same FSBM frequency measurement/reporting subband(s) for repetition for the corresponding CSI-RS resources (i.e., with the same subband index(es) among all the configured $N_{mr}$ FSBM measurement/reporting subbands or among the corresponding $N_{rep,l}$' FSBM measurement/reporting subbands for repetition for the l'-th CSI-RS resource for FSBM among all the L' CSI-RS resources—each with the higher layer parameter repetition set to 'on'—with l'∈{1, . . . , L'}), are transmitted with the same downlink spatial domain transmission filter(s). The UE 116 could receive from the network 130, e.g., via higher layer RRC signaling/parameter (e.g., in the higher layer parameter NZP-CSI-RS-ResourceSet that configures the NZP CSI-RS resource set for FSBM) and/or MAC CE command and/or dynamic DCI based signaling, a bitmap of length L with each bit position/entry of the bitmap corresponding to a CSI-RS resource within the set. If a bit position/entry of the bitmap is set to '1' (or '0'), the CSI-RS resource corresponding/associated to the bit position/entry is determined as one CSI-RS resource out of the L' CSI-RS resources. The bitmap could contain/provide/include L' bit positions/entries set to '1' (or '0'). Alternatively, the UE 116 could receive from the network 130, e.g., via higher layer RRC signaling/parameter (e.g., in the higher layer parameter NZP-CSI-RS-ResourceSet that configures the NZP CSI-RS resource set for FSBM) and/or MAC CE command and/or dynamic DCI based signaling, a set/list of L' CSI-RS resource indexes. Optionally, the UE 116 could receive from the network 130 a MAC CE activation command activating the L' CSI-RS resources from/out of the L CSI-RS resources for FSBM configured within the CSI resource set.

Figure 12:
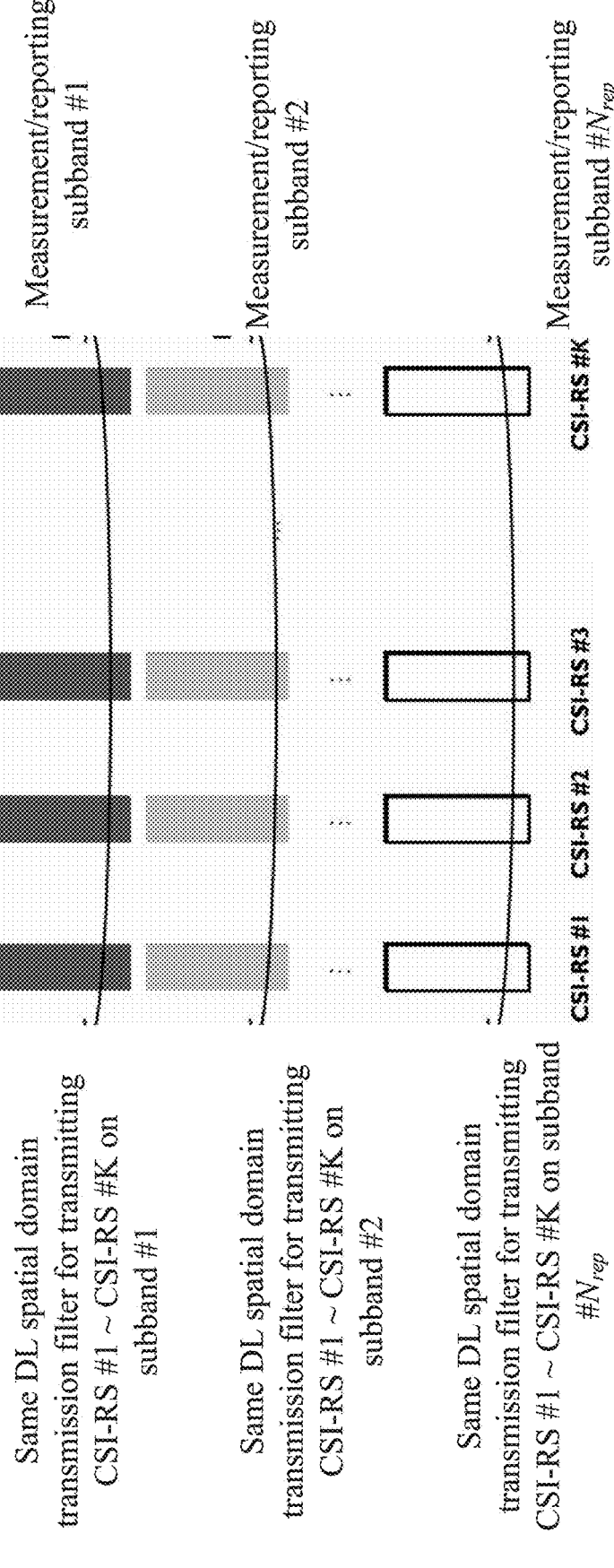
FIG. 12 illustrates an example of a configuration and reception of CSI-RS resources for FSBM according to embodiments of the present disclosure.

FIG. 12 illustrates an example of a configuration and reception of one or more CSI-RS resources for FSBM 1200 according to embodiments of the present disclosure. For example, the configuration and reception of one or more CSI-RS resources for FSBM 1200 may be configured by the gNB 101 and received by the UE 116 in FIG. 1. This example is for illustration only and other embodiments can be used without departing from the scope of the present disclosure.

In this embodiment, the UE 116 could assume that the CSI-RS resources #1—#K, on the r-th FSBM measurement/reporting subband for repetition, could be transmitted with the same DL spatial domain transmission filter(s), where $r \in \{1, \ldots, N_{rep}\}$. This example is for illustration only and other embodiments can be used without departing from the scope of the present disclosure.

In yet another example, when the FSBM or frequency selective/frequency subband specific/dependent beam management is enabled (according to one or more examples described herein) and/or if a UE is configured with a NZP-CSI-RS-ResourceSet configured with the higher layer parameter repetition set to 'on', the UE 116 could assume that one or more CSI-RS resources (e.g., each provided by NZP-CSI-RS-Resource) within the CSI resource set, on one or more FSBM frequency measurement/reporting subbands for repetition, are transmitted with the same downlink spatial domain transmission filter(s).

For example, the UE 116 could assume that one or more of the KCSI-RS resources within the CSI resource set (provided by, e.g., NZP-CSI-RS-ResourceSet), on the $N_{rep}$ FSBM frequency measurement/reporting subband(s) for repetition, are transmitted with the same downlink spatial domain transmission filter(s), and each of the one or more of the K CSI-RS resources within the CSI resource set (provided by, e.g., NZP-CSI-RS-ResourceSet), on the $N_{rep}$ FSBM frequency measurement/reporting subband(s) for repetition, are transmitted with the same downlink spatial domain transmission filter(s). The configuration/indication of the one or more of the K CSI-RS resources and/or the $N_{rep}$ FSBM frequency measurement/reporting subband(s) for repetition could follow one or more examples described herein.

For another example, the UE 116 could assume that one or more of the KCSI-RS resources within the CSI resource set (provided by, e.g., NZP-CSI-RS-ResourceSet) could be transmitted with the same or different downlink spatial domain transmission filters. More specifically, for this design example, the UE 116 may not assume that different CSI-RS resources within the CSI resource set (provided by, e.g., NZP-CSI-RS-ResourceSet) are transmitted with the same downlink spatial domain transmission filter(s), but each of the one or more of the K CSI-RS resources within the CSI resource set (provided by, e.g., NZP-CSI-RS-ResourceSet), on the $N_{rep}$ FSBM frequency measurement/reporting subband(s) for repetition, are transmitted with the same downlink spatial domain transmission filter(s). The configuration/indication of the one or more of the K CSI-RS resources and/or the $N_{rep}$ FSBM frequency measurement/reporting subband(s) for repetition could follow one or more examples described herein.

For yet another example, the UE 116 could assume that one or more of the KCSI-RS resources within the CSI resource set (provided by, e.g., NZP-CSI-RS-ResourceSet)—e.g., the 1-st CSI-RS resource, the 2-nd CSI-RS resource, and so on, and the K-th CSI-RS resource, respectively on the $N_{rep,1}$ FSBM frequency measurement/reporting subband(s) for repetition for the 1-st CSI-RS resource, the $N_{rep,2}$ FSBM measurement/reporting subband(s) for repetition for the 2-nd CSI-RS resource, and so on, and the $N_{rep,K}$ FSBM frequency measurement/reporting subband(s) for repetition for the K-th CSI-RS resource, are transmitted with the same downlink spatial domain transmission filter(s). Furthermore, each of the one or more of the K CSI-RS resources within the CSI resource set (provided by, e.g., NZP-CSI-RS-ResourceSet)—e.g., the k-th CSI-RS resource with $k \in \{1, \ldots, K\}$, on the corresponding $N_{rep,k}$ FSBM frequency measurement/reporting subband(s) for repetition, is transmitted with the same downlink spatial domain transmission filter(s). The configuration/indication of the one or more of the K CSI-RS resources and/or the $N_{rep,k}$ FSBM frequency measurement/reporting subband(s) for repetition for the k-th CSI-RS resource could follow one or more examples described herein.

For yet another example, the UE 116 could assume that one or more of the KCSI-RS resources within the CSI resource set (provided by, e.g., NZP-CSI-RS-ResourceSet) could be transmitted with the same or different downlink spatial domain transmission filters. More specifically, for this design example, the UE 116 may not assume that different CSI-RS resources within the CSI resource set (provided by, e.g., NZP-CSI-RS-ResourceSet) are transmitted with the same downlink spatial domain transmission filter(s); however, each of the one or more of the K CSI-RS resources within the CSI resource set (provided by, e.g., NZP-CSI-RS-ResourceSet)—e.g., the k-th CSI-RS resource with $k \in \{1, \ldots, K\}$, on the corresponding $N_{rep,k}$ FSBM frequency measurement/reporting subband(s) for repetition, is transmitted with the same downlink spatial domain transmission filter(s). The configuration/indication of the one or more of the K CSI-RS resources and/or the $N_{rep,k}$ FSBM frequency measurement/reporting subband(s) for repetition for the k-th CSI-RS resource could follow one or more examples described herein.

In yet another example, when the FSBM or frequency selective/frequency subband specific/dependent beam management is enabled (according to one or more examples described herein) and/or if a UE is configured with one or more (e.g., $L \geq 1$) CSI-RS resources, e.g., each provided by NZP-CSI-RS-Resource configured with the higher layer parameter repetition set to 'on', the UE 116 could assume that one or more of the L CSI-RS resources—each with the higher layer parameter repetition set to 'on'—within the CSI resource set (provided by, e.g., NZP-CSI-RS-ResourceSet), on one or more FSBM frequency measurement/reporting subbands for repetition, are transmitted with the same downlink spatial domain transmission filter(s).

For example, the UE 116 could assume that one or more of the L CSI-RS resources each with the higher layer parameter repetition set to 'on' within the CSI resource set (provided by, e.g., NZP-CSI-RS-ResourceSet), on the $N_{rep}$ FSBM frequency measurement/reporting subband(s) for repetition, are transmitted with the same downlink spatial domain transmission filter(s), and each of the one or more of the L CSI-RS resources each with the higher layer parameter repetition set to 'on' within the CSI resource set (provided by, e.g., NZP-CSI-RS-ResourceSet), on the $N_{rep}$ FSBM frequency measurement/reporting subband(s) for repetition, are transmitted with the same downlink spatial domain transmission filter(s). The configuration/indication of the one or more of the L CSI-RS resources and/or the $N_{rep}$ FSBM frequency measurement/reporting subband(s) for repetition could follow one or more examples described herein.

For another example, the UE 116 could assume that one or more of the L CSI-RS resources each with the higher layer parameter repetition set to 'on' within the CSI resource set (provided by, e.g., NZP-CSI-RS-ResourceSet) could be transmitted with the same or different downlink spatial domain transmission filters. More specifically, for this design example, the UE 116 may not assume that different CSI-RS resources within the CSI resource set (provided by, e.g., NZP-CSI-RS-ResourceSet) are transmitted with the same downlink spatial domain transmission filter(s), but each of the one or more of the L CSI-RS resources each with the higher layer parameter repetition set to 'on' within the CSI resource set (provided by, e.g., NZP-CSI-RS-Resource-Set), on the $N_{rep}$ FSBM frequency measurement/reporting subband(s) for repetition, are transmitted with the same downlink spatial domain transmission filter(s). The configuration/indication of the one or more of the K CSI-RS resources and/or the $N_{rep}$ FSBM frequency measurement/reporting subband(s) for repetition could follow one or more examples described herein.

For yet another example, the UE 116 could assume that one or more of the L CSI-RS resources each with the higher layer parameter repetition set to 'on' within the CSI resource set (provided by, e.g., NZP-CSI-RS-ResourceSet)—e.g., the 1-st CSI-RS resource among the L CSI-RS resources, the 2-nd CSI-RS resource among the L CSI-RS resources, and so on, and the L-th CSI-RS resource among the L CSI-RS resources, respectively on the $N_{rep,l}$ FSBM frequency measurement/reporting subband(s) for repetition for the 1-st CSI-RS resource among the L CSI-RS resources, the $N_{rep,2}$ FSBM measurement/reporting subband(s) for repetition for the 2-nd CSI-RS resource among the L CSI-RS resources, and so on, and the $N_{rep,l}$ FSBM frequency measurement/reporting subband(s) for repetition for the L-th CSI-RS resource among the L CSI-RS resources, are transmitted with the same downlink spatial domain transmission filter(s). Furthermore, each of the one or more of the L CSI-RS resources each with the higher layer parameter repetition set to 'on' within the CSI resource set (provided by, e.g., NZP-CSI-RS-ResourceSet)—e.g., the 1-th CSI-RS resource with l∈{1, . . . , L}, on the corresponding $N_{rep,l}$ FSBM frequency measurement/reporting subband(s) for repetition, is transmitted with the same downlink spatial domain transmission filter(s). The configuration/indication of the one or more of the L CSI-RS resources and/or the $N_{rep,l}$ FSBM frequency measurement/reporting subband(s) for repetition for the 1-th CSI-RS resource could follow one or more examples described herein.

For yet another example, the UE 116 could assume that one or more of the L CSI-RS resources each with the higher layer parameter repetition set to 'on' within the CSI resource set (provided by, e.g., NZP-CSI-RS-ResourceSet) could be transmitted with the same or different downlink spatial domain transmission filters. More specifically, for this design example, the UE 116 may not assume that different CSI-RS resources within the CSI resource set (provided by, e.g., NZP-CSI-RS-ResourceSet) are transmitted with the same downlink spatial domain transmission filter(s); however, each of the one or more of the L CSI-RS resources each with the higher layer parameter repetition set to 'on' within the CSI resource set (provided by, e.g., NZP-CSI-RS-Re-sourceSet)—e.g., the 1-th CSI-RS resource among the L CSI-RS resources with l∈{1, . . . , L}, on the corresponding $N_{rep,l}$ FSBM frequency measurement/reporting subband(s) for repetition, is transmitted with the same downlink spatial domain transmission filter(s). The configuration/indication of the one or more of the L CSI-RS resources and/or the $N_{rep,l}$ FSBM frequency measurement/reporting subband(s) for repetition for the 1-th CSI-RS resource could follow one or more examples described herein.

Figure 13:
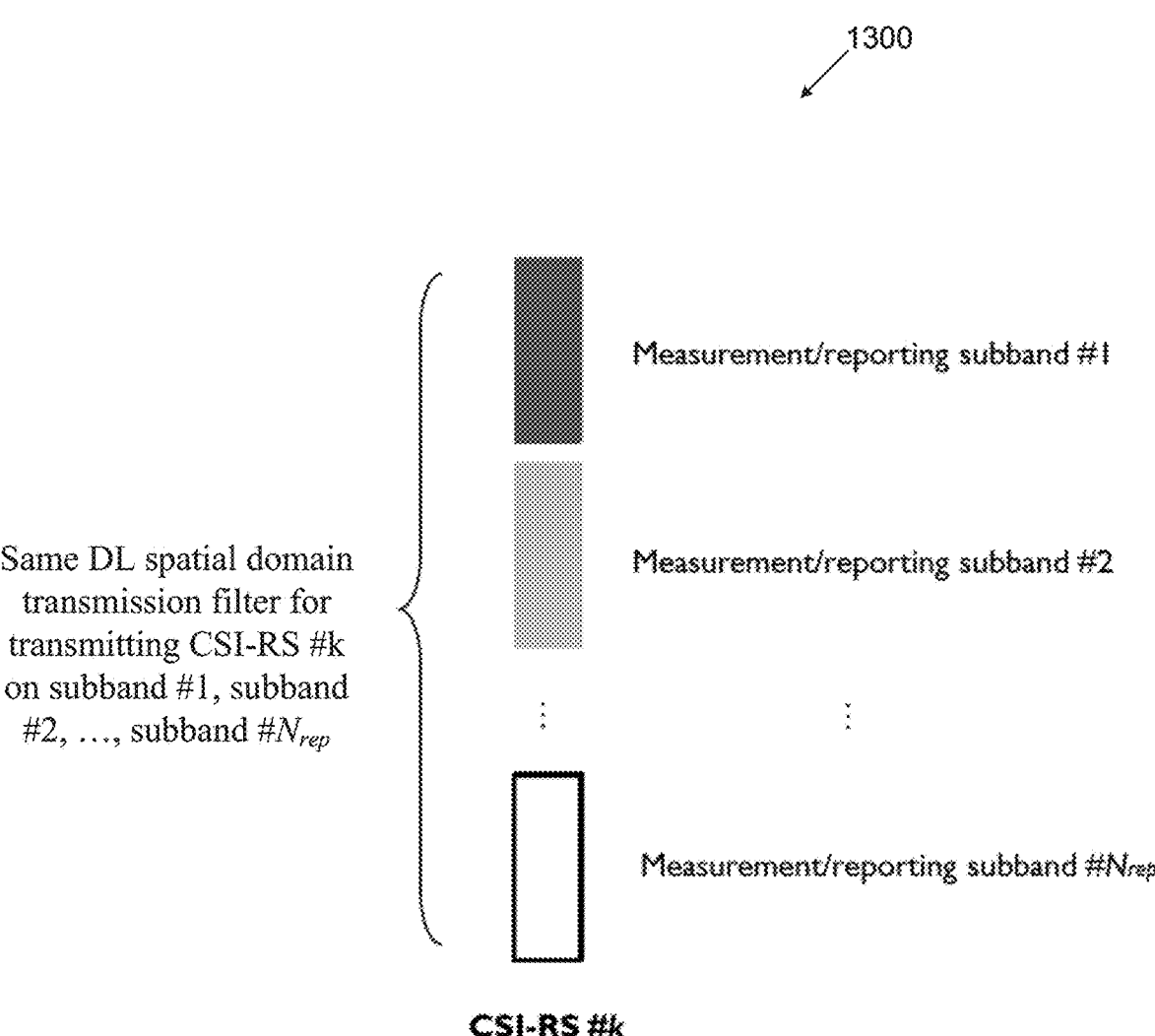
FIG. 13 illustrates an example of a configuration and reception of CSI-RS resources for FSBM.

FIG. 13 illustrates an example of a configuration and reception of CSI-RS resources for FSBM 1300 according to embodiments of the present disclosure. For example, the configuration and reception of CSI-RS resources for FSBM 1300 may be configured by the gNB 101 and received by the UE 116 in FIG. 1. This example is for illustration only and other embodiments can be used without departing from the scope of the present disclosure.

In one embodiment, the UE 116 could assume that the CSI-RS resource #k (k∈{1, . . . , K}), on the FSBM measurement/reporting subbands for repetition #1, #2, . . . , #$N_{rep}$, could be transmitted with the same DL spatial domain transmission filter(s). This example is for illustration only and other embodiments can be used without departing from the scope of the present disclosure.

When the FSBM or frequency selective/frequency sub-band specific/dependent beam management is enabled (according to one or more examples described herein) and/or if a UE is configured with a NZP-CSI-RS-ResourceSet configured with the higher layer parameter repetition set to 'on' and/or if the UE 116 is configured with one or more (e.g., L≥1) CSI-RS resources, e.g., each provided by NZP-CSI-RS-Resource configured with the higher layer parameter repetition set to 'on', the UE 116 could report, e.g., in a CSI report/CSI reporting instance, one or more subband indexes—e.g., determined from all the $N_{mr}$ FSBM measurement/reporting subbands and/or the FSBM measurement/reporting subband(s) for repetition, on which the UE 116 could derive/obtain the largest/highest received signal qualities such as L1-RSRPs with receive beam sweeping. The UE 116 could also report, e.g., in the same CSI report/CSI reporting instance, one or more resource indicators such as SSBRIs/CRIs associated/corresponding to the reported one or more subband indexes.

The UE 116 could be indicated/configured/provided by the network 130, e.g., in a MAC CE or DCI (e.g., DCI format 1_1 or 1_2 with or without DL assignment), one or more TCI states/TCI state IDs providing QCL source RSs or QCL assumptions for receiving one or more CSI-RS resources for channel measurement each configured with one or more FSBM measurement/reporting subbands (for repetition). The configuration/indication of the TCI states/TCI state IDs could follow those specified/discussed above in the present disclosure.

In one example, the higher layer parameter NZP-CSI-RS-Resource that configures a NZP CSI-RS resource for FSBM could provide/configure/indicate one or more (e.g., $N_{meas}$ or $N_{rep}$) TCI states/TCI state IDs each for a FSBM measurement/reporting subband or a FSBM measurement/reporting subband for repetition configured for/associated to the corresponding NZP CSI-RS resource. For example, the first indicated TCI state/TCI state ID could be for the first FSBM measurement/reporting subband or the first FSBM measurement/reporting subband for repetition, the second indicated TCI state/TCI state ID could be for the second FSBM measurement/reporting subband or the second FSBM measurement/reporting subband for repetition, and so on, and the $N_{meas}$-th (or $N_{rep}$-th) TCI state/TCI state ID could be for the $N_{meas}$-th FSBM measurement/reporting subband or the $N_{rep}$-th FSBM measurement/reporting subband for repetition. For another example, the UE 116 could be indicated/configured/provided by the network 130, e.g., via higher layer RRC signaling and/or MAC CE command and/or dynamic DCI based L1 signaling, the association/mapping between the one or more TCI states/TCI state IDs provided in the NZP-CSI-RS-Resource and the FSBM measurement/reporting subbands (for repetition) configured for the NZP CSI-RS resource. The UE 116 could assume the same (spatial domain) receive filter for receiving the CSI-RS resource on a FSBM measurement/reporting subband (for repetition) as that for receiving the quasi co-location (QCL) source RS indicated in the TCI state associated/corresponding to the FSBM measurement/reporting subband (for repetition).

In another example, the higher layer parameter NZP-CSI-RS-Resource that configures a NZP CSI-RS resource for FSBM could provide/configure/indicate a TCI state/TCI state ID comprising/configuring/providing/indicating one or more (e.g., $N_{meas}$ or $N_{rep}$) QCL source RSs (with the same or different QCL types—e.g., QCL-TypeD) each for a FSBM measurement/reporting subband or a FSBM measurement/reporting subband for repetition configured for/associated to the corresponding NZP CSI-RS resource. For example, the first indicated QCL source RS in the TCI state could be for the first FSBM measurement/reporting subband or the first FSBM measurement/reporting subband for repetition, the second indicated QCL source RS in the TCI state could be for the second FSBM measurement/reporting subband or the second FSBM measurement/reporting subband for repetition, and so on, and the $N_{meas}$-th (or $N_{rep}$-th) QCL source RS indicated in the TCI state could be for the $N_{meas}$-th FSBM measurement/reporting subband or the $N_{rep}$-th FSBM measurement/reporting subband for repetition. For another example, the UE 116 could be indicated/configured/provided by the network 130, e.g., via higher layer RRC signaling and/or MAC CE command and/or dynamic DCI based L1 signaling, the association/mapping between the one or more QCL source RSs in the TCI state provided in the NZP-CSI-RS-Resource and the FSBM measurement/reporting subbands (for repetition) configured for the NZP CSI-RS resource. The UE 116 could assume the same (spatial domain) receive filter for receiving the CSI-RS resource on a FSBM measurement/reporting subband (for repetition) as that for receiving the QCL source RS (indicated in the TCI state) associated/corresponding to the FSBM measurement/reporting subband (for repetition).

In yet another example, the higher layer parameter NZP-CSI-RS-Resource that configures a NZP CSI-RS resource for FSBM could provide/configure/indicate a TCI state/TCI state ID comprising/configuring/providing/indicating at least one QCL source RS for all the FSBM measurement/reporting subbands or FSBM measurement/reporting subbands for repetition configured for/associated to the corresponding NZP CSI-RS resource. For this case, the UE 116 could assume the same (spatial domain) receive filter for receiving the CSI-RS resource on each of the configured FSBM measurement/reporting subbands (for repetition) as that for receiving the QCL source RS indicated in the TCI state.

FIG. 14 illustrates an example method 1400 performed by a UE in a wireless communication system according to embodiments of the present disclosure. The method 1400 of FIG. 14 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 1400 is for illustration only and other embodiments can be used without departing from the scope of the present disclosure.

The method begins with the UE receiving first information indicating one or more CSI-RS resources for FSBM (1410). For example, in 1410, the first information may include at least one of a higher layer parameter FreqSelectiveBeamMeasurement, a bitmap associated with a CSI resource set that indicates a CSI-RS resource from the one or more CSI-RS resources, and indexes of the one or more CSI-RS resources in the CSI resource set.

The UE then receives second information indicating a correspondence between the one or more CSI-RS resources and a plurality of frequency subbands (1420). For example, in 1420, the second information is indicated via a higher layer parameter that configures a CSI-RS resource among the one or more CSI-RS resources and the second information indicates $N_k \geq 1$ frequency subbands out of the plurality of frequency subbands.

The UE then determines, based on the first information, the one or more CSI-RS resources for FSBM (1430). For example, in 1430, when a value of the bitmap is set to '1', the corresponding CSI-RS resource in the CSI resource set belongs to the one or more CSI-RS resources for FSBM and, when a value of the bitmap is set to '0', the corresponding CSI-RS resource in the CSI resource set does not belong to the one or more CSI-RS resources for FSBM.

The UE then identifies, based on the second information, the correspondence between the one or more CSI-RS resources and the plurality of frequency subbands (1440). For example, in 1440, the CSI-RS resource comprises $N_k \geq 1$ groups of CSI-RS ports, wherein each group comprises one or more CSI-RS ports; and each of the $N_k$ groups of CSI-RS ports corresponds to one or more of the $N_k$ frequency subbands according to a fixed rule in system specifications or a network configuration or indication received via RRC signaling, a MAC-CE, or DCI. In another example, the second information is associated with a CSI resource set that includes the one or more CSI-RS resources, the one or more CSI-RS resources are $N_k \geq 1$ CSI-RS resources, the second information indicates $N_k \geq 1$ frequency subbands out of the plurality of frequency subbands, and the $N_k$ CSI-RS resources respectively correspond to the $N_k$ frequency subbands according to a fixed rule in system specifications or a network configuration or indication received via RRC signaling, a MAC-CE, or DCI.

In one or more embodiments, the UE may also receive third information corresponding to the plurality of frequency subbands, measure, based on the third information and the correspondence, the one or more CSI-RS resources, and determine, based on the measurement, a beam report for FSBM, wherein the beam report comprises a resource indicator and a beam metric associated with the resource indicator. For example, the third information includes at least one of a number of frequency subbands, indexes or IDs corresponding to the number frequency subbands, a number of RBs associated with each of the number of frequency subbands, and time or frequency domain resource allocations of each of the number of frequency subbands.

Any of the above various embodiments can be utilized independently or in combination with at least one other variation embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A user equipment (UE), comprising:
a transceiver configured to:
    receive first information indicating one or more channel state information (CSI) reference signal (RS) resources for frequency selective beam measurement (FSBM), and
    receive second information indicating a correspondence between the one or more CSI-RS resources and a plurality of frequency subbands; and
a processor operably coupled to the transceiver, the processor configured to:
    determine, based on the first information, the one or more CSI-RS resources for FSBM, and
    identify, based on the second information, the correspondence between the one or more CSI-RS resources and the plurality of frequency subbands,
wherein the transceiver is further configured to receive third information corresponding to the plurality of frequency subbands, and
wherein the processor is further configured to:
    measure, based on the third information and the correspondence, the one or more CSI-RS resources corresponding to the plurality of frequency subbands, and
    determine, based on the measurement, a beam report for FSBM, wherein the beam report comprises a resource indicator and a beam metric associated with the resource indicator.

2. The UE of claim 1, wherein the third information includes at least one of:
a number of frequency subbands;
indexes or identities (IDs) corresponding to the number of frequency subbands;
a number of resource blocks (RBs) associated with each of the number of frequency subbands; and
time or frequency domain resource allocations of each of the number of frequency subbands.

3. The UE of claim 1, wherein the first information includes at least one of:
a higher layer parameter FreqSelectiveBeamMeasurement;
a bitmap associated with a CSI resource set that indicates a CSI-RS resource from the one or more CSI-RS resources; and
indexes of the one or more CSI-RS resources in the CSI resource set.

4. The UE of claim 3, wherein:
when a value of the bitmap is set to '1', the corresponding CSI-RS resource in the CSI resource set belongs to the one or more CSI-RS resources for FSBM; and
when a value of the bitmap is set to '0', the corresponding CSI-RS resource in the CSI resource set does not belong to the one or more CSI-RS resources for FSBM.

5. The UE of claim 1, wherein:
the second information is indicated via a higher layer parameter that configures a CSI-RS resource among the one or more CSI-RS resources; and
the second information indicates $N_k \geq 1$ frequency subbands out of the plurality of frequency subbands.

6. The UE of claim 5, wherein:
the CSI-RS resource comprises $N_k \geq 1$ groups of CSI-RS ports, wherein each group comprises one or more CSI-RS ports; and
each of the $N_k$ groups of CSI-RS ports corresponds to one or more of the $N_k$ frequency subbands according to:
    a fixed rule in system specifications; or
    a network configuration or indication received via radio resource control (RRC) signaling, a medium access control (MAC) control element (CE), or downlink control information (DCI).

7. The UE of claim 1, wherein:
the second information is associated with a CSI resource set that includes the one or more CSI-RS resources;
the one or more CSI-RS resources are $N_k \geq 1$ CSI-RS resources;
the second information indicates $N_k \geq 1$ frequency subbands out of the plurality of frequency subbands; and
the $N_k$ CSI-RS resources respectively correspond to the $N_k$ frequency subbands according to:
    a fixed rule in system specifications; or
    a network configuration or indication received via radio resource control (RRC) signaling, a medium access control (MAC) control element (CE), or downlink control information (DCI).

8. A base station (BS) comprising:
a processor configured to:
    identify first information indicating one or more channel state information (CSI) reference signal (RS) resources for frequency selective beam measurement (FSBM), and
    identify second information indicating a correspondence between the one or more CSI-RS resources and a plurality of frequency subbands; and
a transceiver operably coupled to the processor, the transceiver configured to:
    transmit the first information to indicate the one or more CSI-RS resources for FSBM, and
    transmit the second information to indicate the correspondence between the one or more CSI-RS resources and the plurality of frequency subbands,
wherein the transceiver is further configured to:
    transmit third information corresponding to the plurality of frequency subbands; and receive a beam report for FSBM that is based on a measurement of the one or more CSI-RS resources corresponding to the plurality of frequency subbands, wherein the measurement is based on the third information and the correspondence, and wherein the beam report comprises a resource indicator and a beam metric associated with the resource indicator.

9. The BS of claim 8, wherein the third information includes at least one of:

a number of frequency subbands;

indexes or identities (IDs) corresponding to the number of frequency subbands;

a number of resource blocks (RBs) associated with each of the number of frequency subbands; and time or frequency domain resource allocations of each of the number of frequency subbands.

10. The BS of claim 8, wherein the first information includes at least one of:

a higher layer parameter FreqSelectiveBeamMeasurement;

a bitmap associated with a CSI resource set that indicates a CSI-RS resource from the one or more CSI-RS resources; and indexes of the one or more CSI-RS resources in the CSI resource set.

11. The BS of claim 10, wherein:

when a value of the bitmap is set to '1', the corresponding CSI-RS resource in the CSI resource set belongs to the one or more CSI-RS resources for FSBM; and when a value of the bitmap is set to '0', the corresponding CSI-RS resource in the CSI resource set does not belong to the one or more CSI-RS resources for FSBM.

12. The BS of claim 8, wherein:

the second information is indicated via a higher layer parameter that configures a CSI-RS resource among the one or more CSI-RS resources; and the second information indicates $N_k \geq 1$ frequency subbands out of the plurality of frequency subbands.

13. The BS of claim 12, wherein:

the CSI-RS resource comprises $N_k \geq 1$ groups of CSI-RS ports, wherein each group comprises one or more CSI-RS ports; and each of the $N_k$ groups of CSI-RS ports corresponds to one or more of the $N_k$ frequency subbands according to:

a fixed rule in system specifications; or a network configuration or indication received via radio resource control (RRC) signaling, a medium access control (MAC) control element (CE), or downlink control information (DCI).

14. The BS of claim 8, wherein:

the second information is associated with a CSI resource set that includes the one or more CSI-RS resources;

the one or more CSI-RS resources are $N_k \geq 1$ CSI-RS resources;

the second information indicates $N_k \geq 1$ frequency subbands out of the plurality of frequency subbands; and the $N_k$ CSI-RS resources respectively correspond to the $N_k$ frequency subbands according to:

a fixed rule in system specifications; or a network configuration or indication received via radio resource control (RRC) signaling, a medium access control (MAC) control element (CE), or downlink control information (DCI).

15. A method performed by a user equipment (UE), the method comprising:

receiving first information indicating one or more channel state information (CSI) reference signal (RS) resources for frequency selective beam measurement (FSBM);

receiving second information indicating a correspondence between the one or more CSI-RS resources and a plurality of frequency subbands;

determining, based on the first information, the one or more CSI-RS resources for FSBM;

identifying, based on the second information, the correspondence between the one or more CSI-RS resources and the plurality of frequency subbands;

receiving third information corresponding to the plurality of frequency subbands;

measuring, based on the third information and the correspondence, the one or more CSI-RS resources corresponding to the plurality of frequency subbands; and determining, based on the measurement, a beam report for FSBM, wherein the beam report comprises a resource indicator and a beam metric associated with the resource indicator.

16. The method of claim 15, wherein the third information includes at least one of:

a number of frequency subbands;

indexes or identities (IDs) corresponding to the number of frequency subbands;

a number of resource blocks (RBs) associated with each of the number of frequency subbands; and time or frequency domain resource allocations of each of the number of frequency subbands.

17. The method of claim 15, wherein the first information includes at least one of:

a higher layer parameter FreqSelectiveBeamMeasurement;

a bitmap associated with a CSI resource set that indicates a CSI-RS resource from the one or more CSI-RS resources; and indexes of the one or more CSI-RS resources in the CSI resource set.

18. The method of claim 17, wherein:

when a value of the bitmap is set to '1', the corresponding CSI-RS resource in the CSI resource set belongs to the one or more CSI-RS resources for FSBM; and when a value of the bitmap is set to '0', the corresponding CSI-RS resource in the CSI resource set does not belong to the one or more CSI-RS resources for FSBM.

19. The method of claim 15, wherein:

the second information is indicated via a higher layer parameter that configures a CSI-RS resource among the one or more CSI-RS resources; and the second information indicates $N_k \geq 1$ frequency subbands out of the plurality of frequency subbands.

20. The method of claim 19, wherein:

the CSI-RS resource comprises $N_k \geq 1$ groups of CSI-RS ports, wherein each group comprises one or more CSI-RS ports; and each of the $N_k$ groups of CSI-RS ports corresponds to one or more of the $N_k$ frequency subbands according to:

a fixed rule in system specifications; or a network configuration or indication received via radio resource control (RRC) signaling, a medium access control (MAC) control element (CE), or downlink control information (DCI).

* * * * *